(12) United States Patent
Pham

(10) Patent No.: US 8,474,278 B2
(45) Date of Patent: *Jul. 2, 2013

(54) COMPRESSOR DIAGNOSTIC AND PROTECTION SYSTEM AND METHOD

(75) Inventor: Hung M. Pham, Dayton, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 201 days.

This patent is subject to a terminal disclaimer.

(21) Appl. No.: 13/030,549

(22) Filed: Feb. 18, 2011

(65) Prior Publication Data

US 2011/0144944 A1  Jun. 16, 2011

Related U.S. Application Data

(63) Continuation of application No. 11/098,575, filed on Apr. 4, 2005, now Pat. No. 7,905,098, which is a continuation of application No. 11/059,646, filed on Feb. 16, 2005, now Pat. No. 7,412,842.

(60) Provisional application No. 60/565,795, filed on Apr. 27, 2004.

(51) Int. Cl.
  *F25B 1/00*  (2006.01)
(52) U.S. Cl.
  USPC .............................. 62/115; 62/126
(58) Field of Classification Search
  USPC .............................. 62/126, 129, 132; 702/182
  See application file for complete search history.

(56) References Cited

U.S. PATENT DOCUMENTS

| 2,054,542 | A | 9/1936 | Hoelle |
| 2,978,879 | A | 4/1961 | Heidorn |
| 3,047,696 | A | 7/1962 | Heidorn |
| 3,107,843 | A | 10/1963 | Finn |
| 3,170,304 | A | 2/1965 | Hale |
| 3,232,519 | A | 2/1966 | Long |
| 3,278,111 | A | 10/1966 | Parker |
| 3,665,399 | A | 5/1972 | Zehr et al. |
| 3,729,949 | A | 5/1973 | Talbot |
| 3,735,377 | A | 5/1973 | Kaufman |

(Continued)

FOREIGN PATENT DOCUMENTS

| CN | 1356472 | 7/2002 |
| DE | 1403467 A1 | 10/1969 |

(Continued)

OTHER PUBLICATIONS

European Search Report regarding Application No. 04022784.5-2315 / 1500821, dated Aug. 14, 2012.

(Continued)

*Primary Examiner* — Mohammad M Ali
(74) *Attorney, Agent, or Firm* — Harness, Dickey & Pierce, P.L.C.

(57) ABSTRACT

A method is provided and may include generating a high-side signal indicative of an operating condition of a high-pressure side of a refrigeration circuit and generating a low-side signal indicative of an operating condition of a low-pressure side of the refrigeration circuit. The method may further include processing by a processor the high-side signal and the low-side signal to determine a non-measured system condition and determining by the processor an efficiency of the refrigeration circuit based on the non-measured system condition.

31 Claims, 32 Drawing Sheets

U.S. PATENT DOCUMENTS

| | | |
|---|---|---|
| 3,742,303 A | 6/1973 | Dageford |
| 3,783,681 A | 1/1974 | Hirt et al. |
| 3,927,712 A | 12/1975 | Nakayama |
| 3,935,519 A | 1/1976 | Pfarrer et al. |
| 3,950,962 A | 4/1976 | Odashima |
| 3,960,011 A | 6/1976 | Renz et al. |
| 3,978,382 A | 8/1976 | Pfarrer et al. |
| 3,998,068 A | 12/1976 | Chirnside |
| 4,014,182 A | 3/1977 | Granryd |
| 4,018,584 A | 4/1977 | Mullen |
| 4,024,725 A | 5/1977 | Uchida et al. |
| 4,034,570 A | 7/1977 | Anderson et al. |
| 4,038,061 A | 7/1977 | Anderson et al. |
| 4,046,532 A | 9/1977 | Nelson |
| 4,060,716 A | 11/1977 | Pekrul et al. |
| 4,066,869 A | 1/1978 | Apaloo et al. |
| 4,090,248 A | 5/1978 | Swanson et al. |
| 4,102,394 A | 7/1978 | Botts |
| 4,104,888 A | 8/1978 | Reedy et al. |
| 4,105,063 A | 8/1978 | Bergt |
| 4,112,703 A | 9/1978 | Kountz |
| 4,136,730 A | 1/1979 | Kinsey |
| 4,137,057 A | 1/1979 | Piet et al. |
| 4,137,725 A | 2/1979 | Martin |
| 4,142,375 A | 3/1979 | Abe et al. |
| 4,143,707 A | 3/1979 | Lewis et al. |
| 4,146,085 A | 3/1979 | Wills |
| RE29,966 E | 4/1979 | Nussbaum |
| 4,156,350 A | 5/1979 | Elliott et al. |
| 4,161,106 A | 7/1979 | Savage et al. |
| 4,165,619 A | 8/1979 | Girard |
| 4,171,622 A | 10/1979 | Yamaguchi et al. |
| 4,173,871 A | 11/1979 | Brooks |
| RE30,242 E | 4/1980 | del Toro et al. |
| 4,209,994 A | 7/1980 | Mueller et al. |
| 4,211,089 A | 7/1980 | Mueller et al. |
| 4,220,010 A | 9/1980 | Mueller et al. |
| 4,227,862 A | 10/1980 | Andrew et al. |
| 4,232,530 A | 11/1980 | Mueller |
| 4,233,818 A | 11/1980 | Lastinger |
| 4,236,379 A | 12/1980 | Mueller |
| 4,244,182 A | 1/1981 | Behr |
| 4,246,763 A | 1/1981 | Mueller et al. |
| 4,248,051 A | 2/1981 | Darcy et al. |
| 4,251,988 A | 2/1981 | Allard et al. |
| 4,257,795 A | 3/1981 | Shaw |
| 4,259,847 A | 4/1981 | Pearse, Jr. |
| 4,267,702 A | 5/1981 | Houk |
| 4,271,898 A | 6/1981 | Freeman |
| 4,286,438 A | 9/1981 | Clarke |
| 4,290,480 A | 9/1981 | Sulkowski |
| 4,301,660 A | 11/1981 | Mueller et al. |
| 4,307,775 A | 12/1981 | Saunders et al. |
| 4,311,188 A | 1/1982 | Kojima et al. |
| 4,319,461 A | 3/1982 | Shaw |
| 4,325,223 A | 4/1982 | Cantley |
| 4,328,678 A | 5/1982 | Kono et al. |
| 4,328,680 A | 5/1982 | Stamp, Jr. et al. |
| 4,333,316 A | 6/1982 | Stamp, Jr. et al. |
| 4,333,317 A | 6/1982 | Sawyer |
| 4,336,001 A | 6/1982 | Andrew et al. |
| 4,338,790 A | 7/1982 | Saunders et al. |
| 4,338,791 A | 7/1982 | Stamp, Jr. et al. |
| 4,345,162 A | 8/1982 | Hammer et al. |
| 4,350,021 A | 9/1982 | Lundstrom |
| 4,350,023 A | 9/1982 | Kuwabara et al. |
| 4,356,703 A | 11/1982 | Vogel |
| 4,361,273 A | 11/1982 | Levine et al. |
| 4,365,983 A | 12/1982 | Abraham et al. |
| 4,370,098 A | 1/1983 | McClain et al. |
| 4,372,119 A | 2/1983 | Gillbrand et al. |
| 4,381,549 A | 4/1983 | Stamp, Jr. et al. |
| 4,382,367 A | 5/1983 | Roberts |
| 4,384,462 A | 5/1983 | Overman et al. |
| 4,387,368 A | 6/1983 | Day, III et al. |
| 4,390,321 A | 6/1983 | Langlois et al. |
| 4,390,922 A | 6/1983 | Pelliccia |
| 4,395,886 A | 8/1983 | Mayer |
| 4,395,887 A | 8/1983 | Sweetman |
| 4,399,548 A | 8/1983 | Castleberry |
| 4,406,133 A | 9/1983 | Saunders et al. |
| 4,407,138 A | 10/1983 | Mueller |
| 4,408,660 A | 10/1983 | Sutoh et al. |
| 4,425,010 A | 1/1984 | Bryant et al. |
| 4,429,578 A | 2/1984 | Darrel et al. |
| 4,441,329 A | 4/1984 | Dawley |
| 4,448,038 A | 5/1984 | Barbier |
| 4,449,375 A | 5/1984 | Briccetti |
| 4,460,123 A | 7/1984 | Beverly |
| 4,463,571 A | 8/1984 | Wiggs |
| 4,465,229 A | 8/1984 | Kompelien |
| 4,467,230 A | 8/1984 | Rovinsky |
| 4,467,385 A | 8/1984 | Bandoli et al. |
| 4,467,613 A | 8/1984 | Behr et al. |
| 4,470,092 A | 9/1984 | Lombardi |
| 4,470,266 A | 9/1984 | Briccetti et al. |
| 4,474,024 A | 10/1984 | Eplett et al. |
| 4,479,389 A | 10/1984 | Anderson, III et al. |
| 4,489,551 A | 12/1984 | Watanabe et al. |
| 4,495,779 A | 1/1985 | Tanaka et al. |
| 4,496,296 A | 1/1985 | Arai et al. |
| 4,497,031 A | 1/1985 | Froehling et al. |
| 4,498,310 A | 2/1985 | Imanishi et al. |
| 4,499,739 A | 2/1985 | Matsuoka et al. |
| 4,502,084 A | 2/1985 | Hannett |
| 4,502,833 A | 3/1985 | Hibino et al. |
| 4,502,842 A | 3/1985 | Currier et al. |
| 4,502,843 A | 3/1985 | Martin |
| 4,506,518 A | 3/1985 | Yoshikawa et al. |
| 4,507,934 A | 4/1985 | Tanaka et al. |
| 4,510,547 A | 4/1985 | Rudich, Jr. |
| 4,510,576 A | 4/1985 | MacArthur et al. |
| 4,512,161 A | 4/1985 | Logan et al. |
| 4,516,407 A | 5/1985 | Watabe |
| 4,520,674 A | 6/1985 | Canada et al. |
| 4,523,435 A | 6/1985 | Lord |
| 4,523,436 A | 6/1985 | Schedel et al. |
| 4,527,399 A | 7/1985 | Lord |
| 4,535,607 A | 8/1985 | Mount |
| 4,538,420 A | 9/1985 | Nelson |
| 4,538,422 A | 9/1985 | Mount et al. |
| 4,539,820 A | 9/1985 | Zinsmeyer |
| 4,545,210 A | 10/1985 | Lord |
| 4,545,214 A | 10/1985 | Kinoshita |
| 4,548,549 A | 10/1985 | Murphy et al. |
| 4,549,403 A | 10/1985 | Lord et al. |
| 4,549,404 A | 10/1985 | Lord |
| 4,555,057 A | 11/1985 | Foster |
| 4,557,317 A | 12/1985 | Harmon, Jr. |
| 4,561,260 A | 12/1985 | Nishi et al. |
| 4,563,624 A | 1/1986 | Yu |
| 4,563,877 A | 1/1986 | Harnish |
| 4,574,871 A | 3/1986 | Parkinson et al. |
| 4,580,947 A | 4/1986 | Shibata et al. |
| 4,583,373 A | 4/1986 | Shaw |
| 4,589,060 A | 5/1986 | Zinsmeyer |
| 4,598,764 A | 7/1986 | Beckey |
| 4,602,484 A | 7/1986 | Bendikson |
| 4,611,470 A | 9/1986 | Enstrom |
| 4,612,775 A | 9/1986 | Branz et al. |
| 4,614,089 A | 9/1986 | Dorsey |
| 4,617,804 A | 10/1986 | Fukushima et al. |
| 4,620,424 A | 11/1986 | Tanaka et al. |
| 4,621,502 A | 11/1986 | Ibrahim et al. |
| 4,627,245 A | 12/1986 | Levine |
| 4,627,483 A | 12/1986 | Harshbarger, III et al. |
| 4,627,484 A | 12/1986 | Harshbarger, Jr. et al. |
| 4,630,670 A | 12/1986 | Wellman et al. |
| 4,642,034 A | 2/1987 | Terauchi |
| 4,646,532 A | 3/1987 | Nose |
| 4,649,710 A | 3/1987 | Inoue et al. |
| 4,653,280 A | 3/1987 | Hansen et al. |
| 4,653,285 A | 3/1987 | Pohl |
| 4,655,688 A | 4/1987 | Bohn et al. |
| 4,660,386 A | 4/1987 | Hansen et al. |
| 4,662,184 A | 5/1987 | Pohl et al. |
| 4,674,292 A | 6/1987 | Ohya et al. |

| | | | | | | |
|---|---|---|---|---|---|---|
| 4,677,830 A | 7/1987 | Sumikawa et al. | | 4,985,857 A | 1/1991 | Bajpai et al. |
| 4,680,940 A | 7/1987 | Vaughn | | 4,987,748 A | 1/1991 | Meckler |
| 4,682,473 A | 7/1987 | Rogers, III | | 4,990,057 A | 2/1991 | Rollins |
| 4,684,060 A | 8/1987 | Adams et al. | | 4,991,770 A | 2/1991 | Bird et al. |
| 4,686,835 A | 8/1987 | Alsenz | | 5,000,009 A | 3/1991 | Clanin |
| 4,689,967 A | 9/1987 | Han et al. | | 5,009,075 A | 4/1991 | Okoren |
| 4,697,431 A | 10/1987 | Alsenz | | 5,009,076 A | 4/1991 | Winslow |
| 4,698,978 A | 10/1987 | Jones | | 5,018,665 A | 5/1991 | Sulmone |
| 4,698,981 A | 10/1987 | Kaneko et al. | | RE33,620 E | 6/1991 | Persem |
| 4,701,824 A | 10/1987 | Beggs et al. | | 5,042,264 A | 8/1991 | Dudley |
| 4,706,152 A | 11/1987 | DeFilippis et al. | | 5,056,036 A | 10/1991 | Van Bork |
| 4,706,469 A | 11/1987 | Oguni et al. | | 5,056,329 A | 10/1991 | Wilkinson |
| 4,712,648 A | 12/1987 | Mattes et al. | | 5,058,388 A | 10/1991 | Shaw et al. |
| 4,713,717 A | 12/1987 | Pejouhy et al. | | 5,062,278 A | 11/1991 | Sugiyama |
| 4,715,190 A | 12/1987 | Han et al. | | 5,065,593 E | 11/1991 | Dudley et al. |
| 4,720,980 A | 1/1988 | Howland | | RE33,775 E | 12/1991 | Behr et al. |
| 4,735,054 A | 4/1988 | Beckey | | 5,071,065 A | 12/1991 | Aalto et al. |
| 4,735,060 A | 4/1988 | Alsenz | | 5,073,091 A | 12/1991 | Burgess et al. |
| 4,744,223 A | 5/1988 | Umezu | | 5,073,862 A | 12/1991 | Carlson |
| 4,745,765 A | 5/1988 | Pettitt | | 5,076,067 A | 12/1991 | Prenger et al. |
| 4,745,766 A | 5/1988 | Bahr | | 5,076,494 A | 12/1991 | Ripka |
| 4,745,767 A | 5/1988 | Ohya et al. | | 5,077,983 A | 1/1992 | Dudley |
| 4,750,332 A | 6/1988 | Jenski et al. | | 5,094,086 A | 3/1992 | Shyu |
| 4,750,672 A | 6/1988 | Beckey et al. | | 5,095,712 A | 3/1992 | Narreau |
| 4,751,825 A | 6/1988 | Voorhis et al. | | 5,095,715 A | 3/1992 | Dudley |
| 4,755,957 A | 7/1988 | White et al. | | 5,103,391 A | 4/1992 | Barrett |
| 4,765,150 A | 8/1988 | Persem | | 5,109,676 A | 5/1992 | Waters et al. |
| 4,768,348 A | 9/1988 | Noguchi | | 5,109,700 A | 5/1992 | Hicho |
| 4,790,142 A | 12/1988 | Beckey | | 5,115,406 A | 5/1992 | Zatezalo et al. |
| 4,798,055 A | 1/1989 | Murray et al. | | 5,115,643 A | 5/1992 | Hayata et al. |
| 4,805,118 A | 2/1989 | Rishel | | 5,115,644 A | 5/1992 | Alsenz |
| 4,807,445 A | 2/1989 | Matsuoka et al. | | 5,118,260 A | 6/1992 | Fraser, Jr. |
| 4,829,779 A | 5/1989 | Munson et al. | | 5,119,466 A | 6/1992 | Suzuki |
| 4,831,560 A | 5/1989 | Zaleski | | 5,119,637 A | 6/1992 | Bard et al. |
| 4,835,980 A | 6/1989 | Oyanagi et al. | | 5,121,610 A | 6/1992 | Atkinson et al. |
| 4,841,734 A | 6/1989 | Torrence | | 5,123,252 A | 6/1992 | Hanson |
| 4,845,956 A | 7/1989 | Berntsen et al. | | 5,123,253 A | 6/1992 | Hanson et al. |
| 4,848,099 A | 7/1989 | Beckey et al. | | 5,123,255 A | 6/1992 | Ohizumi |
| 4,848,100 A | 7/1989 | Barthel et al. | | 5,141,407 A | 8/1992 | Ramsey et al. |
| 4,850,198 A | 7/1989 | Helt et al. | | 5,142,877 A | 9/1992 | Shimizu |
| 4,850,204 A | 7/1989 | Bos et al. | | 5,167,494 A | 12/1992 | Inagaki et al. |
| 4,852,363 A | 8/1989 | Kampf et al. | | 5,170,935 A | 12/1992 | Federspiel et al. |
| 4,856,286 A | 8/1989 | Sulfstede et al. | | 5,170,936 A | 12/1992 | Kubo et al. |
| 4,858,676 A | 8/1989 | Bolfik et al. | | 5,186,014 A | 2/1993 | Runk |
| 4,866,944 A | 9/1989 | Yamazaki | | 5,199,855 A | 4/1993 | Nakajima et al. |
| 4,869,073 A | 9/1989 | Kawai et al. | | 5,200,872 A | 4/1993 | D'Entremont et al. |
| 4,873,836 A | 10/1989 | Thompson | | 5,201,862 A | 4/1993 | Pettitt |
| 4,878,355 A | 11/1989 | Beckey et al. | | 5,203,178 A | 4/1993 | Shyu |
| 4,881,184 A | 11/1989 | Abegg, III et al. | | 5,209,076 A | 5/1993 | Kauffman et al. |
| 4,882,908 A | 11/1989 | White | | 5,209,400 A | 5/1993 | Winslow et al. |
| 4,884,412 A | 12/1989 | Sellers et al. | | 5,219,041 A | 6/1993 | Greve |
| 4,885,707 A | 12/1989 | Nichol et al. | | 5,224,354 A | 7/1993 | Ito et al. |
| 4,885,914 A | 12/1989 | Pearman | | 5,224,835 A | 7/1993 | Oltman |
| 4,887,436 A | 12/1989 | Enomoto et al. | | 5,228,300 A | 7/1993 | Shim |
| 4,887,857 A | 12/1989 | VanOmmeren | | 5,228,307 A | 7/1993 | Koce |
| 4,889,280 A | 12/1989 | Grald et al. | | 5,231,844 A | 8/1993 | Park |
| 4,893,480 A | 1/1990 | Matsui et al. | | 5,233,841 A | 8/1993 | Jyrek |
| 4,899,551 A | 2/1990 | Weintraub | | 5,235,526 A * | 8/1993 | Saffell .......................... 700/282 |
| 4,903,500 A | 2/1990 | Hanson | | 5,237,830 A | 8/1993 | Grant |
| 4,909,041 A | 3/1990 | Jones | | 5,241,833 A | 9/1993 | Ohkoshi |
| 4,909,076 A | 3/1990 | Busch et al. | | 5,243,829 A | 9/1993 | Bessler |
| 4,910,966 A | 3/1990 | Levine et al. | | 5,248,244 A | 9/1993 | Ho et al. |
| 4,913,625 A | 4/1990 | Gerlowski | | 5,251,454 A | 10/1993 | Yoon |
| 4,916,912 A | 4/1990 | Levine et al. | | 5,257,506 A | 11/1993 | DeWolf et al. |
| 4,918,932 A | 4/1990 | Gustafson et al. | | 5,271,556 A | 12/1993 | Helt et al. |
| 4,932,588 A | 6/1990 | Fedter et al. | | 5,276,630 A | 1/1994 | Baldwin et al. |
| 4,939,909 A | 7/1990 | Tsuchiyama et al. | | 5,279,458 A | 1/1994 | DeWolf et al. |
| 4,943,003 A | 7/1990 | Shimizu et al. | | 5,290,154 A | 3/1994 | Kotlarek et al. |
| 4,944,160 A | 7/1990 | Malone et al. | | 5,291,752 A | 3/1994 | Alvarez et al. |
| 4,945,491 A | 7/1990 | Rishel | | 5,299,504 A | 4/1994 | Abele |
| 4,953,784 A | 9/1990 | Yasufuku et al. | | 5,303,560 A | 4/1994 | Hanson et al. |
| 4,959,970 A | 10/1990 | Meckler | | 5,311,451 A | 5/1994 | Barrett |
| 4,964,060 A | 10/1990 | Hartsog | | 5,320,506 A | 6/1994 | Fogt |
| 4,966,006 A | 10/1990 | Thuesen et al. | | 5,333,460 A | 8/1994 | Lewis et al. |
| 4,967,567 A | 11/1990 | Proctor et al. | | 5,335,507 A | 8/1994 | Powell |
| 4,970,496 A | 11/1990 | Kirkpatrick | | 5,336,058 A | 8/1994 | Yokoyama |
| 4,974,665 A | 12/1990 | Zillner, Jr. | | 5,362,206 A | 11/1994 | Westerman et al. |
| 4,975,024 A | 12/1990 | Heckel | | 5,362,211 A | 11/1994 | Iizuka et al. |
| 4,977,751 A | 12/1990 | Hanson | | 5,368,446 A | 11/1994 | Rode |

| Patent | Date | Inventor |
|---|---|---|
| 5,381,669 A | 1/1995 | Bahel et al. |
| 5,381,692 A | 1/1995 | Winslow et al. |
| 5,416,781 A | 5/1995 | Ruiz |
| 5,423,190 A | 6/1995 | Friedland |
| 5,423,192 A | 6/1995 | Young et al. |
| 5,440,890 A | 8/1995 | Bahel et al. |
| 5,440,895 A | 8/1995 | Bahel et al. |
| 5,446,677 A | 8/1995 | Jensen et al. |
| 5,454,229 A | 10/1995 | Hanson et al. |
| 5,460,006 A | 10/1995 | Torimitsu |
| 5,475,986 A | 12/1995 | Bahel et al. |
| 5,481,481 A | 1/1996 | Frey et al. |
| 5,499,512 A | 3/1996 | Jurewicz et al. |
| 5,509,786 A | 4/1996 | Mizutani et al. |
| 5,511,387 A | 4/1996 | Tinsler |
| 5,528,908 A | 6/1996 | Bahel et al. |
| 5,533,347 A | 7/1996 | Ott et al. |
| 5,535,597 A | 7/1996 | An |
| 5,546,015 A | 8/1996 | Okabe |
| 5,548,966 A | 8/1996 | Tinsler |
| 5,562,426 A | 10/1996 | Watanabe et al. |
| 5,579,648 A | 12/1996 | Hanson et al. |
| 5,586,445 A | 12/1996 | Bessler |
| 5,592,824 A | 1/1997 | Sogabe et al. |
| 5,596,507 A | 1/1997 | Jones et al. |
| 5,602,757 A | 2/1997 | Haseley et al. |
| 5,610,339 A | 3/1997 | Haseley et al. |
| 5,611,674 A | 3/1997 | Bass et al. |
| 5,613,841 A | 3/1997 | Bass et al. |
| 5,616,829 A | 4/1997 | Balaschak et al. |
| 5,623,834 A | 4/1997 | Bahel et al. |
| 5,628,201 A | 5/1997 | Bahel et al. |
| 5,630,325 A | 5/1997 | Bahel et al. |
| 5,641,270 A | 6/1997 | Sgourakes et al. |
| 5,655,379 A | 8/1997 | Jaster et al. |
| 5,689,963 A | 11/1997 | Bahel et al. |
| 5,691,692 A | 11/1997 | Herbstritt |
| 5,699,670 A | 12/1997 | Jurewicz et al. |
| 5,707,210 A | 1/1998 | Ramsey et al. |
| 5,713,724 A | 2/1998 | Centers et al. |
| 5,737,931 A | 4/1998 | Ueno et al. |
| 5,741,120 A | 4/1998 | Bass et al. |
| 5,749,238 A * | 5/1998 | Schmidt .................... 62/211 |
| 5,754,450 A | 5/1998 | Solomon et al. |
| 5,772,403 A | 6/1998 | Allison et al. |
| 5,795,381 A | 8/1998 | Holder |
| 5,798,941 A | 8/1998 | McLeister |
| 5,802,860 A | 9/1998 | Barrows |
| 5,807,336 A | 9/1998 | Russo et al. |
| 5,808,441 A | 9/1998 | Nehring |
| 5,869,960 A | 2/1999 | Brand |
| 5,875,638 A | 3/1999 | Tinsler |
| 5,884,494 A | 3/1999 | Okoren et al. |
| 5,924,295 A | 7/1999 | Park |
| 5,947,701 A | 9/1999 | Hugenroth |
| 5,956,658 A | 9/1999 | McMahon |
| 5,971,712 A | 10/1999 | Kann |
| 5,975,854 A | 11/1999 | Culp, III et al. |
| 5,984,645 A | 11/1999 | Cummings |
| 5,987,903 A | 11/1999 | Bathla |
| 5,988,986 A | 11/1999 | Brinken et al. |
| 5,995,347 A | 11/1999 | Rudd et al. |
| 5,995,351 A | 11/1999 | Katsumata et al. |
| 6,017,192 A | 1/2000 | Clack et al. |
| 6,020,702 A | 2/2000 | Farr |
| 6,023,420 A | 2/2000 | McCormick et al. |
| 6,035,661 A | 3/2000 | Sunaga et al. |
| 6,041,605 A | 3/2000 | Heinrichs |
| 6,041,609 A | 3/2000 | Hornsleth et al. |
| 6,042,344 A | 3/2000 | Lifson |
| 6,047,557 A | 4/2000 | Pham et al. |
| 6,050,780 A | 4/2000 | Hasegawa et al. |
| 6,057,771 A | 5/2000 | Lakra |
| 6,065,946 A | 5/2000 | Lathrop |
| 6,068,447 A | 5/2000 | Foege |
| 6,077,051 A | 6/2000 | Centers et al. |
| 6,081,750 A | 6/2000 | Hoffberg et al. |
| 6,082,495 A | 7/2000 | Steinbarger et al. |
| 6,082,971 A | 7/2000 | Gunn et al. |
| 6,085,530 A | 7/2000 | Barito |
| 6,092,370 A | 7/2000 | Tremoulet, Jr. et al. |
| 6,092,378 A | 7/2000 | Das et al. |
| 6,092,992 A | 7/2000 | Imblum et al. |
| 6,102,665 A | 8/2000 | Centers et al. |
| 6,125,642 A | 10/2000 | Seener et al. |
| 6,128,583 A | 10/2000 | Dowling |
| 6,129,527 A | 10/2000 | Donahoe et al. |
| 6,157,310 A | 12/2000 | Milne et al. |
| 6,158,230 A | 12/2000 | Katsuki |
| 6,174,136 B1 | 1/2001 | Kilayko et al. |
| 6,176,686 B1 | 1/2001 | Wallis et al. |
| 6,179,214 B1 | 1/2001 | Key et al. |
| 6,199,018 B1 | 3/2001 | Quist et al. |
| 6,260,004 B1 | 7/2001 | Hays et al. |
| 6,276,901 B1 | 8/2001 | Farr et al. |
| 6,279,332 B1 | 8/2001 | Yeo et al. |
| 6,302,654 B1 | 10/2001 | Millet et al. |
| 6,324,854 B1 | 12/2001 | Jayanth |
| 6,332,327 B1 | 12/2001 | Street et al. |
| 6,360,551 B1 | 3/2002 | Renders |
| 6,375,439 B1 | 4/2002 | Missio |
| 6,381,971 B2 | 5/2002 | Honda |
| 6,390,779 B1 | 5/2002 | Cunkelman |
| 6,406,265 B1 | 6/2002 | Hahn et al. |
| 6,406,266 B1 | 6/2002 | Hugenroth et al. |
| 6,412,293 B1 | 7/2002 | Pham et al. |
| 6,438,981 B1 | 8/2002 | Whiteside |
| 6,442,953 B1 | 9/2002 | Trigiani et al. |
| 6,449,972 B2 | 9/2002 | Pham et al. |
| 6,450,771 B1 | 9/2002 | Centers et al. |
| 6,453,687 B2 | 9/2002 | Sharood et al. |
| 6,454,538 B1 | 9/2002 | Witham et al. |
| 6,457,319 B1 | 10/2002 | Ota et al. |
| 6,457,948 B1 | 10/2002 | Pham |
| 6,467,280 B2 | 10/2002 | Pham et al. |
| 6,471,486 B1 | 10/2002 | Centers et al. |
| 6,484,520 B2 | 11/2002 | Kawaguchi et al. |
| 6,487,457 B1 | 11/2002 | Hull et al. |
| 6,492,923 B1 | 12/2002 | Inoue et al. |
| 6,497,554 B2 | 12/2002 | Yang et al. |
| 6,501,240 B2 | 12/2002 | Ueda et al. |
| 6,501,629 B1 | 12/2002 | Marriott |
| 6,502,409 B1 | 1/2003 | Gatling et al. |
| 6,505,475 B1 | 1/2003 | Zugibe et al. |
| 6,529,590 B1 | 3/2003 | Centers |
| 6,533,552 B2 | 3/2003 | Centers et al. |
| 6,537,034 B2 | 3/2003 | Park et al. |
| 6,542,062 B1 | 4/2003 | Herrick |
| 6,558,126 B1 | 5/2003 | Hahn et al. |
| 6,560,976 B2 | 5/2003 | Jayanth |
| 6,571,566 B1 | 6/2003 | Temple et al. |
| 6,571,586 B1 | 6/2003 | Ritson et al. |
| 6,595,757 B2 | 7/2003 | Shen |
| 6,601,397 B2 | 8/2003 | Pham et al. |
| 6,615,594 B2 | 9/2003 | Jayanth et al. |
| 6,616,415 B1 | 9/2003 | Renken et al. |
| 6,629,420 B2 | 10/2003 | Renders |
| 6,647,735 B2 | 11/2003 | Street et al. |
| 6,658,373 B2 | 12/2003 | Rossi et al. |
| 6,675,591 B2 | 1/2004 | Singh et al. |
| 6,679,072 B2 | 1/2004 | Pham et al. |
| 6,685,438 B2 | 2/2004 | Yoo et al. |
| 6,709,244 B2 | 3/2004 | Pham |
| 6,711,911 B1 | 3/2004 | Grabon et al. |
| 6,758,050 B2 | 7/2004 | Jayanth et al. |
| 6,758,051 B2 | 7/2004 | Jayanth et al. |
| 6,760,207 B2 | 7/2004 | Wyatt et al. |
| 6,799,951 B2 | 10/2004 | Lifson et al. |
| 6,811,380 B2 | 11/2004 | Kim |
| 6,823,680 B2 | 11/2004 | Jayanth |
| 6,829,542 B1 | 12/2004 | Reynolds et al. |
| 6,832,120 B1 | 12/2004 | Frank et al. |
| 6,832,898 B2 | 12/2004 | Yoshida et al. |
| 6,869,272 B2 | 3/2005 | Odachi et al. |
| 6,934,862 B2 | 8/2005 | Sharood et al. |
| 6,964,558 B2 | 11/2005 | Hahn et al. |
| 6,966,759 B2 | 11/2005 | Hahn et al. |
| 6,973,794 B2 | 12/2005 | Street et al. |

| | | |
|---|---|---|
| 6,981,384 B2 | 1/2006 | Dobmeier et al. |
| 6,986,469 B2 | 1/2006 | Gauthier et al. |
| 6,999,996 B2 | 2/2006 | Sunderland |
| 7,000,422 B2 | 2/2006 | Street et al. |
| 7,047,753 B2 | 5/2006 | Street et al. |
| 7,079,967 B2 | 7/2006 | Rossi et al. |
| 7,113,376 B2 | 9/2006 | Nomura et al. |
| 7,123,458 B2 | 10/2006 | Mohr et al. |
| 7,124,728 B2 | 10/2006 | Carey et al. |
| 7,130,170 B2 | 10/2006 | Wakefield et al. |
| 7,134,295 B2 | 11/2006 | Maekawa |
| 7,174,728 B2 | 2/2007 | Jayanth |
| 7,228,691 B2 | 6/2007 | Street et al. |
| 7,270,278 B2 | 9/2007 | Street et al. |
| 7,412,842 B2 | 8/2008 | Pham |
| 7,421,850 B2 | 9/2008 | Street et al. |
| 7,447,603 B2 | 11/2008 | Bruno |
| 7,458,223 B2 | 12/2008 | Pham |
| 7,484,376 B2 | 2/2009 | Pham |
| 7,491,034 B2 | 2/2009 | Jayanth |
| 2001/0005320 A1 | 6/2001 | Ueda et al. |
| 2001/0054293 A1 | 12/2001 | Gustafson et al. |
| 2002/0018724 A1 | 2/2002 | Millet et al. |
| 2002/0020175 A1* | 2/2002 | Street et al. ............ 62/132 |
| 2002/0040280 A1 | 4/2002 | Morgan |
| 2002/0064463 A1 | 5/2002 | Park et al. |
| 2002/0067999 A1 | 6/2002 | Suitou et al. |
| 2002/0127120 A1 | 9/2002 | Hahn et al. |
| 2002/0170299 A1 | 11/2002 | Jayanth et al. |
| 2003/0019221 A1 | 1/2003 | Rossi et al. |
| 2003/0037555 A1 | 2/2003 | Street et al. |
| 2003/0078742 A1 | 4/2003 | VanderZee et al. |
| 2003/0094004 A1 | 5/2003 | Pham et al. |
| 2003/0108430 A1 | 6/2003 | Yoshida et al. |
| 2003/0115890 A1 | 6/2003 | Jayanth et al. |
| 2004/0016241 A1 | 1/2004 | Street et al. |
| 2004/0016244 A1 | 1/2004 | Street et al. |
| 2004/0016251 A1* | 1/2004 | Street et al. ............ 62/209 |
| 2004/0016253 A1 | 1/2004 | Street et al. |
| 2004/0024495 A1 | 2/2004 | Sunderland |
| 2004/0037706 A1 | 2/2004 | Hahn et al. |
| 2004/0042904 A1 | 3/2004 | Kim |
| 2004/0093879 A1 | 5/2004 | Street et al. |
| 2004/0133367 A1 | 7/2004 | Hart |
| 2004/0144106 A1 | 7/2004 | Douglas et al. |
| 2004/0184627 A1 | 9/2004 | Kost et al. |
| 2004/0184928 A1 | 9/2004 | Millet et al. |
| 2004/0184929 A1 | 9/2004 | Millet et al. |
| 2004/0184930 A1 | 9/2004 | Millet et al. |
| 2004/0184931 A1 | 9/2004 | Millet et al. |
| 2004/0187502 A1 | 9/2004 | Jayanth et al. |
| 2004/0191073 A1 | 9/2004 | Iimura et al. |
| 2004/0261431 A1 | 12/2004 | Singh et al. |
| 2005/0053471 A1 | 3/2005 | Hong et al. |
| 2005/0100449 A1 | 5/2005 | Hahn et al. |
| 2005/0103036 A1 | 5/2005 | Maekawa |
| 2005/0166610 A1 | 8/2005 | Jayanth |
| 2005/0172647 A1 | 8/2005 | Thybo et al. |
| 2005/0214148 A1 | 9/2005 | Ogawa et al. |
| 2005/0232781 A1 | 10/2005 | Herbert et al. |
| 2005/0235660 A1 | 10/2005 | Pham |
| 2005/0235661 A1 | 10/2005 | Pham |
| 2005/0235662 A1 | 10/2005 | Pham |
| 2005/0235663 A1 | 10/2005 | Pham |
| 2005/0252220 A1 | 11/2005 | Street et al. |
| 2005/0262856 A1 | 12/2005 | Street et al. |
| 2006/0117773 A1 | 6/2006 | Street et al. |
| 2006/0129339 A1 | 6/2006 | Bruno |
| 2006/0151037 A1 | 7/2006 | Lepola et al. |
| 2006/0185373 A1 | 8/2006 | Butler et al. |
| 2006/0256488 A1 | 11/2006 | Benzing et al. |
| 2006/0280627 A1 | 12/2006 | Jayanth |
| 2007/0002505 A1 | 1/2007 | Watanabe et al. |
| 2008/0209925 A1 | 9/2008 | Pham |
| 2008/0216494 A1 | 9/2008 | Pham et al. |
| 2009/0071175 A1 | 3/2009 | Pham |

FOREIGN PATENT DOCUMENTS

| | | |
|---|---|---|
| DE | 3118638 A1 | 5/1982 |
| DE | 29723145 U1 | 4/1998 |
| EP | 0008524 A1 | 3/1980 |
| EP | 0060172 A1 | 9/1982 |
| EP | 0085246 A1 | 8/1983 |
| EP | 0351272 A1 | 1/1990 |
| EP | 0355255 A2 | 2/1990 |
| EP | 0398436 A1 | 11/1990 |
| EP | 0453302 A1 | 10/1991 |
| EP | 0877462 A2 | 11/1998 |
| EP | 1087184 A2 | 3/2001 |
| EP | 1241417 A1 | 9/2002 |
| EP | 1245912 A2 | 10/2002 |
| EP | 1245913 A1 | 10/2002 |
| FR | 2472862 A1 | 7/1981 |
| GB | 2062919 A | 5/1981 |
| JP | 63061783 A | 3/1988 |
| JP | 02110242 A | 4/1990 |
| JP | 02294580 A | 12/1990 |
| JP | 06058273 A | 3/1994 |
| JP | 2002155868 A | 5/2002 |
| JP | 2003176788 A | 6/2003 |
| JP | 2004316504 A | 11/2004 |
| JP | 2006046219 A | 2/2006 |
| JP | 2006046519 A | 2/2006 |
| KR | 1020000000261 | 1/2000 |
| KR | 1020000025265 | 5/2000 |
| KR | 1020020041977 | 6/2002 |
| KR | 20040021281 A | 3/2004 |
| KR | 1020040021281 | 3/2004 |
| KR | 1020060020353 | 3/2006 |
| WO | 8806703 A1 | 9/1988 |
| WO | 9718636 A2 | 5/1997 |
| WO | 9917066 A1 | 4/1999 |
| WO | 9965681 A1 | 12/1999 |
| WO | 0169147 A1 | 9/2001 |
| WO | 0275227 A1 | 9/2002 |
| WO | 2005108882 A2 | 11/2005 |
| WO | 2006025880 A1 | 3/2006 |
| WO | 2009058356 A1 | 5/2009 |

OTHER PUBLICATIONS

Examiner's First Report on Australian Patent Application No. 2007292917 dated Jan. 10, 2012.

Examiner's First Report on Australian Patent Application No. 2008319275, dated Jan. 31, 2011.

Examiner's Report No. 2 regarding Australian Patent Application No. 2008325240, dated Mar. 5, 2012.

Final Office Action for U.S. Appl. No. 11/850,846, mailed Aug. 13, 2012.

Final Office Action regarding U.S. Appl. No. 12/261,643, dated Jun. 27, 2012.

Final Office Action regarding U.S. Appl. No. 12/261,643, dated Jul. 7, 2011.

Fourth Office Action from the State Intellectual Property Office of People's Republic of China regarding Chinese Patent Applicaiton No. 200510005907.8, dated Dec. 8, 2011. Translation provided by Unitalen Attorneys at Law.

Non-Final Office Action for U.S. Appl. No. 11/776,879, dated Mar. 16, 2012.

Non-Final office Action regarding U.S. Appl. No. 11/850,846, dated Apr. 24, 2012.

Non-Final Office Action regarding U.S. Appl. No. 13/176,021, dated May 8, 2012.

Notice of Allowance regarding U.S. Appl. No. 11/776,879, dated Jul. 9, 2012.

Notice of Allowance regarding U.S. Appl. No. 12/261,677, dated Dec. 15, 2011.

Office Action regarding U.S. Appl. No. 12/261,643, dated Nov. 2, 2011.

Office Action regarding U.S. Appl. No. 12/261,643, dated Feb. 15, 2012.

Office Action regarding U.S. Appl. No. 12/261,677, dated Aug. 4, 2011.

Patent Examiantion Report No. 3 regarding Australian Patent Application No. 2008325240, dated Jul. 19, 2012.
Third Office Action regarding Chinese Application No. 2005100059078 from the State Intellectual Property Office of People's Republic of China, dated Aug. 24, 2011. Translation provided by Unitalen Attorneys at Law.
Extended European Search Report regarding Application No. 12182243.1-2311, dated Oct. 29, 2012.
Notification of First Office Action from the State Intellectual Property Office of People's Repulic of China regarding Chinese Patent Application No. 200880122964.6, dated Nov. 5, 2012. Translation provided by Unitalen Attorneys at Law.
Second Office Action issued by the Chinese Patent Office dated Jun. 19, 2009 regarding Application No. 200510005907.8, translation provided by CCPIT Patent and Trademark Law Office.
Examiner's Answer regarding U.S. Appl. No. 09/977,552, dated Dec. 17, 2009.
Final Office Action regarding U.S. Appl. No. 09/977,552, dated Oct. 22, 2008.
Office Action regarding U.S. Appl. No. 09/977,552, dated Jan. 11, 2008.
Final Office Action regarding U.S. Appl. No. 09/977,552, dated Jul. 23, 2007.
Office Action Communication regarding U.S. Appl. No. 09/977,552, dated Apr. 18, 2007.
Election/Restriction Requirement regarding U.S. Appl. No. 09/977,552, dated Jan. 25, 2007.
Office Action regarding U.S. Appl. No. 09/977,552, dated Jul. 12, 2006.
Advisory Action Before the Filing of an Appeal Brief regarding U.S. Appl. No. 09/977,552, dated Nov. 10, 2005.
Final Office Action regarding U.S. Appl. No. 09/977,552, dated May 13, 2005.
Office Action regarding U.S. Appl. No. 09/977,552, dated Oct. 18, 2004.
Final Office Action regarding U.S. Appl. No. 09/977,552, dated Apr. 26, 2004.
Record of Oral Hearing regarding U.S. Appl. No. 09/977,552, dated Nov. 29, 2012.
Office Action regarding U.S. Appl. No. 09/977,552, dated Dec. 3, 2003.
Final Office Action regarding U.S. Appl. No. 09/977,552, dated Jun. 18, 2003.
Office Action regarding U.S. Appl. No. 09/977,552, dated Jan. 14, 2003.
First Office Action regarding Chinese Patent Application No. 201010117657.8, dated Dec. 29, 2010. English translation provided by Unitalen Attorneys at Law.
"A Practical Example of a Building's Automatic Control," cited in First Office Action from the Patent Office of the People's Republic of China dated Jun. 29, 2007, regarding Application No. 200510005907.8, including translation by CCPIT Patent and Trademark Law Office.
"Manual for Freezing and Air Conditioning Technology," Fan Jili, Liaoning Science and Technology Press, Sep. 1995 (cited in First Office Action issued by the Chinese Patent Office regarding Application No. 200780030810.X dated Dec. 25, 2009).
"Product Performance Introduction of York Company," cited in First Office Action from the Patent Office of the People's Republic of China dated Jun. 29, 2007 regarding Application No. 200510005907. 8, including translation by CCPIT Patent and Trademark Law Office.
"Small-type Freezing and Air Conditioning Operation," Chinese State Economy and Trading Committee, China Meteorological Press, Mar. 2003 (cited in First Office Action issued by the Chinese Patent Office regarding Application No. 200780030810.X dated Dec. 25, 2009).
Building Control Unit (BCU) Installation and Operation Manual, Computer Process Controls, Jan. 28, 1998.
Building Environmental Control (BEC) Installation and Operation Manual, Computer Process Controls, Jan. 5, 1998.
Einstein RX-300 Refrigeration Controller Installation and Operation Manual, Computer Process Controls, Apr. 1, 1998.

First Office Action from the Patent Office of the People's Republic of China regarding Application No. 200510005907.8, dated Jun. 29, 2007.
First Office Action issued by the Chinese Patent Office on May 30, 2008 regarding Application No. 200580013451.8.
First Office Action issued by the Chinese Patent Office regarding Application No. 200780030810.X dated Dec. 25, 2009.
International Preliminary Report on Patentability for International Application No. PCT/US2008/012362, dated May 4, 2010.
International Preliminary Report on Patentability for International Application No. PCT/US2008/012364, dated May 4, 2010.
International Preliminary Report on Patentability regarding International Application No. PCT/US2007/019563 dated Mar. 10, 2009.
International Search Report for International Application No. PCT/US2005/11154, dated Oct. 19, 2005.
International Search Report for International Application No. PCT/US2007/016135 dated Oct. 22, 2007.
International Search Report for International Application No. PCT/US2008/012362, dated Feb. 12, 2009.
International Search Report for International Application No. PCT/US2008/012364 dated Mar. 13, 2009.
Office Action regarding U.S. Appl. No. 11/850,846, dated Aug. 13, 2010.
Refrigeration Monitor and Case Control Installation and Operation Manual, Computer Process Controls, Aug. 12, 1999.
Second Office Action issued by the Chinese Patent Office on Mar. 6, 2009 regarding Application No. 200580013451.8.
Second Office Action regarding Chinese Patent Appplication No. 200780030810X, dated Aug. 4, 2010. English translation provided by Unitalen Attorneys at Law.
The International Search Report regarding International Application No. PCT/US2007/019563.
Third Office Action issued by the Chinese Patent Office on Jun. 19, 2009 regarding Application No. 200580013451.8, translated by CCPIT Patent and Trademark Law Office.
Translation of Claims and Abstract of KR Patent Laying-Open No. 2000-0000261; 4 pages.
Ultrasite 32 User's Guide, Computer Process Controls, Sep. 28, 1999.
Ultrasite User's Guide BCU Supplement, Computer Process Controls, Sep. 4, 1997.
Ultrasite User's Guide BEC Supplement, Computer Process Controls, Oct. 6, 1997.
Ultrasite User's Guide RMCC Supplement, Computer Process Controls, Jun. 9, 1997.
Written Opinion of the International Searching Authority for International Application No. PCT/US2008/012364 dated Mar. 12, 2009.
Written Opinion of the International Searching Authority regarding International Application No. PCT/US2007/019563.
Notice of Allowance and Fees Due and Notice of Allowability regarding U.S. Appl. No. 11/098,582, dated Feb. 24, 2009.
Office Action regarding U.S. Appl. No. 11/098,582 dated Mar. 3, 2010.
Office Action regarding U.S. Appl. No. 11/098,582, dated Jul. 7, 2008.
Office Action regarding U.S. Appl. No. 11/098,582, dated Aug. 4, 2009.
Office Action regarding U.S. Appl. No. 11/098,582, dated Sep. 21, 2007.
Office Action regarding U.S. Appl. No. 11/098,575, dated Mar. 26, 2008.
Office Action regarding U.S. Appl. No. 11/098,575, dated Sep. 9, 2008.
Office Action regarding U.S. Appl. No. 11/098,575, dated Jan. 29, 2009.
Office Action regarding U.S. Appl. No. 11/098,575, dated Jul. 13, 2009.
Advisory Action Before the Filing of an Appeal Brief regarding U.S. Appl. No. 11/098,575, dated Sep. 28, 2009.
Advisory Action Before the Filing of an Appeal Brief regarding U.S. Appl. No. 11/098,575, dated Nov. 16, 2009.
Non-Final Office Action for U.S. Appl. No. 11/098,575 dated Jan. 27, 2010.

Final Office Action regarding U.S. Appl. No. 11/098,575, dated Jun. 17, 2010.
Interview Summary regarding U.S. Appl. No. 11/098,582, dated Apr. 27, 2010.
Notice of Allowance and Fees Due and Notice of Allowability regarding U.S. Appl. No. 11/098,582, dated Sep. 24, 2010.
Office Action regarding U.S. Appl. No. 11/776,879, dated Sep. 17, 2010.
First Office Action from the State Intellectual Property Office of the People's Republic of China regarding Chinese Patent Application No. 200890100287.3, issued Oct. 25, 2010. Translation provided by Unitalen Attorneys at Law.

Non-Final Office Action regarding U.S. Appl. No. 12/261,643, dated Jan. 27, 2011.
Second Office Action regarding Chinese Patent Application No. 200890100287.3, dated Jan. 27, 2011. English translation provided by Unitalen Attorneys at Law.
Official Action regarding Australian Patent Application No. 2008325240, dated Jan. 19, 2011.
First Office Action regarding Chinese Patent Application No. 200780032977.X, dated Sep. 27, 2010. English translation provided by Unitalen Attorneys at Law.

* cited by examiner

COMPRESSOR DIAGNOSTIC AND PROTECTION SYSTEM AND METHOD

CROSS-REFERENCE TO RELATED APPLICATIONS

This application is a continuation of U.S. patent application Ser. No. 11/098,575 filed on Apr. 4, 2005, which is a continuation of U.S. patent application Ser. No. 11/059,646 filed on Feb. 16, 2005 (now U.S. Pat. No. 7,412,842), which claims the benefit of U.S. Provisional Application No. 60/565,795, filed on Apr. 27, 2004. The disclosures of the above applications are incorporated herein by reference.

FIELD

The present teachings relate to compressors, and more particularly, to an improved diagnostic system for use with a compressor.

BACKGROUND

Compressors may be used in a wide variety of industrial and residential applications to circulate refrigerant within a refrigeration, heat pump, HVAC, or chiller system (generically "refrigeration systems") to provide a desired heating or cooling effect. In any of the foregoing applications, the compressor should provide consistent and efficient operation to ensure that the particular application (i.e., refrigeration, heat pump, HVAC, or chiller system) functions properly.

Residential air conditioning and refrigeration systems may include a protection device that intermittently trips the system, which will cause discomfort to a homeowner, eventually resulting in a visit to the home by a serviceperson to repair a failure in the system. The protection device may shut down the compressor when a particular fault or failure is detected to protect the compressor from damage. In addition, protection devices may also detect a pressure within the compressor or between the compressor and associated system components (i.e., evaporator, condenser, etc.) in order to shut down the compressor to prevent damage to both the compressor and system components if pressure limits are exceeded.

The types of faults that may cause protection concerns include electrical, mechanical, and system faults. Electrical faults have a direct effect on the electrical motor in the compressor while mechanical faults generally include faulty bearings or broken parts. Mechanical faults often raise the internal temperature of the respective components to high levels, thereby causing malfunction of, and possible damage to, the compressor.

System faults may be attributed to system conditions such as an adverse level of fluid disposed within the system or to a blocked flow condition external to the compressor. Such system conditions may raise an internal compressor temperature or pressure to high levels, thereby damaging the compressor and causing system inefficiencies or failures. To prevent system and compressor damage or failure, the compressor may be shut down by the protection system when any of the aforementioned conditions are present.

Conventional protection systems typically sense temperature and/or pressure parameters as discrete switches and interrupt power supply to the motor should a predetermined temperature or pressure threshold be experienced. Parameters that are typically monitored in a compressor include the temperature of the motor winding, the temperature of the spiral wraps or scrolls (for a scroll-type compressor), the pressure at discharge, the electrical current going to the motor, and a continuous motor overload condition. In addition, system parameters such as a fan failure, loss of charge, or a blocked orifice may also be monitored to prevent damage to the compressor and system. A plurality of sensors are typically required to measure and monitor the various system and compressor operating parameters. Typically, each parameter measured constitutes an individual sensor, thereby creating a complex protection system in which many sensors are employed.

The most common protection arrangements for residential refrigeration systems employ high/low pressure cutout switches and a plurality of sensors to detect individual operating parameters of the compressor and system. The sensors produce and send a signal indicative of compressor and/or system operating parameters to processing circuitry so that the processing circuitry may determine when to shut down the compressor to prevent damage. When the compressor or system experiences an unfavorable condition, the processing circuitry directs the cutout switches to shut down the compressor.

Sensors associated with conventional systems are required to quickly and accurately detect particular faults experienced by the compressor and/or system. Without a plurality of sensors, conventional systems would merely shut down the compressor when a predetermined threshold load or current is experienced, thereby requiring the homeowner or serviceperson to perform many tests to properly diagnose the cause of the fault prior to fixing the problem. In this manner, conventional protection devices fail to precisely indicate the particular fault and therefore cannot be used as a diagnostic tool.

SUMMARY

A method is provided and may include generating a high-side signal indicative of an operating condition of a high-pressure side of a refrigeration circuit and generating a low-side signal indicative of an operating condition of a low-pressure side of the refrigeration circuit. The method may further include processing by a processor the high-side signal and the low-side signal to determine a non-measured system condition and determining by the processor an efficiency of the refrigeration circuit based on the non-measured system condition.

In another configuration, a method is provided and may include generating a high-side signal indicative of an operating condition of a high-pressure side of a refrigeration circuit and generating a low-side signal indicative of an operating condition of a low-pressure side of the refrigeration circuit. The method may also include processing by a processor the high-side signal and the low-side signal to determine a non-measured system condition and determining by the processor an efficiency of a compressor within the refrigeration circuit based on the non-measured system condition.

Further areas of applicability of the present teachings will become apparent from the detailed description provided hereinafter. It should be understood that the detailed description and specific examples, are intended for purposes of illustration only and are not intended to limit the scope of the teachings.

BRIEF DESCRIPTION OF THE DRAWINGS

The present teachings will become more fully understood from the detailed description and the accompanying drawings, wherein.

DETAILED DESCRIPTION

The following description is merely exemplary in nature and is in no way intended to limit the present teachings, its application, or uses.

With reference to the drawings, a compressor 10 includes a compressor protection and control system 12 for determining an operating mode for the compressor 10 based on sensed compressor parameters to protect the compressor 10 by limiting operation when conditions are unfavorable. The protection and control system 12 toggles the compressor between operating modes including a normal mode, a reduced-capacity mode, and a shutdown mode. The compressor 10 will be described and shown as a scroll compressor but it should be understood that any type of compressor may be used with the protection and control system 12. Furthermore, while the compressor 10 will be described in the context of a refrigeration system 11, compressor 10 may similarly be incorporated into other such systems such as, but not limited to, a heat pump, HVAC, or chiller system.

Figure 1:
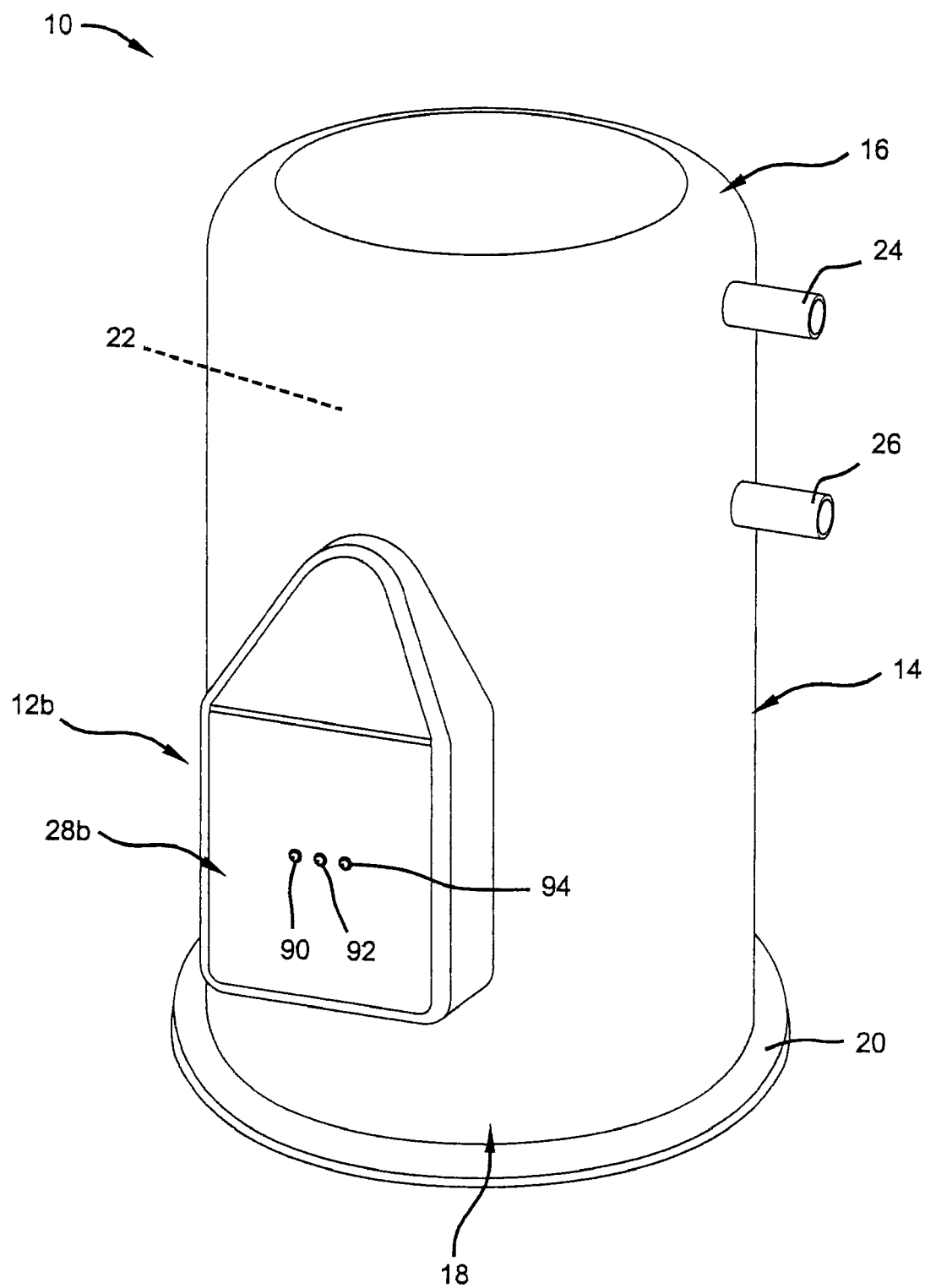
FIG. 1 is a perspective view of a compressor in accordance with the principles of the present teachings.
Figure 2:
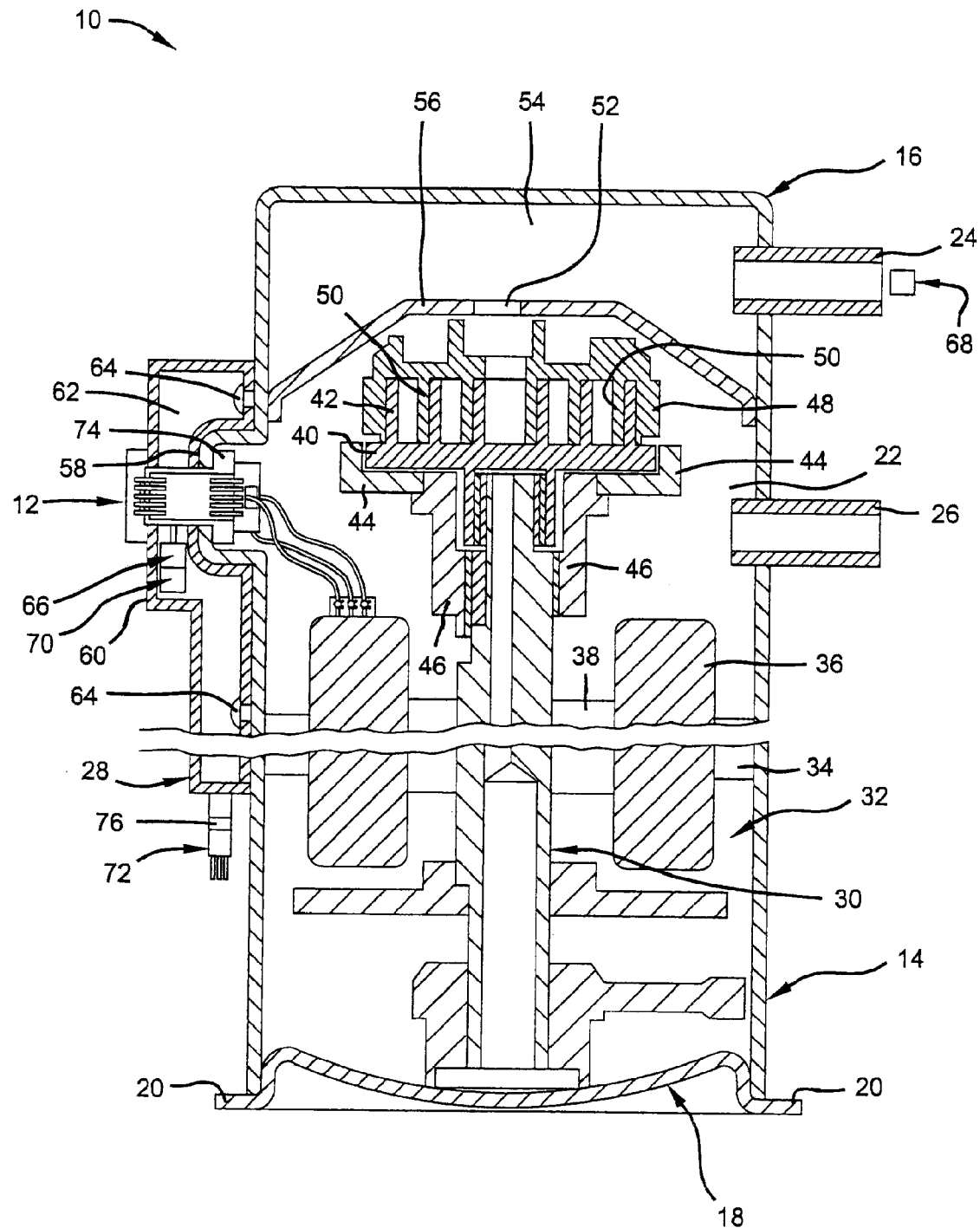
FIG. 2 is a cross-sectional view of the compressor of FIG. 1 incorporating a protection system in accordance with the principles of the present teachings.
Figure 3:
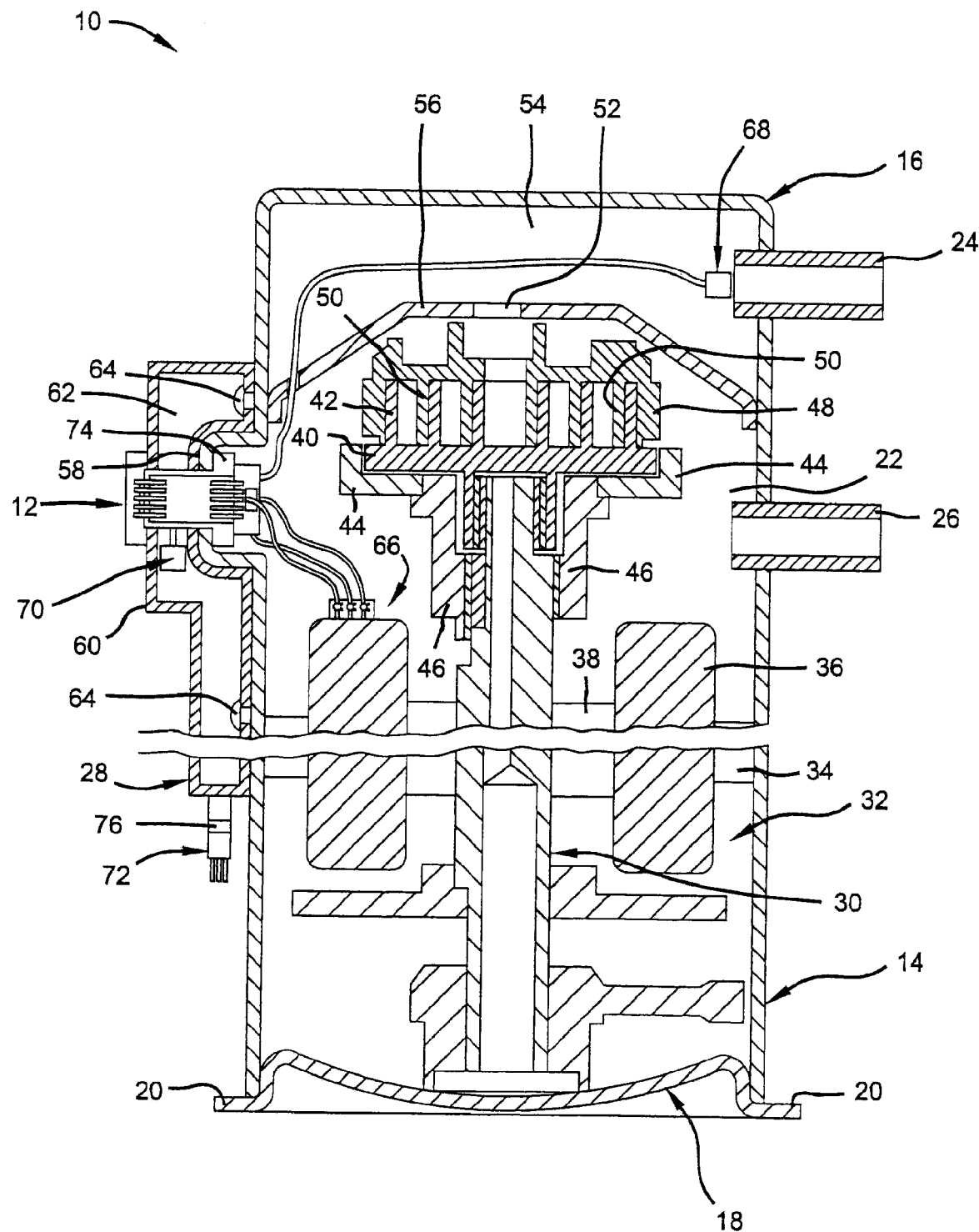
FIG. 3 is a cross-sectional view of the compressor of FIG. 1 incorporating a protection system in accordance with the principles of the present teachings.
Figure 4:
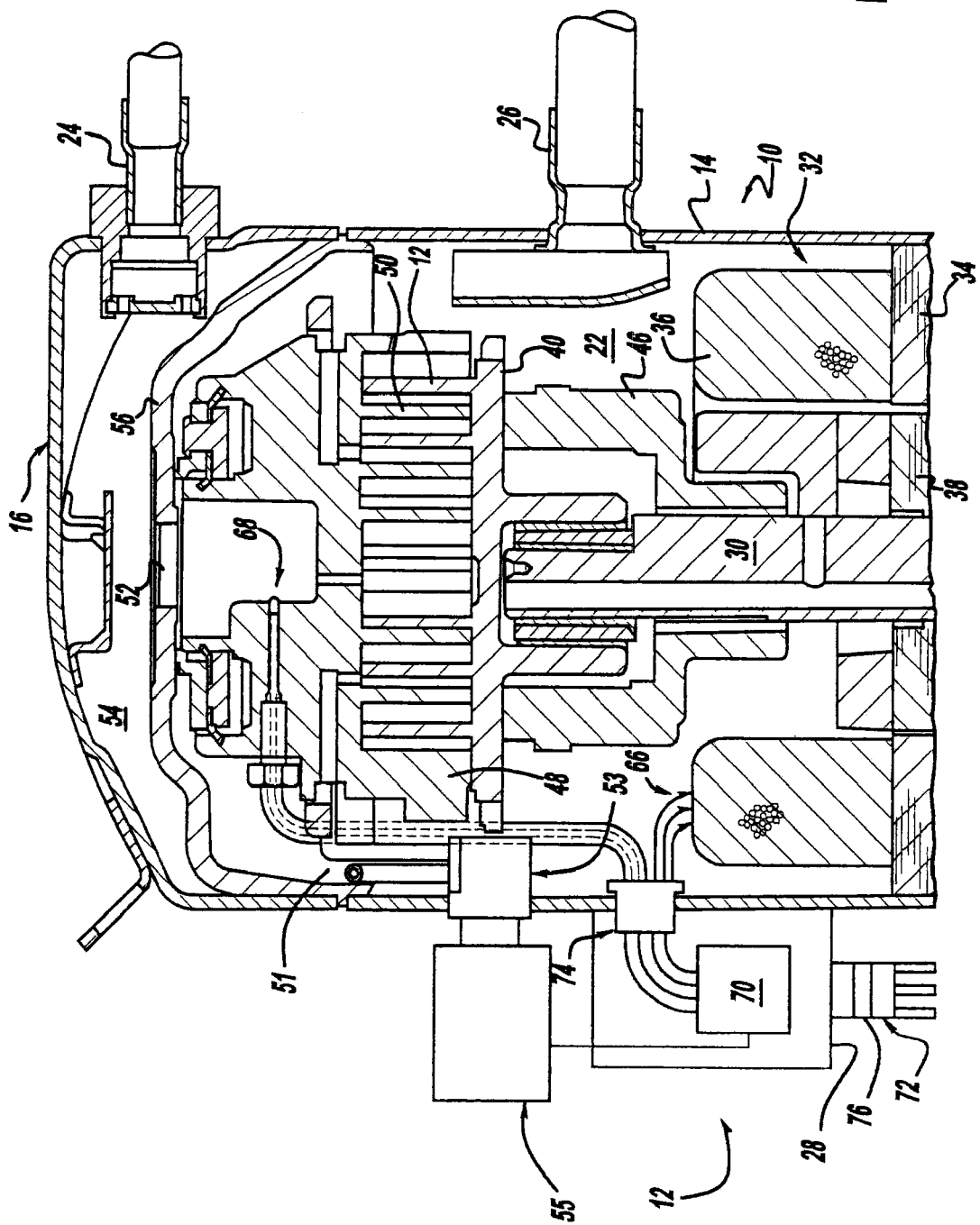
FIG. 4 is a cross-sectional view of a compressor incorporating a protection system in accordance with the present teachings.

With particular reference to FIGS. 1-4, the compressor 10 is shown to include a generally cylindrical hermetic shell 14 having a welded cap 16 at a top portion and a base 18 having a plurality of feet 20 welded at a bottom portion. The cap 16 and base 18 are fitted to the shell 14 such that an interior volume 22 of the compressor 10 is defined. The cap 16 is provided with a discharge fitting 24, while the shell 14 is similarly provided with an inlet fitting 26, disposed generally between the cap 16 and base 18, as best shown in FIGS. 2-4. In addition, an electrical enclosure 28 is fixedly attached to the shell 14 generally between the cap 16 and base 18 and operably supports a portion of the protection system 12 therein, as will be discussed further below.

A crankshaft 30 is rotatively driven by an electric motor 32 relative to the shell 14. The motor 32 includes a stator 34 fixedly supported by the hermetic shell 14, windings 36 passing therethrough, and a rotor 38 press fitted on the crankshaft 30. The motor 32 and associated stator 34, windings 36, and rotor 38 are operable to drive the crankshaft 30 relative to the shell 14 to thereby compress a fluid.

The compressor 10 further includes an orbiting scroll member 40 having a spiral vane or wrap 42 on the upper surface thereof for use in receiving and compressing a fluid. An Oldham coupling 44 is positioned between orbiting scroll member 40 and a bearing housing 46 and is keyed to orbiting scroll member 40 and a non-orbiting scroll member 48. The Oldham coupling 44 transmits rotational forces from the crankshaft 30 to the orbiting scroll member 40 to thereby compress a fluid disposed between the orbiting scroll member 40 and non-orbiting scroll member 48. Oldham coupling 44 and its interaction with orbiting scroll member 40 and non-orbiting scroll member 48 is preferably of the type disclosed in assignee's commonly-owned U.S. Pat. No. 5,320,506, the disclosure of which is incorporated herein by reference.

Non-orbiting scroll member 48 also includes a wrap 50 positioned in meshing engagement with wrap 42 of orbiting scroll member 40. Non-orbiting scroll member 48 has a centrally disposed discharge passage 52 which communicates with an upwardly open recess 54. Recess 54 is in fluid communication with discharge fitting 24 defined by cap 16 and partition 56, such that compressed fluid exits the shell 14 via passage 52, recess 54, and fitting 24. Non-orbiting scroll member 48 is designed to be mounted to bearing housing 46 in a suitable manner such as disclosed in the aforementioned U.S. Pat. Nos. 4,877,382 or 5,102,316, the disclosures of which are incorporated herein by reference.

Referring now to FIGS. 2 and 3, electrical enclosure 28 includes a lower housing 58, an upper housing 60, and a cavity 62. The lower housing 58 is mounted to the shell 14 using a plurality of studs 64 which are welded or otherwise fixedly attached to the shell 14. The upper housing 60 is mattingly received by the lower housing 58 and defines the cavity 62 therebetween. The cavity 62 may be operable to house respective components of the compressor protection and control system 12.

With particular reference to FIG. 4, the compressor 10 is shown as a two-step compressor having an actuating assembly 51 that selectively separates the orbiting scroll member 40 from the non-orbiting scroll member 48 to modulate the capacity of the compressor 10. The actuating assembly 51 may include a solenoid 53 connected to the orbiting scroll member 40 and a controller 55 coupled to the solenoid 53 for controlling movement of the solenoid 53 between an extended position and a retracted position.

Movement of the solenoid 53 in the extended position separates the wraps 42 of the orbiting scroll member 40 from the wraps 50 of the non-orbiting scroll member 48 to reduce an output of the compressor 10. Conversely, retraction of the solenoid 53, moves the wraps 42 of the orbiting scroll member 40 closer to the wraps 50 of the non-orbiting scroll member 48 to increase an output of the compressor 10. In this manner, the capacity of the compressor 10 may be modulated in accordance with demand or in response to a fault condition. The actuation assembly 51 is preferably of the type disclosed in assignee's commonly-owned U.S. Pat. No. 6,412,293, the disclosure of which is incorporated herein by reference.

With reference to FIGS. 2-11, the protection and control system 12 generally includes a pair of sensors 66, 68, processing circuitry 70, and a power interruption system 72. The sensors 66, 68 of protection and control system 12 detect cumulating parameters of the system 11 to diagnose operating conditions and faults under both normal and abnormal fault conditions. The parameters detected by sensors 66, 68 are referred to as cumulating sensors because the processing circuitry 70 diagnoses conditions of the compressor 12 and system 11 by analyzing trends and relationships among data detected by one or both of sensors 66, 68. In addition, the processing circuitry 70 may be in communication with controller 55 to control compressor modulation based on system conditions detected by sensors 66, 68 or faults determined by the processing circuitry 70.

Sensor 66 generally provides diagnostics related to high-side faults such as compressor mechanical failures, motor failures, and electrical component failures such as missing phase, reverse phase, motor winding current imbalance, open circuit, low voltage, locked rotor currents, excessive motor winding temperature, welded or open contactors, and short cycling. Sensor 66 monitors compressor current and voltage to determine, and differentiate between, mechanical failures, motor failures, and electrical component failures and may be mounted within electrical box 28, as shown in FIG. 2, or may be incorporated inside the shell 14 of the compressor 10, as shown in FIG. 3. In either case, sensor 66 monitors current draw by the compressor 10 and generates a signal indicative thereof, such as disclosed in assignee's commonly-owned U.S. Pat. No. 6,615,594 and U.S. patent application Ser. No. 11/027,757, filed on Dec. 30, 2004, which claims benefit of U.S. Provisional Patent Application No. 60/533,236, filed on Dec. 30, 2003, the disclosures of which are incorporated herein by reference.

Figure 16:
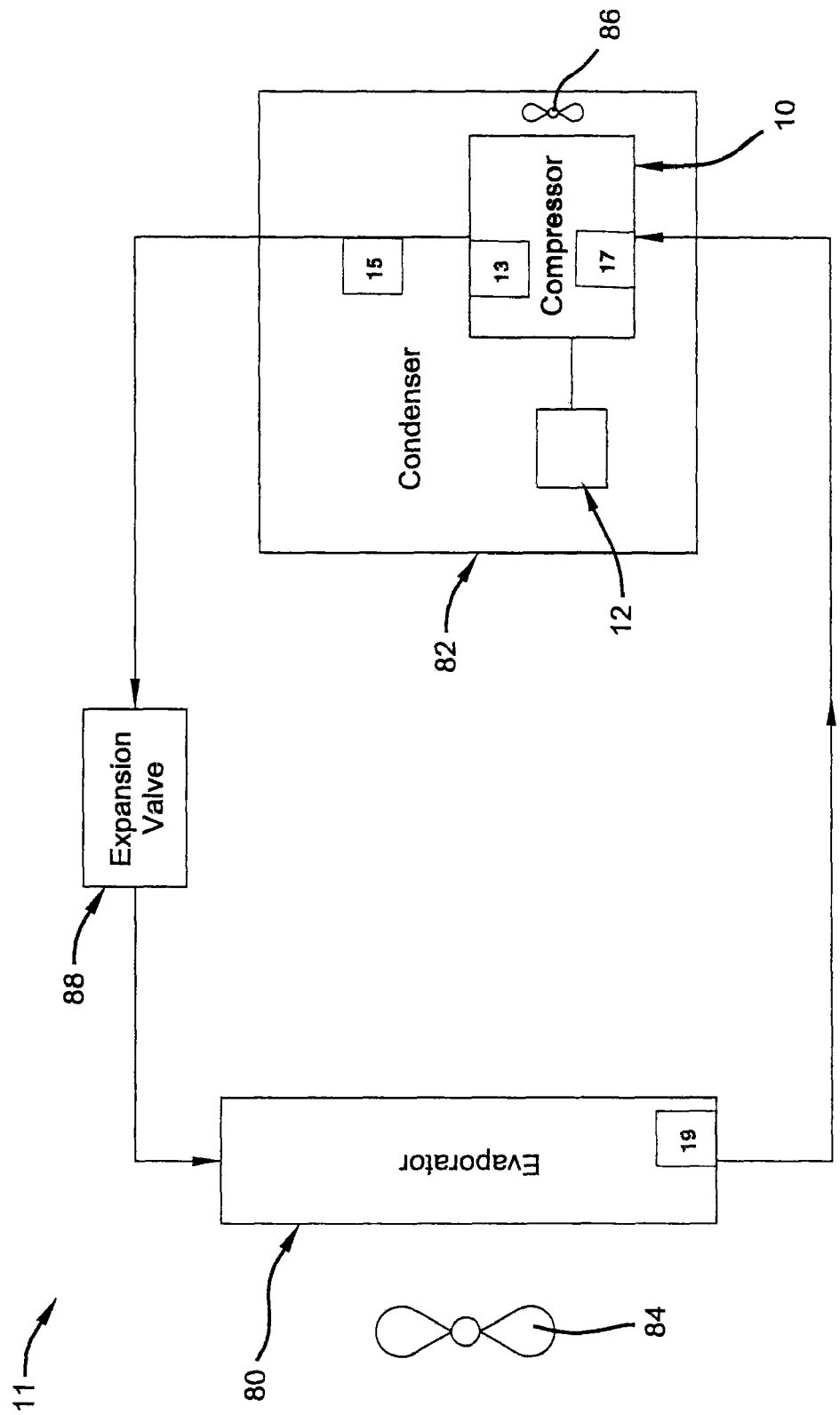
FIG. 16 is schematic of the compressor of FIG. 1 incorporated into a heat pump system.

While sensor 66 as described herein may provide compressor current information, the control system 12 may also include a discharge pressure sensor 13 mounted in a discharge pressure zone or a temperature sensor 15 mounted in an external system such as a condenser (FIG. 16). Any or all of the foregoing sensors may be used in conjunction with sensor 66 to provide the control system 12 with additional system information.

Sensor 66 provides the protection and control system 12 with the ability to quickly detect high-side faults such as a system fan failure or refrigerant overcharging without requiring independent sensors disposed throughout the compressor 10 and system 11. For example, because current drawn by the compressor 10 increases quickly with high-side pressure at a given voltage, a pressure increase at the high-side of the compressor 10 is quickly detected and reported to the processing circuitry 70 as the compressor 10 draws additional current. For example, when an internal compressor component experiences a fault, such as a locked-rotor condition, the compressor motor 32 draws additional current in an effort to free the locked condition. When the motor 32 draws additional current, sensor 66 detects the increase in current draw and signals the processing circuitry 70.

In general, sensor 66 measures current drawn by the motor 32 and indicates system high-side faults such as overcharged refrigerant, dirty heat-exchanger coils, or condenser-fan failure within the system 11. Each of the aforementioned faults causes the compressor 10 to increase the pressure of the refrigerant to force the refrigerant throughout the system 10. For example, when a heat-exchanger coil is blocked, a condenser fan is seized, or the refrigerant is overcharged, the refrigerant within the system 11 does not fully vaporize and the compressor 10 is forced to push liquid-phase refrigerant through the system 11.

The compressor 10 works harder to move liquid refrigerant through the system 11 versus moving a vaporized refrigerant through the same system 11 because liquid refrigerant experiences a greater frictional resistance (i.e., between the refrigerant and conduit(s) of the system 11). Furthermore, liquid refrigerant is more dense than vaporized refrigerant and therefore requires greater condenser pressure than would an equivalent amount of vaporized refrigerant. When the compressor 10 is forced to work harder, the motor 32 draws additional current, which is detected by sensor 66 and reported to the processing circuitry 70.

Sensor 68 generally provides diagnostics related to low-side faults such as a low charge in the refrigerant, a plugged orifice, a evaporator blower failure, or a leak in the compressor. Sensor 68 may be disposed proximate to the discharge outlet 24 or the discharge passage 52 (FIG. 4) of the compressor 10 and monitors a discharge line temperature of a compressed fluid exiting the compressor 10. The sensor 68 may be located proximate to the compressor outlet fitting 24, generally external to the compressor shell 14, as shown in FIG. 2. Locating sensor 68 external of the shell 14, allows flexibility in compressor and system design by providing sensor 68 with the ability to be readily adapted for use with practically any compressor and in any system.

While sensor 68 may provide discharge line temperature information, the control system 12 may also include a suction pressure sensor 17 or low-side temperature sensor 19 (i.e., either mounted proximate an inlet of the compressor 10 or mounted in an external system such as an evaporator). Any, or all of the foregoing sensors may be used in conjunction with sensor 68 to provide the control system 12 with additional system information.

While sensor 68 may be positioned external to the shell 14 of the compressor 10, the discharge temperature of the compressor 10 may similarly be measured within the shell 14 of the compressor 10, as shown in FIG. 3. A discharge port temperature, taken generally at the discharge fitting 24, could be used in place of the discharge line temperature arrangement shown in FIG. 2. A hermetic terminal assembly 74 may be used with such an internal discharge temperature sensor to maintain the sealed nature of the compressor shell 14, and, can easily be accommodated by a hermetic terminal assembly.

Sensor 68 provides the protection and control system 12 with the ability to quickly detect low-side faults such as a blower failure or a loss of refrigerant charge without requiring independent pressure and suction-temperature sensors disposed throughout the compressor 10 and system 11. The sensor 68 detects and monitors discharge line temperature, and, as such, is a strong cumulating point of compression heat. Thus, sensor 68 is able to quickly detect a rise in temperature within the compressor 10 and send a signal to the processing circuitry 70.

Common causes of an increased discharge line temperature include a loss of refrigerant charge or a restricted flow of refrigerant due to blower failure or blocked orifice because the amount of refrigerant entering the low-side, or suction side, of the compressor 10 is reduced. When the flow of refrigerant is decreased, the power consumed by the compressor motor 32 and associated internal components exceeds the amount needed to compress the entering refrigerant, thereby causing the motor 32 and associated internal components of the compressor 10 to experience a rise in temperature. The increased motor and component temperature is partially dissipated to the compressed refrigerant, which is then superheated more than under normal operating conditions. Sensor 68 detects the increase in compressed refrigerant temperature as the refrigerant exits the shell 14 through discharge fitting 24.

Figure 5:
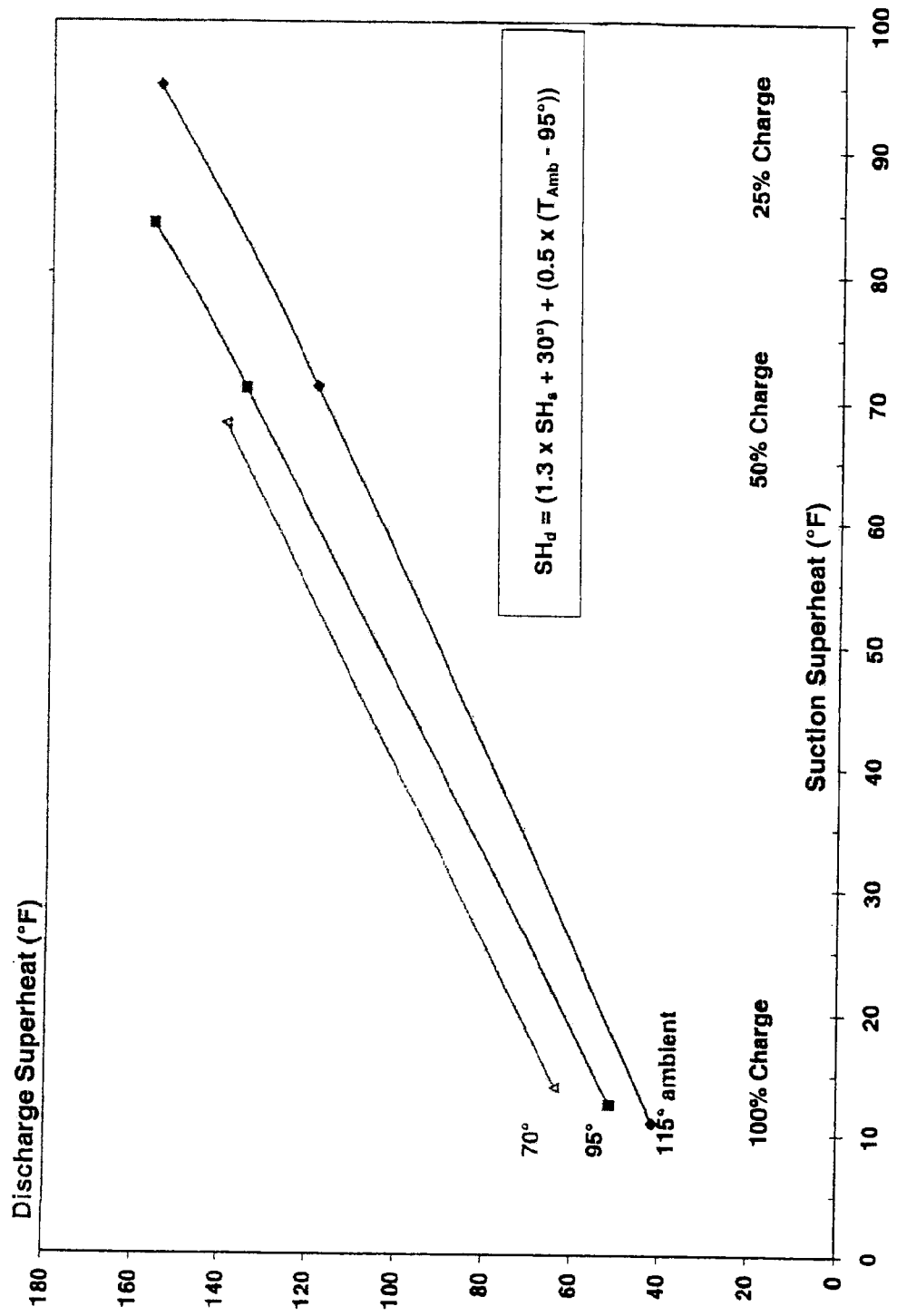
FIG. 5 is a graphical representation of discharge superheat versus suction superheat.

The relationship between discharge superheat and suction superheat is provided in FIG. 5. In general, the relationship between discharge superheat and suction superheat is generally linear under most low-side fault conditions and governed by the following equation where $SH_d$ is discharge superheat, $SH_s$ is suction superheat, and $T_{Amb}$ is ambient temperature:

$$SH_d = (1.3 * SH_s + 30 \text{ degrees F.}) + (0.5 * (T_{Amb} - 95 \text{ degrees F.}))$$

The generally linear relationship between suction superheat and discharge superheat allows sensor 68 to quickly detect an increase in suction superheat, even though sensor 68 is disposed near an outlet of the compressor 10. The relationship between discharge temperature and suction temperature is further illustrated in FIG. 6, which shows how discharge line temperature is affected by an increase in suction line temperature. The relationship shown in FIG. 6 allows sensor 68 to quickly detect a low side fault caused by a high suction temperature (such as a low charge condition or a plugged orifice), even though sensor 68 is disposed near an outlet of the compressor 10.

Figure 6:
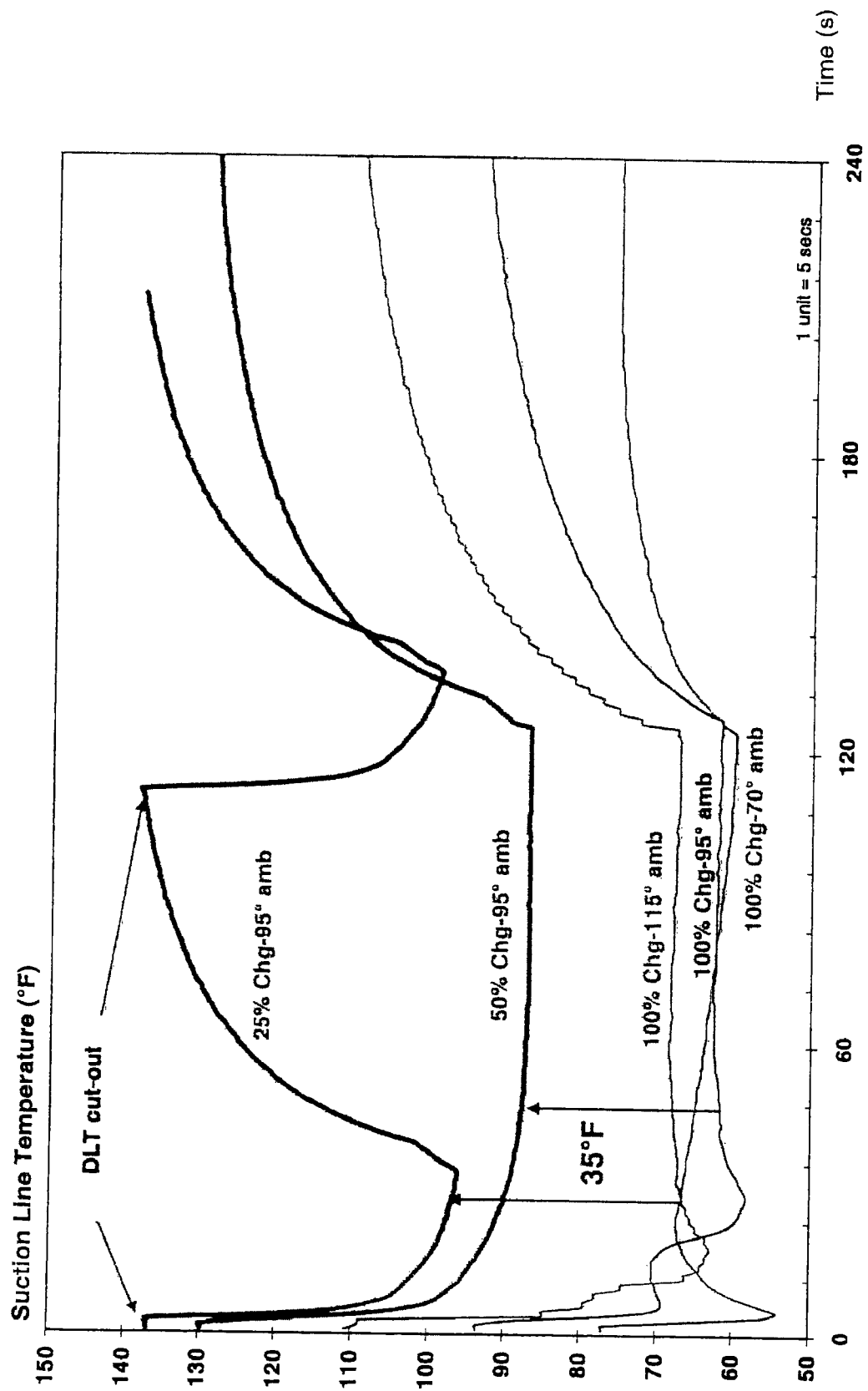
FIG. 6 is a graphical representation showing discharge line temperature due to increased suction temperature.
Figure 7:
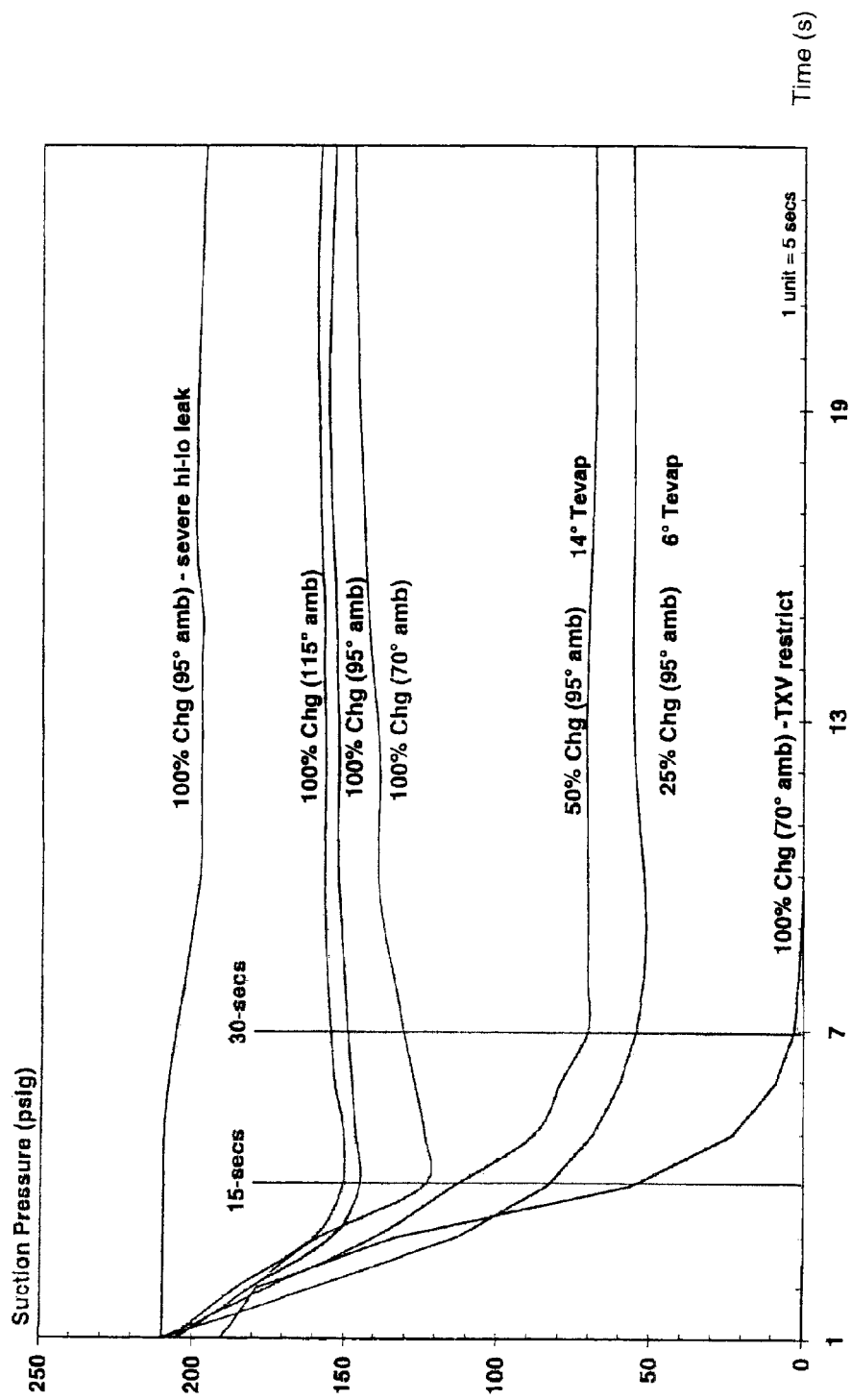
FIG. 7 is a graphical representation showing that an increased discharge line temperature reflects a fast decline in suction pressure.

In addition to determining low-side faults associated with a rise in suction temperature, sensor 68 is also able to detect faults associated with changes in suction pressure. FIG. 7 shows how suction pressure decreases rapidly for a low-side fault, such as loss of charge or compressor high-low leak. The rapid decrease in suction pressure causes a concurrent increase in suction, thus causing an increase in discharge line temperature, as shown in FIG. 6. Therefore, the control system 12 is able to declare a low-side fault (such as a restricted thermal expansion valve) based on readings from sensor 68, as will be described further below with respect to FIGS. 12 and 13.

When the compressor 10 is initially started after a sufficiently long off period, the initial discharge line temperature is generally close to-ambient temperature as the compressor 10 has yet to cycle refrigerant through the system. To account for different environments (i.e., different ambient conditions), and to reduce the influence of the environment on the ability of sensor 68 to quickly and accurately monitor the discharge line temperature, sensor 68 monitors the rise in discharge line temperature within the first thirty to sixty seconds following startup of the compressor 10.

The sensor eliminates the necessity of the compressor 10 to reach a steady state prior to taking a temperature reading. For example, suction pressure decreases the fastest during the first thirty to sixty seconds of compressor operation under low-side fault conditions. The decrease in suction pressure results in a higher compression ratio and more overheating. The overheating is detected by sensor 68 within the first thirty to sixty seconds of compressor operation. Without such an arrangement, sensor 68 may become sensitive to the surrounding environment, thereby increasing the time in which sensor 68 must wait to take a temperature reading. By taking the temperature reading shortly after startup (i.e., within thirty to sixty seconds), sensor 68 is able to quickly and consistently detect a low-side fault such as loss of suction pressure, independent of ambient conditions.

Figure 8:
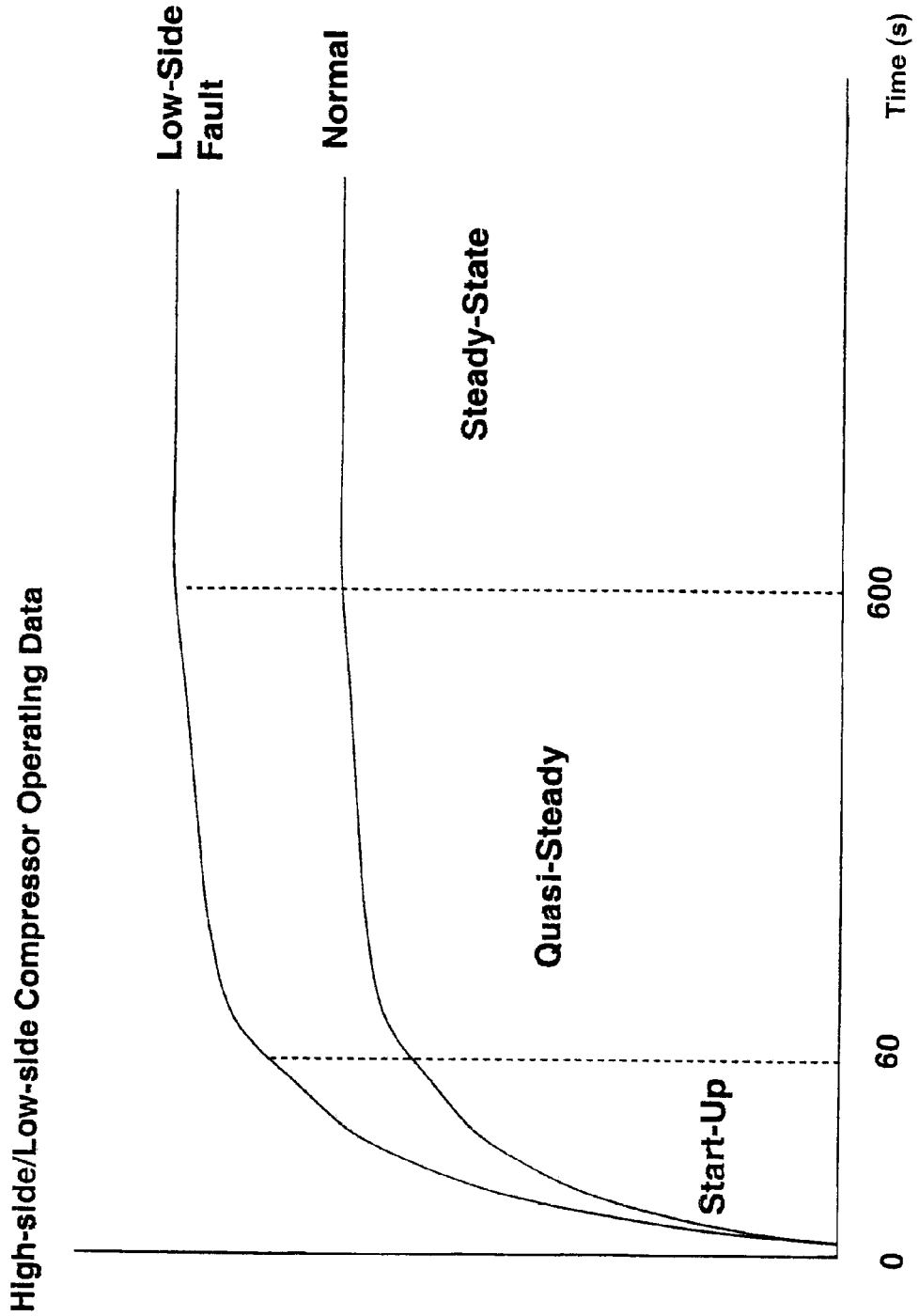
FIG. 8 is a graphical representation showing three phases of compressor operation; start-up, quasi-steady state, and steady state.

Generally speaking, a high-side or a low-side sensor value changes with three basic operating stages of the compressor 10; start-up, quasi-steady state, and steady-state. The values taken at each stage may be used by the control system 12 to monitor and diagnose high-side and low-side faults. For example, FIG. 8 shows a plot of a high-side or low-side sensor during start-up, quasi-steady state, and steady-state stages of an exemplary compressor 10. For a normal plot, discharge line temperature and current should typically increase gradually during the first sixty seconds of start-up and should start to become more linear during the quasi-steady state stage, which could take approximately 10 minutes. Once in the steady-state stage, the plot should be constant (i.e., no changes in readings taken by sensors 66, 68) and should remain as such throughout operation of the compressor 10 unless ambient temperature changes suddenly. By monitoring the rate of change of sensors 66, 68 over time, each time period (i.e., start-up, quasi-steady state, and steady state) can be determined for various operating ambient temperatures.

For example, a defrost cycle can be detected for a heat pump operating in a heating mode when the sensors 66, 68 detect a sudden change in current and/or discharge line temperature. The change in current and discharge line temperature is a result of the compressor 10 ceasing operation to allow the system 11 to perform a defrost. Therefore, sensors 66, 68, in combination with processing circuitry 70, are able to detect a defrost cycle during compressor start-up, quasi-steady state, and steady-state operating conditions.

If a defrost cycle is not realized for a predetermined amount of time (i.e., generally more than six hours of compressor run time) than the control system 12 can declare a stuck reversing valve. When the steady-state is not realized, such that sensors 66, 68 do not reach a stabilized state, the control 12 system may declare that a thermal expansion valve is "hunting." The thermal expansion valve is deemed to be "hunting" when the valve continuously modulates its position (i.e., "hunting" for a steady-state position).

For a low-side fault, discharge line temperature increases more rapidly during start-up as compared to the normal plot. As such, higher sensor values are realized during the quasi-steady state and steady-state stages. Therefore, the control system 12 is able to quickly determine a low-side fault based on the sharp rise in discharge line temperature during start-up and then is further able to confirm the fault when higher-than-normal conditions are also realized during both the quasi-steady state and steady-state stage.

Figure 12:
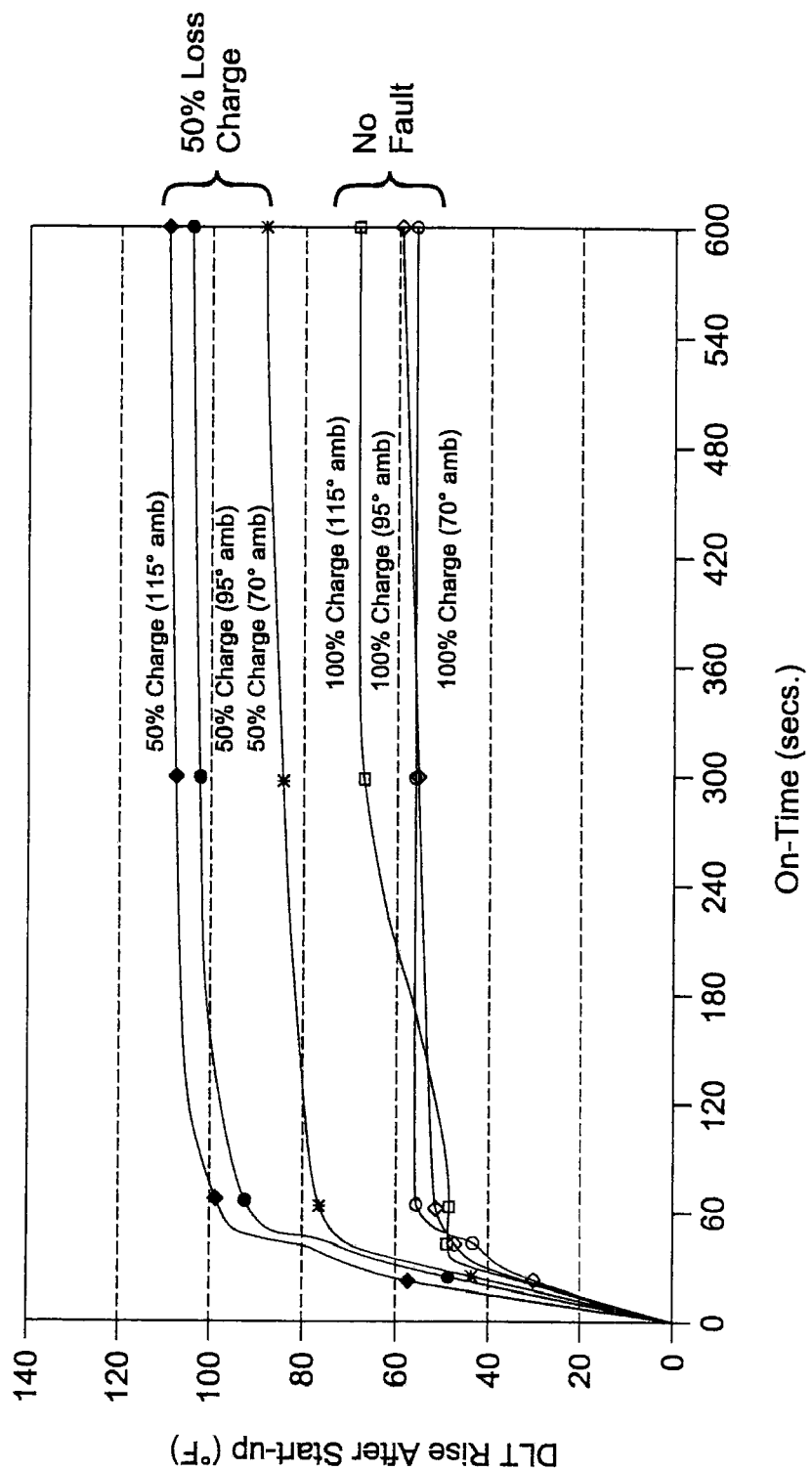
FIG. 12 is a graphical representation of a low-side sensor response as represented by the compressor discharge line temperature under a normal condition versus a low-refrigerant charge condition.
Figure 13:
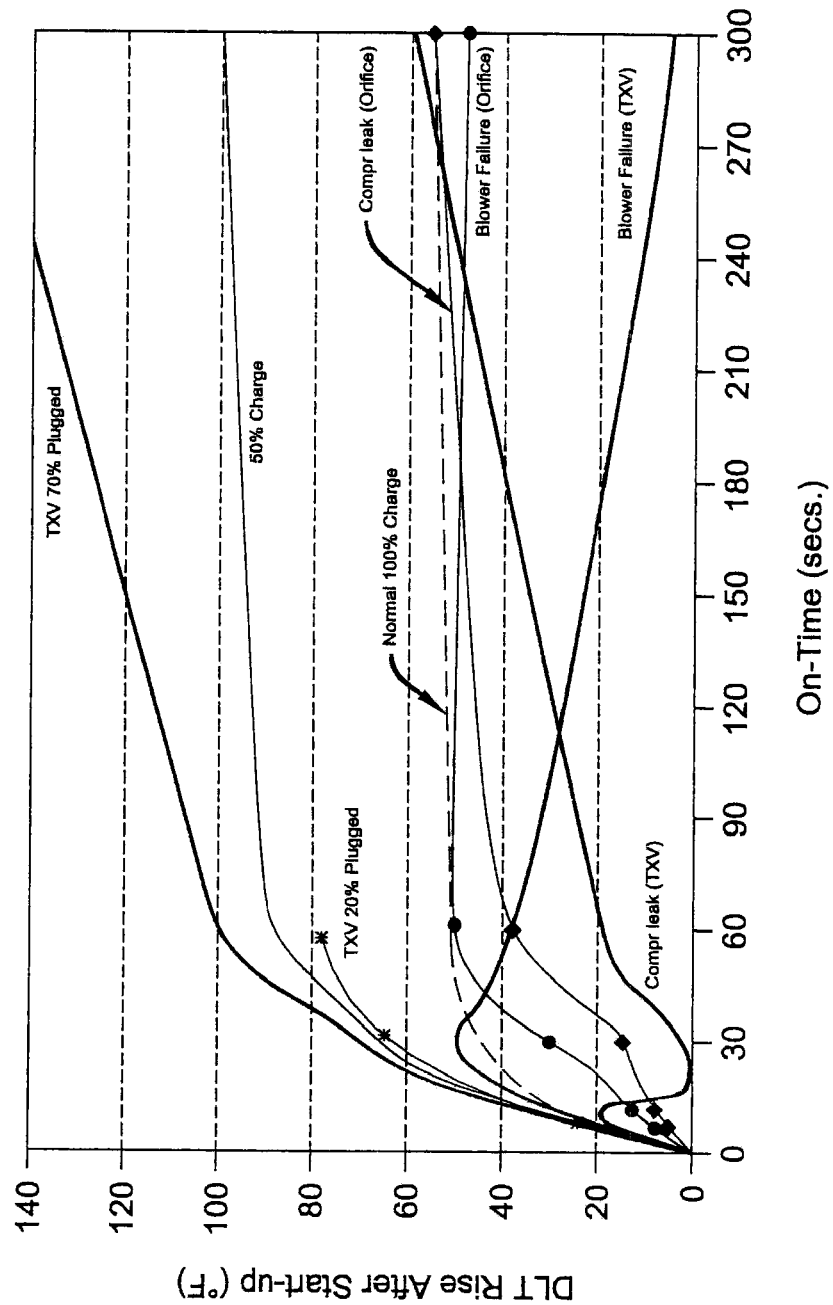
FIG. 13 is a graphical representation of how other fault modes could be differentially detected by a discharge line temperature sensor within the first 30-60 second period versus longer time periods after compressor start up.

Sensor 68 monitors the discharge line temperature of the compressor 10 during periods where the responses in suction and/or discharge pressures are most representative of the system fault. In other words, depending on the correlation between the sensed temperature and the time in which the temperature is taken, indicates a particular fault. Discharge line temperature typically increases with compression ratio and suction superheat. Therefore, several specific low-side system faults can be differentiated such as restricted flow orifice, system fan failure (i.e., an evaporator or condenser fan, etc.), loss of refrigerant charge, or compressor internal leak by analyzing the different discharge line temperature signatures. FIG. 12 shows an example of a low-side sensor response as represented by the compressor discharge line temperature under normal condition versus a low-refrigerant charge condition. It can be seen that the rise in discharge line temperature is significantly different in the first thirty to sixty seconds as well as during the steady-state condition between the normal and low-side fault modes. FIG. 13 shows further an illustration of how all other fault modes could be detected differentially by sensor 68 within the first thirty to sixty second period versus the longer time periods after compressor start up.

The thirty to sixty second time period can be adjusted as needed to accommodate differences between cooling and heating modes of a heat pump through use of an ambient temperature sensor (described below). It should be noted that it is also possible to set this time period differently for various capacity stages in the case of a variable-capacity compressor. By comparing the signals produced by sensor 66 with those with sensor 68, low-side and high-side faults can be accurately and quickly differentiated by the processing circuitry 70, as will be discussed further below.

Figure 10:
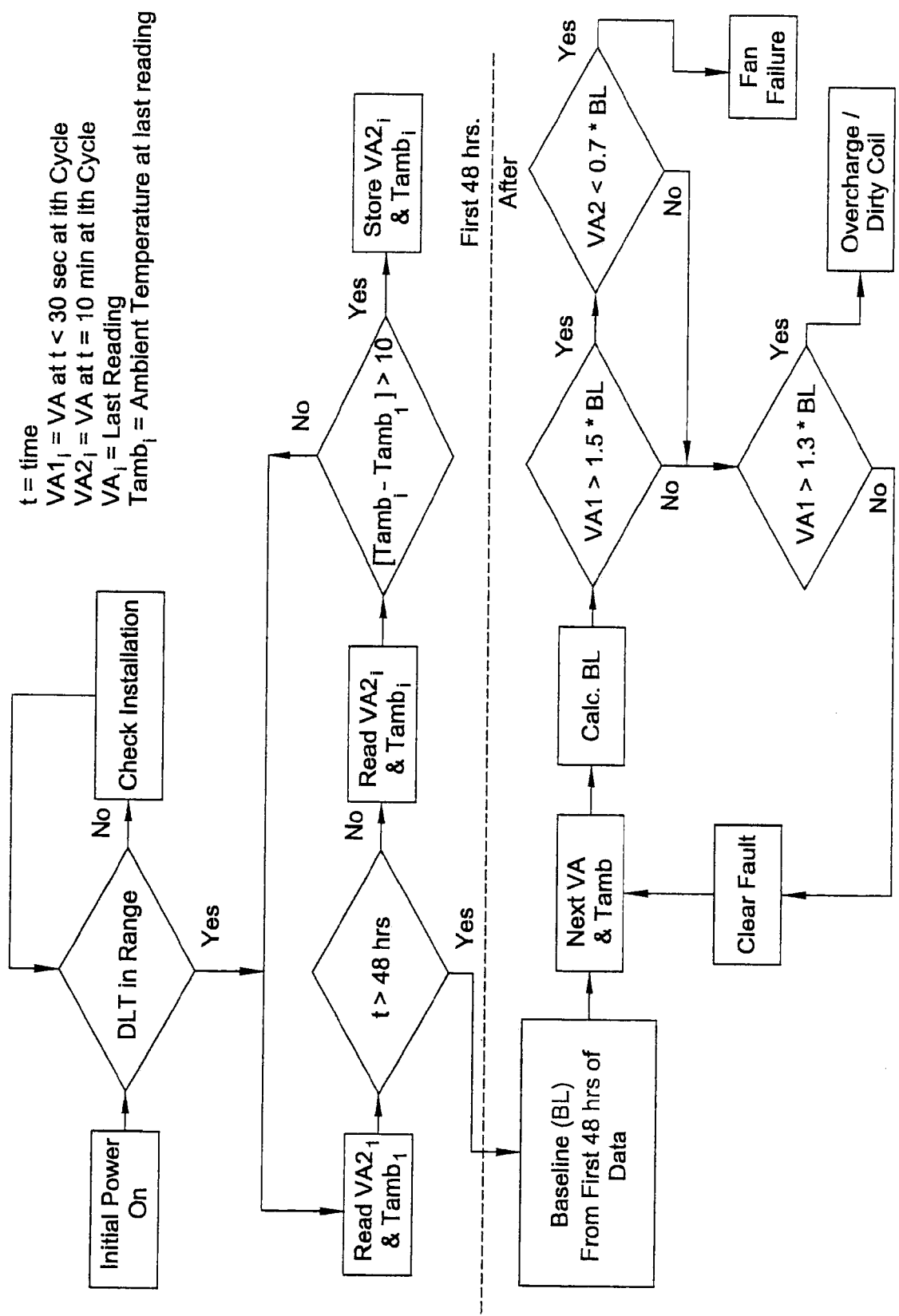
FIG. 10 is a flow-chart depicting a high-side control algorithm for the protection system of FIG. 9.
Figure 11:
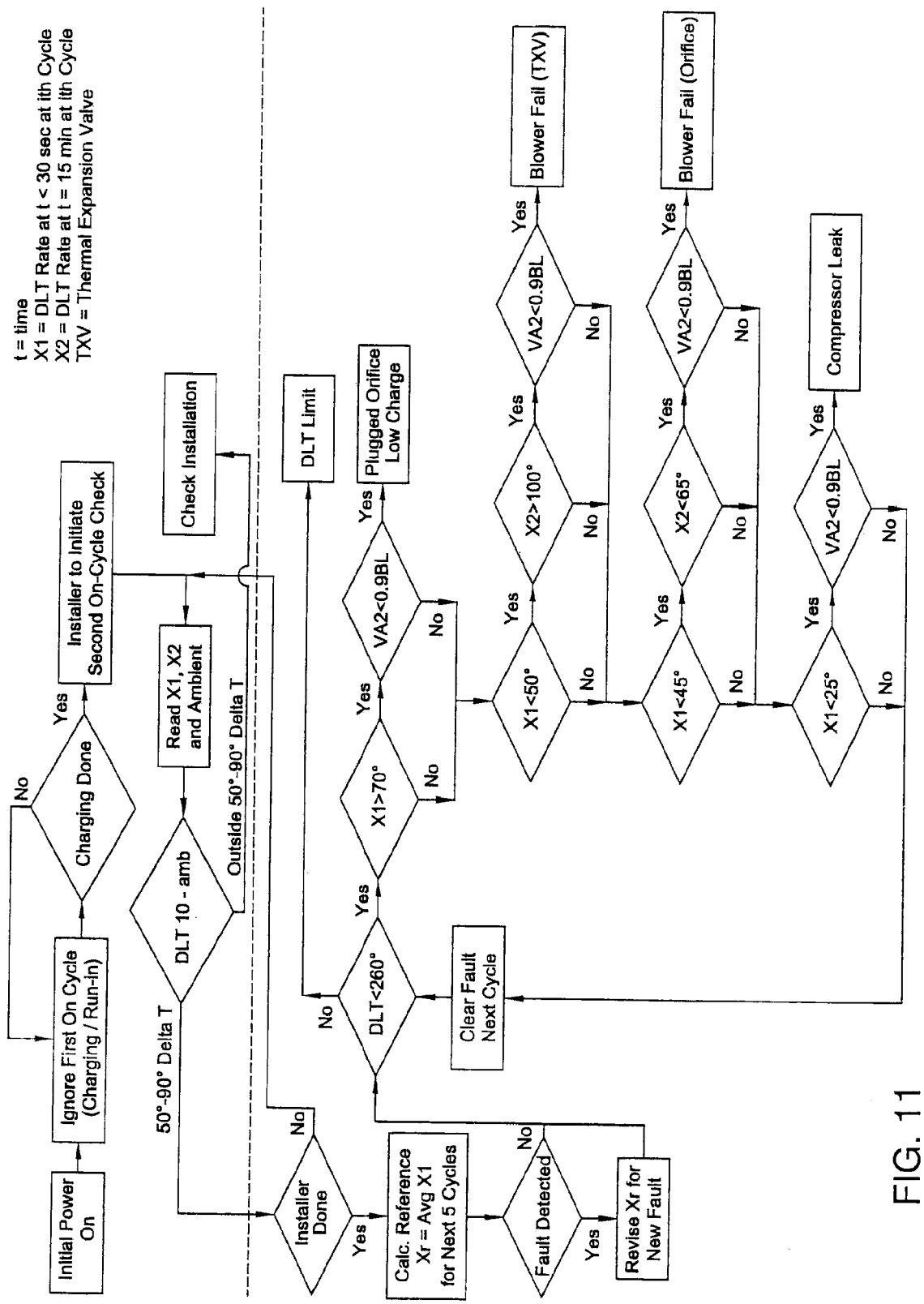
FIG. 11 is a flow-chart depicting a low-side control algorithm for the protection system of FIG. 9.

The high-side and low-side signals produced by sensors 66, 68, respectively, are sent to the processing circuitry 70 to compare the operating parameters to base-line parameters, as shown in FIGS. 10 and 11. The base-line parameters are determined at installation of the compressor 10 to determine "normal" or no-fault operating conditions for the compressor 10 and system 11.

At installation, the "signature" of compressor current versus time is determined for use in differentiating high-side faults such as condenser fan failure versus refrigerant overcharging. The "signature" of the compressor current versus time is referred to as the baseline reading (BL) for the system and is used in determining fault conditions. The calibration of sensor 66 for a particular compressor size or installation can be avoided by adaptively detecting the normal, no-fault current versus ambient temperatures during the first 24 to 48 hours of operation following initial installation.

Figure 14:
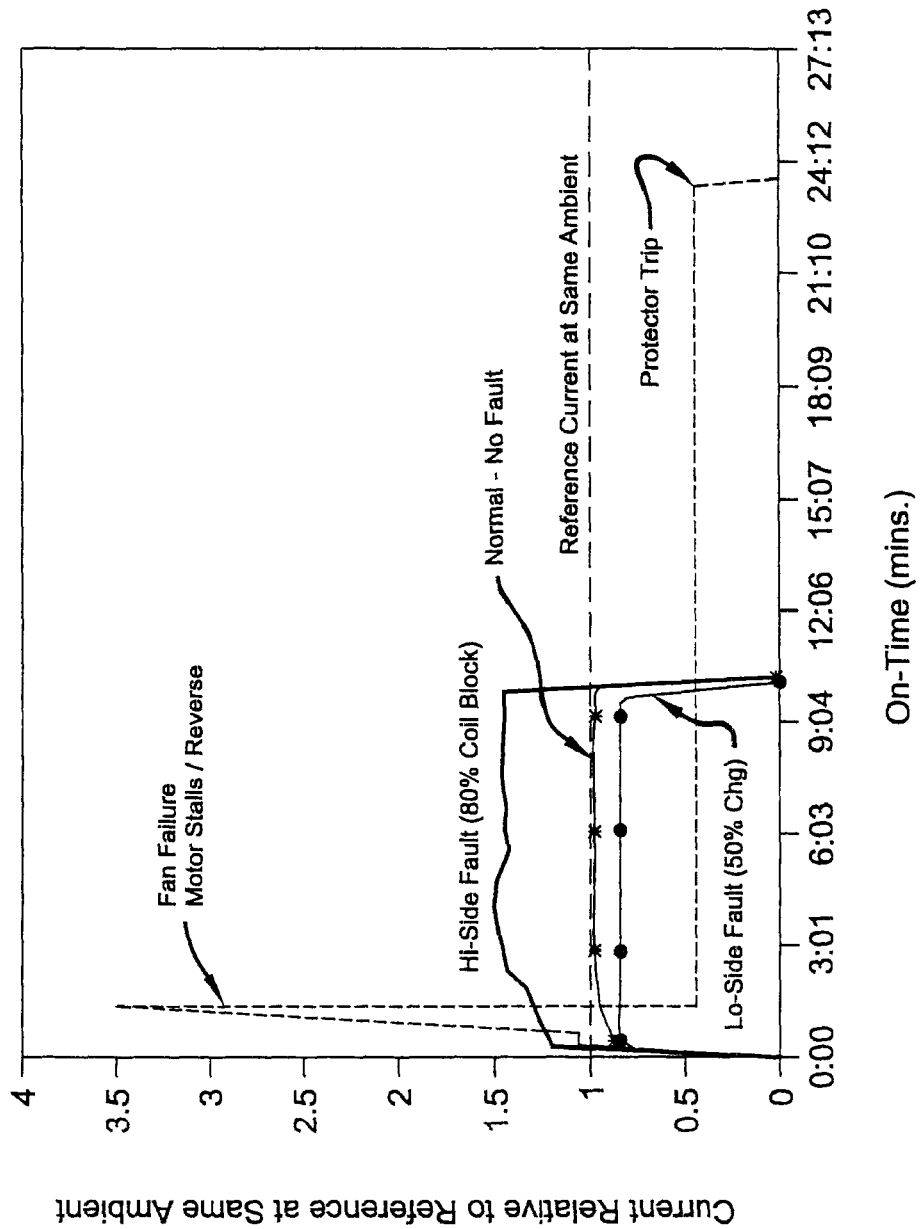
FIG. 14 is a graphical representation of a high-side fault based on the value of measured current being relatively higher than nominal.

The no-fault signature of current versus time provides the processing circuitry 70 with a baseline to use in comparing current sensed by sensors 66, 68. For example, the processing circuitry 70 will declare a high-side fault when the sensed current exceeds this initial baseline value by a predetermined amount, as shown in FIG. 14. It should be noted that in addition to sensor 66, that voltage sensing might further be required to allow for adjustment for current due to voltage fluctuation in the field.

An ambient temperature sensor 76 is provided for use in calculating the compressor current versus time, whereby the ambient temperature sensor 76 provides the ambient temperature for the given environment. For lower cost, the ambient sensor 76 can also be incorporated directly onto an electronic circuitry board of the controller that provides the processing circuitry 70. Alternatively, the ambient temperature for a given environment can be determined by performing a regression equation fitting the discharge line temperature, the sensed ambient temperature reading, and the compressor-off time. Also, the initial discharge line temperature value determined at compressor start-up can be used as an approximation of ambient temperature as ambient temperature does not usually change over the first ten to 15 minutes of compressor operation.

With particular reference to FIGS. 9-17, operation of the protection and control system 12 will be described in detail. Generally speaking, the compressor protection and control system 12 uses the compressor 10 as a system sensor with two cumulating parameters. Because a high-side fault typically causes a faster response than a low-side fault, the priority is to first use compressor current to determine if a high-side fault exists before proceeding to determine any low-side faults. In this manner, the compressor protection and control system 12 is able to quickly sense and differentiate between high-side and low-side faults.

FIG. 16 shows the compressor 10 incorporated into a heat pump system 11 having an evaporator coil 80, a condenser 82, an evaporator fan 84, a condenser fan 86, and an expansion device 88. The protection and control system 12 is incorporated into the system 11 to detect and differentiate between high-side faults such as system fan failure or refrigerant overcharging and low-side faults such as evaporator or condenser fan failure and low-refrigerant charge.

At installation, the baseline signature of compressor current versus time is determined for use in differentiating high-side faults. Once the baseline is determined, the processing circuitry 70, in combination with sensors 66, 68, serves to monitor and diagnose particular compressor and system faults. The processing circuitry 70 works in conjunction with sensors 66, 68 to direct the power interruption system 72 to toggle the compressor between a normal operating mode, a reduced-capacity mode, and a shutdown mode.

Control algorithms for sensors 66, 68 are provided at FIGS. 10 and 11. It should be noted that the data ranges defining individual high-side and low-side faults in FIGS. 10 and 11 are exemplary in nature, and as such, may be modified for different systems.

At startup of the compressor 10, sensor 66 measures the relative current (i.e., as compared to the baseline) to determine if a high-side fault exists. The processing circuitry 70 receives current and voltage data from sensor 66 and processes the data into a power-consumption-over-time signature. Specifically, the processing circuitry 70 receives the current and voltage data and determines the power (VA) by the following formula: VA=current*voltage. The power value (VA) is then compared to the baseline signature (BL) determined at installation under normal/no-fault operating conditions.

If the power drawn by the motor 32 is greater than about 1.3 times the baseline signature (current over time) for the first 30 seconds of operation, the processing circuitry 70 determines a high-side fault. The processing circuitry 70 determines a high-side fault (either that the refrigerant is overcharged or that the condenser coil is dirty) based on the value of the measured current being relatively higher than nominal (i.e., about 1.3 times the baseline signature), as shown in FIGS. 10 and 14. In contrast, the processing circuitry 70 determines a low-side fault (either low refrigerant or evaporator coil is dirty) based on the measured current being relatively lower than nominal (i.e., about 0.9 times the baseline signature).

If the detected value is about 1.5 times greater than the baseline signature within 30 seconds of operation and the current drawn by the motor 32 after the first ten minutes is less than about 0.7 times the base line value, the processing circuitry 70 indicates a different high-side failure mode. Specifically, if the current drawn by the motor 32 is greater than about 1.5 times the baseline value for the first 30 seconds and the current drawn by the motor 32 after the first ten minutes is less than about 0.7 times the base line value, then the processing circuitry 70 indicates a condenser-fan failure, as best shown in FIG. 14. This significant change is detected as a condition due to compressor motor stalling and reversing direction. In either event, the processing circuitry 70 will direct the power interruption system 72 to restrict power to the compressor 10 to either stop operation or to allow the compressor 10 to function in a reduced capacity.

Figure 15:
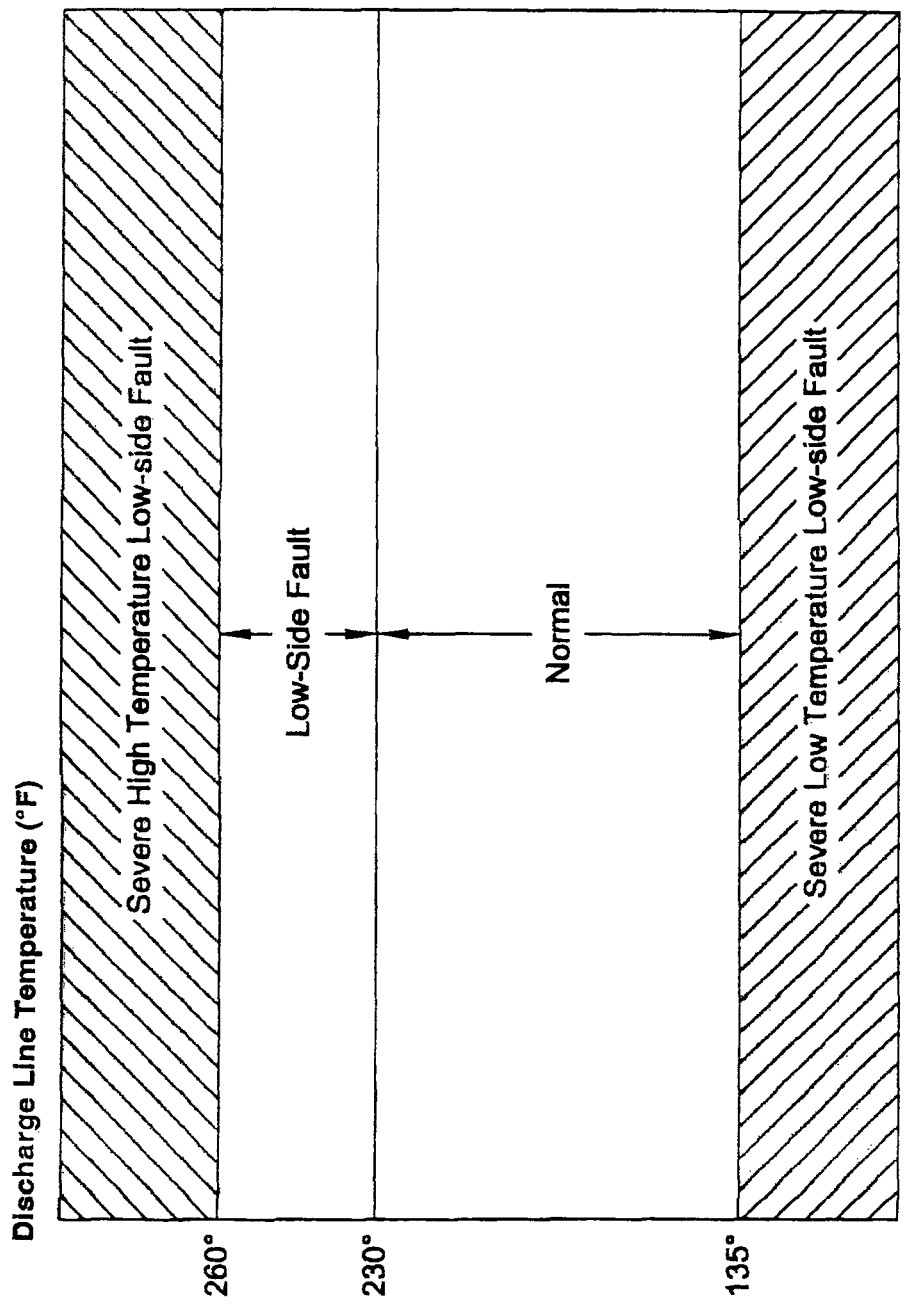
FIG. 15 is a graphical representation of operating modes for a compressor.

Sensor 68 works with sensor 66 to provide the processing circuitry 70 with enough information to quickly and accurately determine the compressor and system operating parameters within 30 seconds of startup. Within the first 30 seconds of startup, sensor 68 measures discharge line temperature and creates a signal indicative thereof. The signal is sent to the processing circuitry 70 to determine the proper operating mode for the compressor (i.e., normal mode, reduced-capacity mode, or shutdown mode), as shown in FIG. 15.

If the sensed temperature rise after compressor start up is greater than 70 degrees for example (roughly 1.5 times normal), and the power consumption is less than about 0.9 times the baseline value after ten minutes, a low charge or plugged orifice fault is declared, as best shown in FIG. 13. If the sensed temperature rise is less than 50 degrees within the first 30 seconds of operation, but greater than 100 degrees after 15 minutes of operation, with a power value of less than about 0.9 times the baseline after ten minutes of operation, a blower failure or thermal expansion valve failure is declared, as best shown in FIG. 13. If the sensed temperature is less than 45 degrees after the first 30 seconds of operation, but greater than 25 degrees after the first 15 minutes of operation, with a power value of less than about 0.9 times the baseline after ten minutes of operation, a blower failure or plugged orifice fault is declared. Finally, if the sensed temperature is less than 25 degrees, with a power value of less than about 0.9 times the baseline after ten minutes of operation, a compressor leak is declared.

If the processing circuitry 70 determines that the compressor 10 and system 11 are functioning within predetermined operating parameters, the system 70 will allow operation of the compressor 10 and system 11. The processing circuitry 70 works in conjunction with sensors 66, 68 to differentiate between a high-side and a low-side compressor and system faults. Additionally, the processing circuitry 70 and sensors 66, 68 function to differentiate between specific high-side and low-side faults to direct a homeowner or serviceperson to the particular compressor or system fault. In doing so, the priority is to first use compressor current to determine if there is a high-side fault before proceeding to determine any low-side faults. In this manner, the two faults (i.e., high-side and low-side) can be differentiated over time in terms of which occurred first to quickly and accurately determine a specific high or low-side fault.

Figure 9:
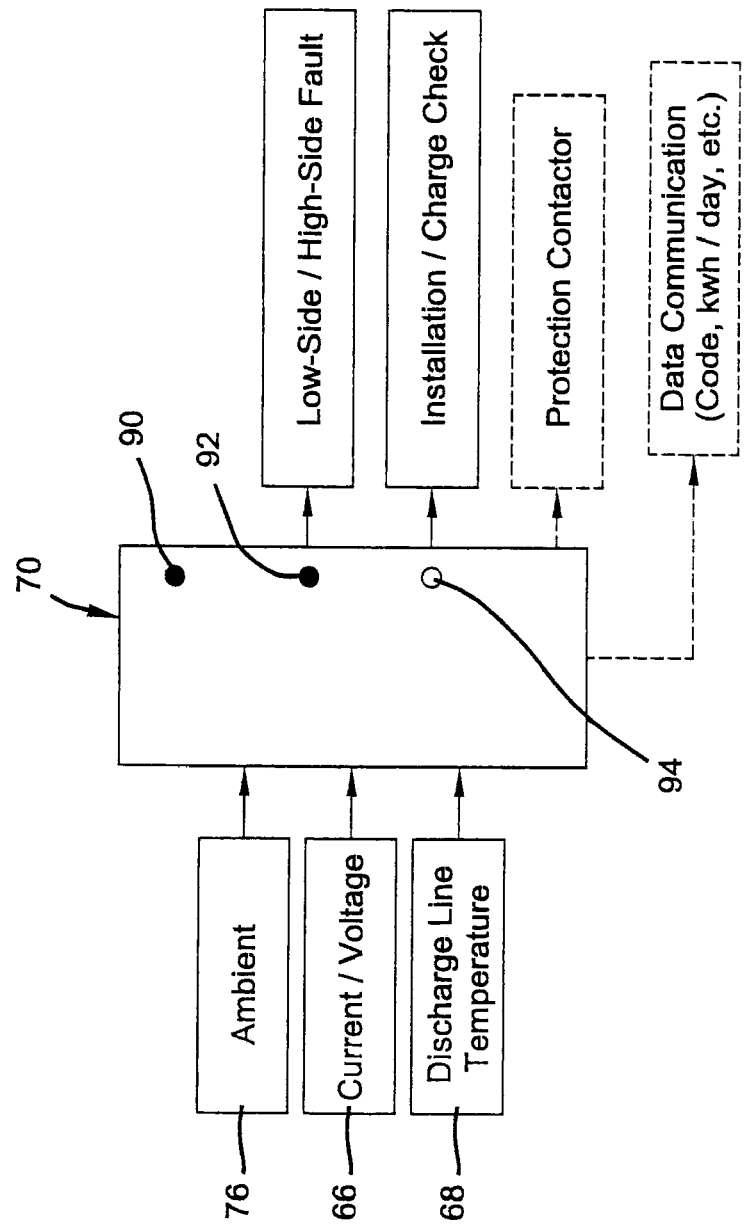
FIG. 9 is a schematic representation of the protection system of FIG. 2.

The protection and control system 12 further includes a plurality of light emitting devices (LEDs) to alert a user as to the state of the compressor and system 10, 12. In one configuration, the system 12 includes a green LED, a yellow LED, and a red LED 90, 92, 94, as shown in FIGS. 1 and 9. The green LED 92 is illuminated when the compressor is functioning under normal conditions and no fault is detected by sensors 66, 68. The yellow LED 94 is illuminated to designate a system fault. Specifically, if the sensors 66, 68 detect a fault condition using the control algorithms previously discussed, the processing circuitry 70 will illuminate the yellow LED 92 to alert a user of a system fault. It should be noted that the when a system fault is detected, but the compressor 10 is otherwise functioning normally, that the yellow LED 92 will be illuminated to denote that the compressor 10 is functioning within predetermined acceptable parameters, but that the system 11 is experiencing a system-related fault.

The red LED 94 is only illuminated when the compressor 10 experiences an internal compressor fault. In this manner, when both the compressor 10 and system 11 experience a fault, both the green and red LEDs 90, 94 will be illuminated. When a compressor fault is detected, only the red LED 94 will be illuminated. In sum, the green, yellow, and red LEDs 90, 92, 94 are independently illuminated to specifically differentiate between compressor and system faults. Such a distinction proves to be a valuable tool to the user or repairperson. For example, a user or repairperson can quickly look to the LEDs 90, 92, 94, displayed on the electrical box 28 of the compressor 10, and quickly diagnose the problem. As can be appreciated, such a diagnostic system prevents incorrect diagnosis and unnecessary replacement of functioning compressors.

Figure 17:
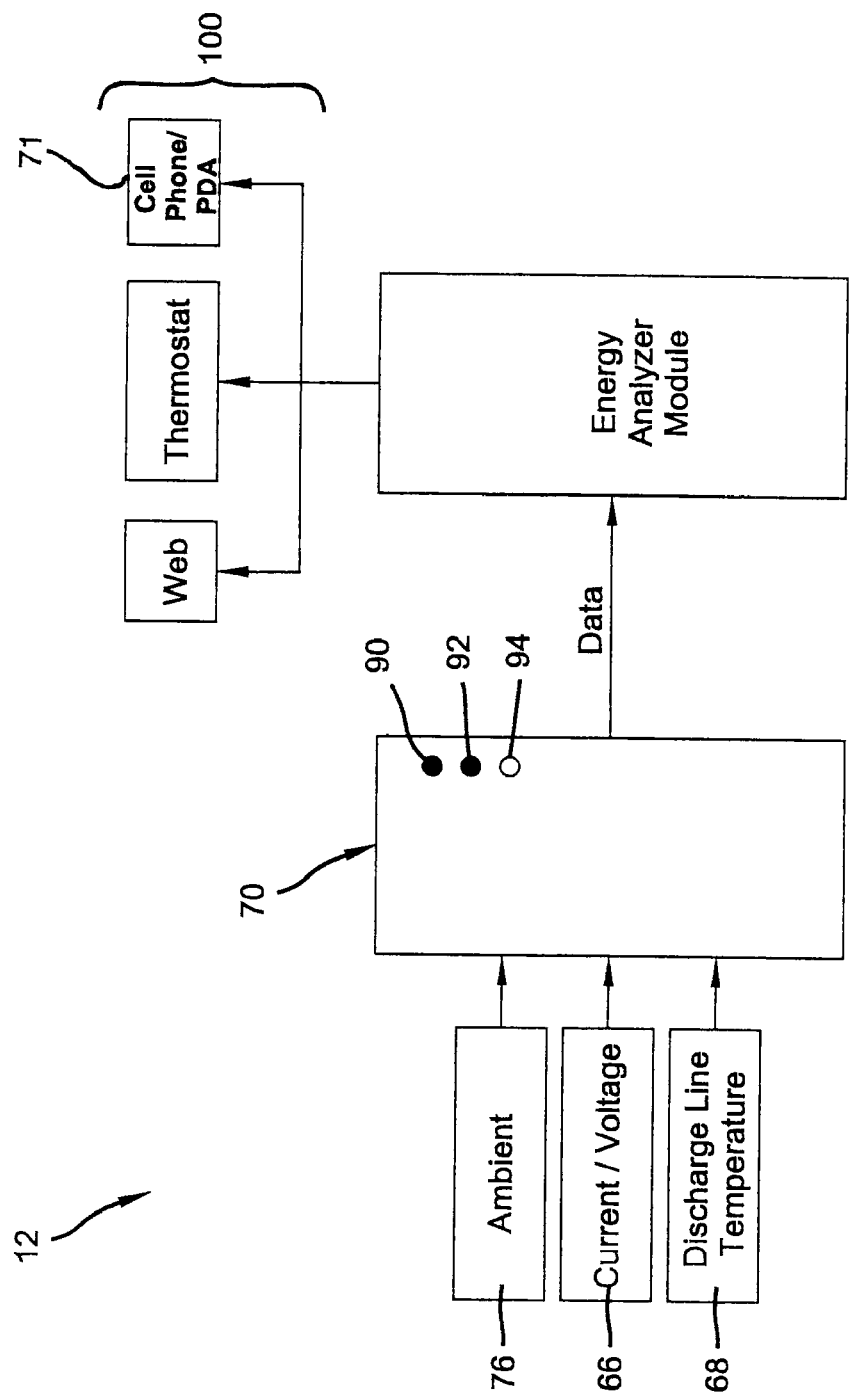
FIG. 17 is a schematic representation of an efficiency-monitoring system incorporated into a network.

The processing circuitry 70 may communicate the compressor and system fault status and data to a central system in addition to illuminating the LEDs 90, 92, 94. In other words, the processing circuitry 70 may be linked to a network 100 to provide compressor and system operating parameters (FIG. 17). Compressor and system operating parameters may be collected and analyzed by the network 100 to anticipate and protect against future compressor and/or system faults. For example, if a compressor 10 experiences a broken seal at or around a certain number of cycles, an operator can plan to service the compressor 10 during a shutdown period, rather than shut down the compressor 10 and system 11 during normal use. As can be appreciated, such scheduled maintenance prevents shutting down the compressor 10 and system 11 during normal use, thereby increasing compressor and system efficiency.

The system controller can confirm the diagnosis of the processing circuitry 70 by independently checking the status of other sensors and components that it may have access to, such as fan speed, coil temperature, etc. For example, the system controller can confirm a fan failure finding of the processing circuitry 70 based on fan speed data available to the controller.

The network 100, in addition to including a system controller, can also include a hand-held computing device such as a personal data assistant or a smart cell phone, schematically represented as 71 in FIG. 17. The hand-held computing device 71 can be used by a technician or repairperson to communicate with the processing circuitry 70. For example, the hand-held device provides the technician or repairperson with the ability to instantly check compressor operating conditions (i.e., discharge line temperature and current data, for example) either locally (i.e., on-site) or from a remote location. As can be appreciated, such a device becomes useful when a plurality of compressors 10 are linked to a system controller over a large network 100 as compressor operating data can be quickly requested and received at any location within a facility.

As previously discussed, the processing circuitry 70 receives high-side and low-side signals from respective sensors 66, 68 to dictate the compressor mode via the power interruption system 72. The combination of the current sensing (i.e., sensor 66) and the discharge line temperature (i.e., sensor 68) provides an opportunity for performing "smart" system protection.

The smart system provides the protection and control system 12 with the ability to differentiate between "soft" and "hard" protection. For example, upon detection of a low-side fault, "soft" mode would allow continued operation of the compressor with intermittent power restriction in an effort to allow the compressor 10 to operate in a reduced fashion, as shown in FIG. 15. The reduced operation of the compressor 10 is allowed to provide continued refrigeration (or heating in a heat pump application) prior to repair provided that the reduced operation is deemed safe. Such operation of the compressor 10 may be achieved through use of actuation assembly 51.

For example, if a particular low-side fault permits operation of the compressor 10 at a reduced capacity (i.e., a so-called "limp-along mode"), the actuation assembly 51, through controller 55, may separate orbiting scroll wraps 42 from non-orbiting scroll wraps 50 through interaction between the solenoid 53 and the orbiting scroll member 40. Separation of orbiting scroll wrap 42 from non-orbiting scroll wrap 50 permits a reduction in compressor capacity and therefore allows the compressor 10 to operate during certain low-side faults.

However, if a severe high-temperature low-side fault (i.e., discharge line temperature above 260 degrees F.) is detected, or a severe low temperature low-side fault (i.e., discharge line temperature below 135 degrees F.), the processing circuitry 70 will direct the power interruption system 72 to place the compressor 10 into the shutdown mode until repairs are performed, as shown in FIG. 15.

While FIG. 15 depicts an operating temperature range for low-side faults, it should be understood that temperature ranges defining compressor operating modes for low-side faults may range depending on the particular compressor 10 or system 11. In other words, the specific ranges defining normal, reduced-capacity, and shutdown modes may vary depending on the particular compressor 10 and application. A similar graph could be created for defining a normal, reduced-capacity, and shutdown mode using specific high-side faults. Such an arrangement would define acceptable power consumption ranges for the compressor and would therefore dictate acceptable faults under which the compressor 10 could continue operation under a reduced-capacity mode without causing damage. Again, high-side ranges defining acceptable operating parameters may similarly fluctuate depending on the particular compressor 10 and system 11.

The processing circuitry 70 is able to dictate the specific operating mode for the compressor 10 by knowing the cause of a particular high-side or low-side fault. For example, if the circuitry 70 knows that a particular low-side fault will trip an internal protector 102 in 45 minutes, the compressor 10 may continue to run safely for about 30 minutes. Such a fault places the compressor 10 in the "soft" mode, whereby the processing circuitry 70 directs the power interruption system 72 to restrict power to the compressor 10 at 30 minutes to avoid tripping the internal protector 102 and/or separates the orbiting scroll wrap 42 from the non-orbiting scroll wrap 48 via actuation assembly 51.

A "hard" mode disrupts power to the compressor 10 to effectively shutdown further operation until service and repairs are performed. The "hard" mode is only engaged if necessary to protect the compressor and system 10, 11 and to prevent major repairs. Again, the only way for the processing circuitry 70 to know if continued operation is acceptable is to know the particular cause of the fault. In the case of the "hard" mode, the processing circuitry 72 directs the power interruption system 72 to restrict all power to the compressor 10, thereby placing the compressor 10 in the shutdown mode.

In addition to sensing and diagnosing high-side and low-side faults, the compressor protection and control system 12 also provides the user with the ability to track and control power consumption and energy usage by the compressor 10. FIG. 17 shows a schematic diagram incorporating a power consumption algorithm into the network 100. Monitoring and storing current and voltage data, allows the user to estimate compressor power consumption. Specifically, by multiplying the voltage by the current, power consumption for the compressor and system 10, 11 can be determined.

By multiplying the product of voltage and current by an estimated power factor, power consumption for the compressor 10 and system 11 can be accurately determined. The power factor essentially corrects the supplied power reading from a utility meter and provides an indication of the actual power consumed (i.e., actual power consumed by the compressor 10). The power data can be integrated over time to provide energy usage data such as kilowatts per day/month. Such data may be useful for energy and system performance analysis.

As described, the compressor protection and control system 12 receives discharge line temperature data from sensor 68 and current data from sensor 66 to determine, and differentiate between, high-side and low-side faults. The information is used generally to determine, and differentiate between, high-side and low-side faults to better diagnose compressor and system failures. In addition to the foregoing, such information can also be used to determine other operating parameters associated with the compressor 10 and system 11. Specifically, discharge line temperature data and current data can be used to determine condenser temperature, evaporator temperature, suction superheat, discharge superheat, compressor capacity, and compressor efficiency. Such information is useful in optimizing compressor and system operation as well as in simplifying and streamlining compressor installation, as will be described further below.

Figure 18:
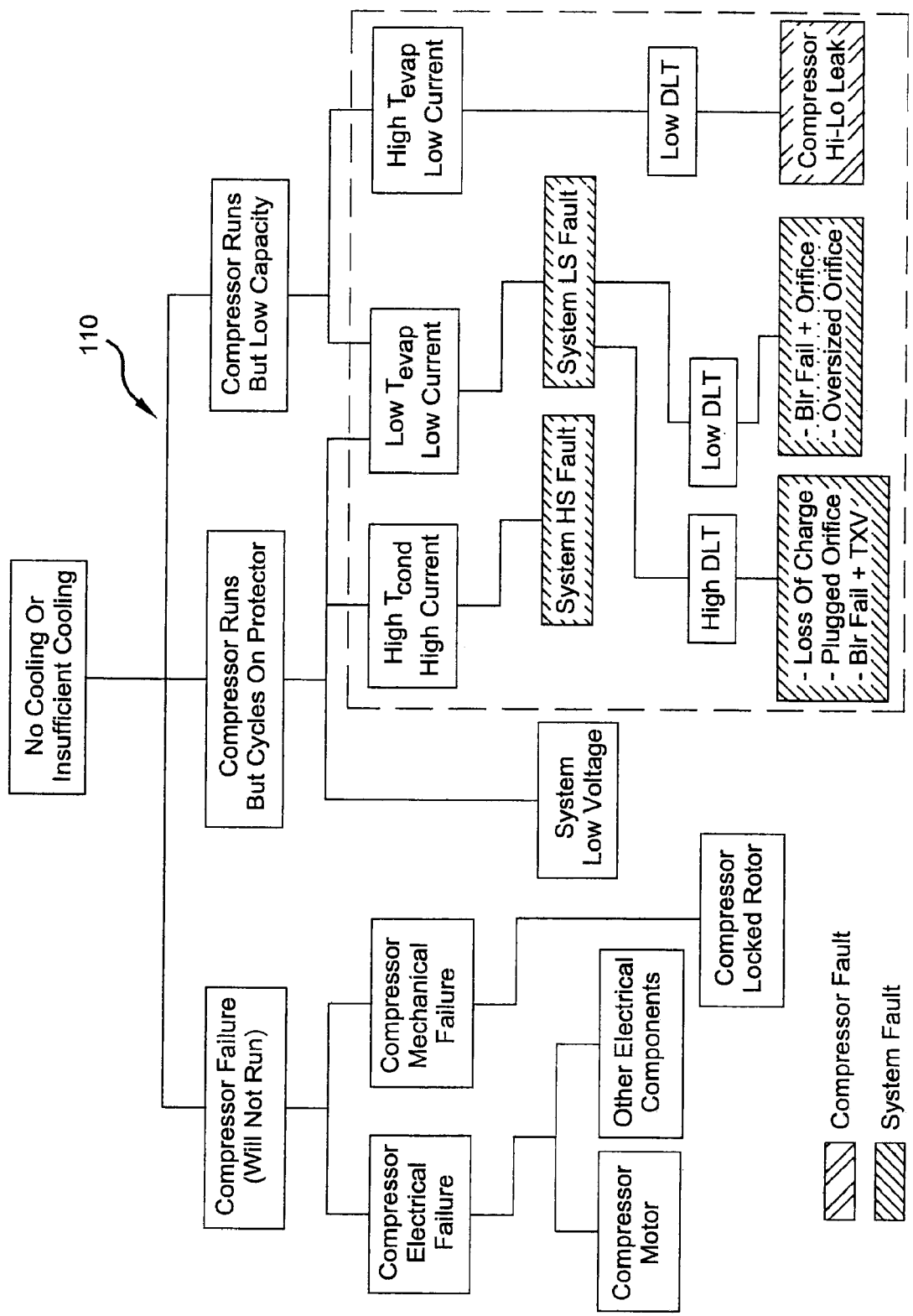
FIG. 18 is a flowchart representing a fault tree for use with the protection system of FIG. 9.

With reference to FIG. 18, a fault tree 110 is provided that illustrates how the compressor protection and control system 12 uses the discharge line temperature and current information to determine specific faults related to compressor operation, using such variables as condenser temperature and evaporator temperature. The evaporator and condenser temperatures are determined from the discharge line temperature and current data obtained by sensors 66, 68, as will be described further below.

When the system 11 experiences an insufficient cooling or no cooling condition, the system 12 determines if the compressor 10 has failed, is running but cycles on a protector, or is running but at low capacity. If the compressor 10 has failed, the control system 12 differentiates between an electrical failure and a mechanical failure. If the failure is deemed an electrical failure, the system 12 checks the compressor motor and associated electrical components. If the failure is deemed a mechanical failure, the system 12 checks for a locked rotor condition.

If the compressor 10 is running but cycles on a protector, the system 12 determines if the system is experiencing a low voltage condition. In addition, the system 12 also checks for a high condenser temperature/high current condition or for a low evaporator temperature/low current condition. If a high condenser temperature/high current condition is determined, a high-side fault is declared. If a low evaporator temperature/low current condition is determined, a low-side fault is declared. If a low evaporator temperature/low current condition is determined in conjunction with a high discharge temperature, the system 12 is further able to declare that the fault is either a loss of charge, a plugged orifice, or a blower/thermal expansion valve failure. If a low evaporator temperature/low current condition is determined in conjunction with a low discharge temperature, the system 12 is further able to declare that the fault is either a blower/orifice failure or an oversized orifice.

If the compressor 10 is running, but at low capacity, the system 12 checks for a high evaporator/low current condition. If the high evaporator/low current condition is accompanied by a low discharge temperature, the system 12 declares an internal compressor hi-low leak.

The above fault tree 110 relies on evaporator temperature and condenser temperature readings in addition to the current and discharge temperature readings to determine the fault experienced by the compressor 10 or system 11. The system 12 can obtain such information by use of temperature or pressure sensors disposed in each of the evaporator 80 or the condenser 82. In such a system, the temperature or pressure readings are simply read by the individual sensor and delivered to the processing circuitry 70 for processing or could be obtained from another system controller. Alternatively, use of such sensors, while effective, increases the cost and complexity of the overall system cost.

Figure 19:
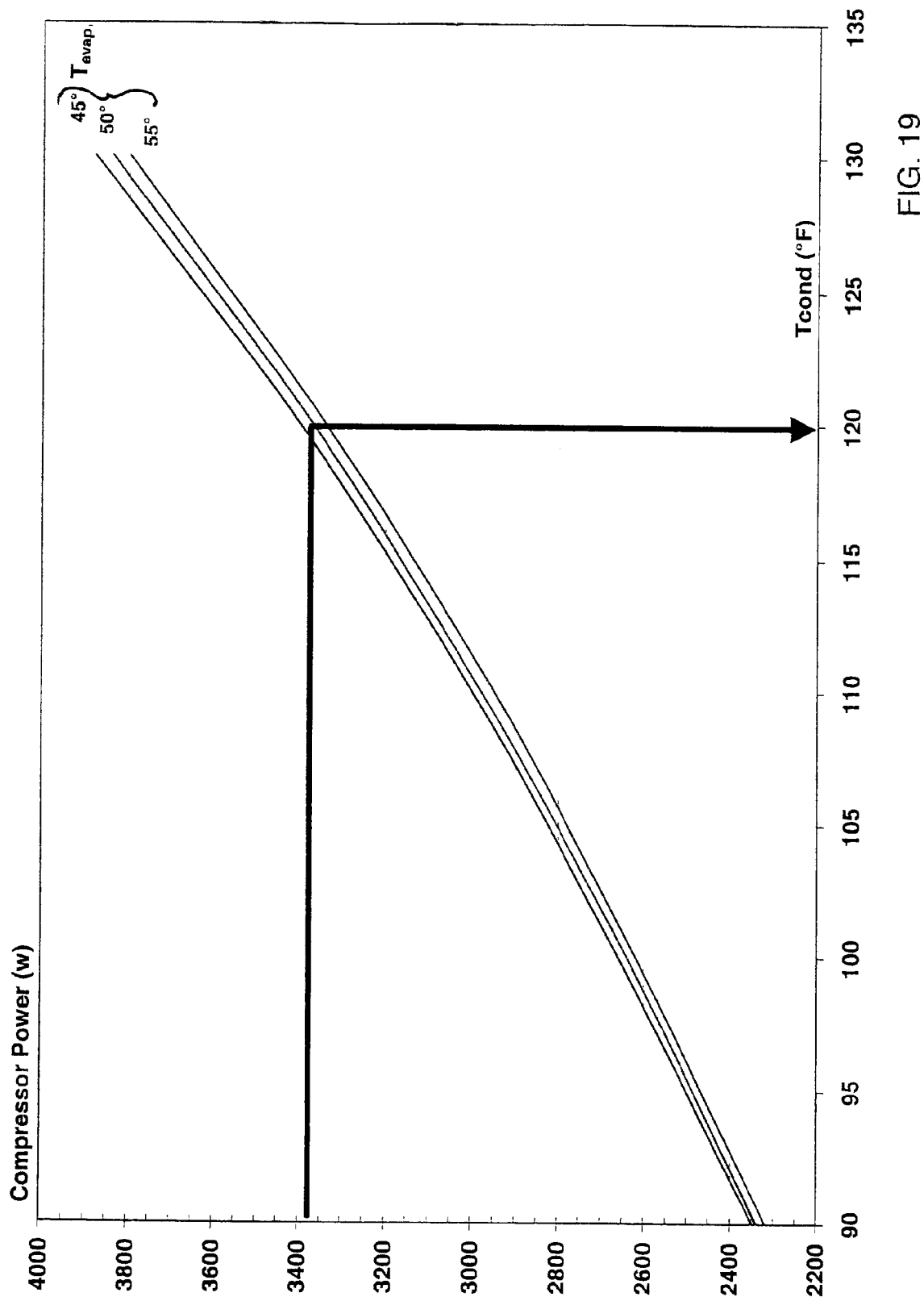
FIG. 19 is a graphical representation of compressor power versus condensing temperature.

As a preferred alternative to use of such sensors, the present system 12 can alternatively determine the evaporator temperature and condenser temperature based solely on the discharge line temperature and current information received from sensors 66, 68. With reference to FIG. 19, a graph showing compressor power as a function of evaporator temperature ($T_{evap}$) and condenser temperature ($T_{cond}$). As shown, power remains fairly constant irrespective of evaporator temperature. Therefore, while an exact evaporator temperature is determined by a second degree polynomial (i.e., a quadratic function), for purposes of control, the evaporator temperature can be determined by a first degree polynomial (i.e., linear function) and can be approximated as roughly 45 degrees F., for example in a cooling mode. In other words, the error associated with choosing an incorrect evaporator temperature is minimal when determining condenser temperature.

The graph of FIG. 19 includes compressor power on the Y-axis and condenser temperature on the X-axis. Compressor power P is determined through application of the following equation, where A is the measured compressor current obtained by sensor 66 and V is the measured voltage V (Obtained by a voltage sensor):

$$P = V * A$$

The condenser temperature is calculated for the individual compressor and is therefore compressor model and size specific. The following equation is used in determining condenser temperature, where P is compressor power, C0-C9 are compressor-specific constants, $T_{cond}$ is condenser temperature, and $T_{evap}$ is evaporator temperature:

$$P = C0 + (C1*T_{cond}) + (C2*T_{evap}) + (C3*T_{cond}^2) + (C4*T_{cond}*T_{evap}) + (C5*T_{evap}^2) + (C6*T_{cond}^3) + (C7*T_{evap}*T_{cond}^2) + (C8*T_{cond}*T_{evap}^2) + (C9*T_{evap}^3)$$

The above equation is applicable to all compressors, with constants C0-C9 being compressor model and size specific, as published by compressor manufacturers, and can be simplified as necessary by reducing the equation to a second-order polynomial with minimal compromise on accuracy. The equations and constants can be loaded into the processing circuitry 70 by the manufacturer, in the field during installation using a hand-held service tool, or downloaded directly to the processing circuitry 70 from the internet.

The condenser temperature, at a specific compressor power (based on measured current draw by sensor 66), is determined by referencing a plot of evaporator temperature (as either a first degree or a second degree polynomial) for a given system versus compressor power consumption. The condenser temperature can be read by cross-referencing a measured current reading against the evaporator temperature plot. Therefore, the condenser temperature is simply a function of reading a current drawn at sensor 66. For example, FIG. 13 shows an exemplary power consumption of 3400 watts (as determined by the current draw read by sensor 66). The processing circuitry 70 is able to determine the condenser temperature by simply cross-referencing power consumption of 3400 watts for a given evaporator temperature (i.e., 45 degrees F., 50 degrees F., 55 degrees F., as shown) to determine the corresponding condenser temperature. It should be noted that the evaporator temperature can be approximated as being either 45 degrees F., 50 degrees F., or 55 degrees F. without materially affecting the condenser temperature calculation. Therefore, 45 degrees F. is typically chosen by the system 12 when making the above calculation.

Figure 20:
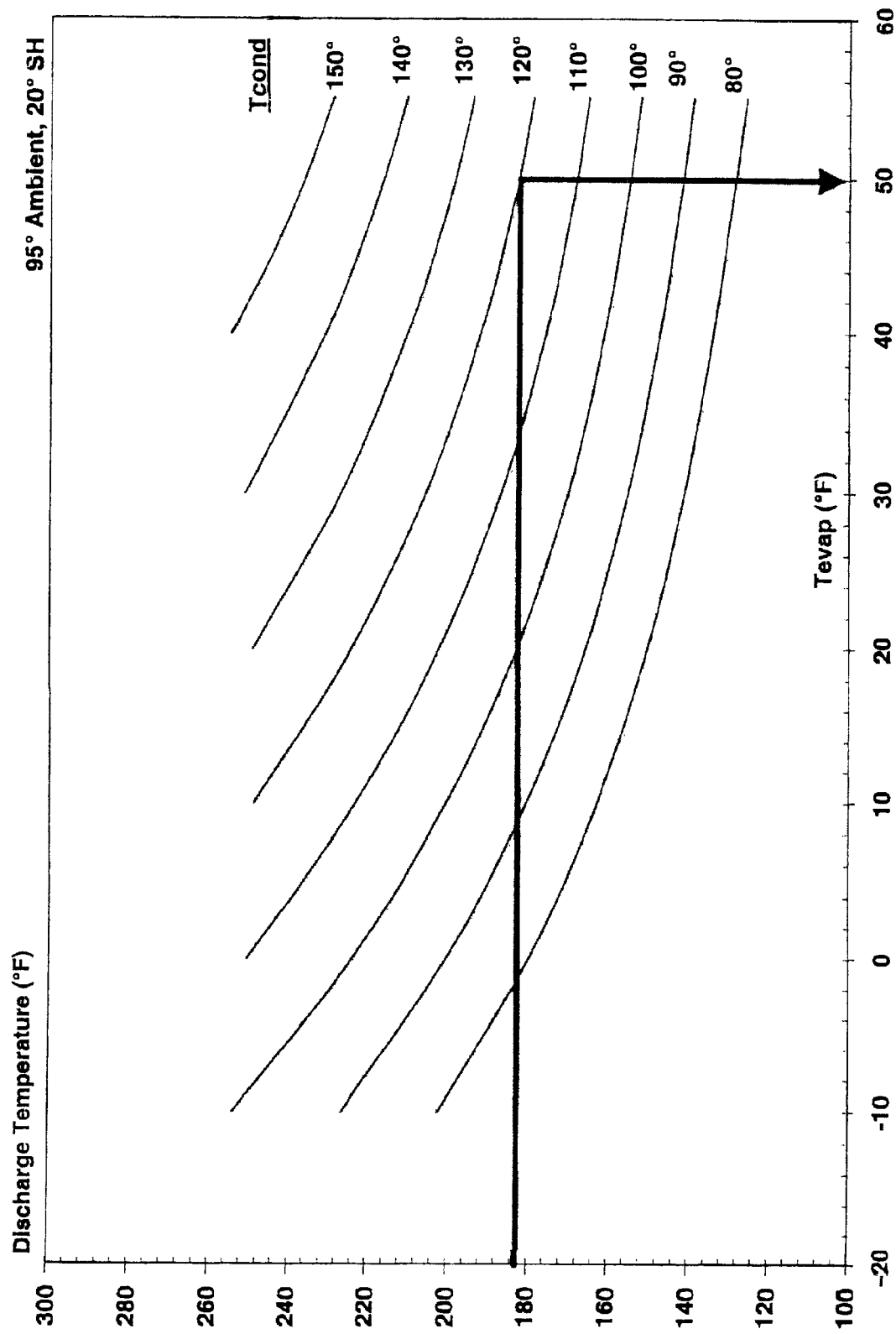
FIG. 20 is a graphical representation of discharge line temperature versus evaporator temperature.

With reference to FIG. 20, once the condenser temperature is known, the exact evaporator temperature can be determined by plotting discharge line temperature versus condenser temperature. It should be noted that the evaporator temperature used in determining the condenser temperature is an approximated value (typically between 45-55 degrees F.). The approximation does not greatly affect the condenser temperature calculation, and therefore, such approximations are acceptable. However, when making capacity and efficiency calculations, the exact evaporator temperature is required.

The evaporator temperature is determined by referencing a discharge line temperature, as sensed by sensor 66, against the calculated condenser temperature (i.e., from FIG. 19) and can be accurately determined through iterations. The resulting evaporator temperature is a more specific representation of the true evaporator temperature and is therefore more useful in making capacity and efficiency calculations.

Figure 21:
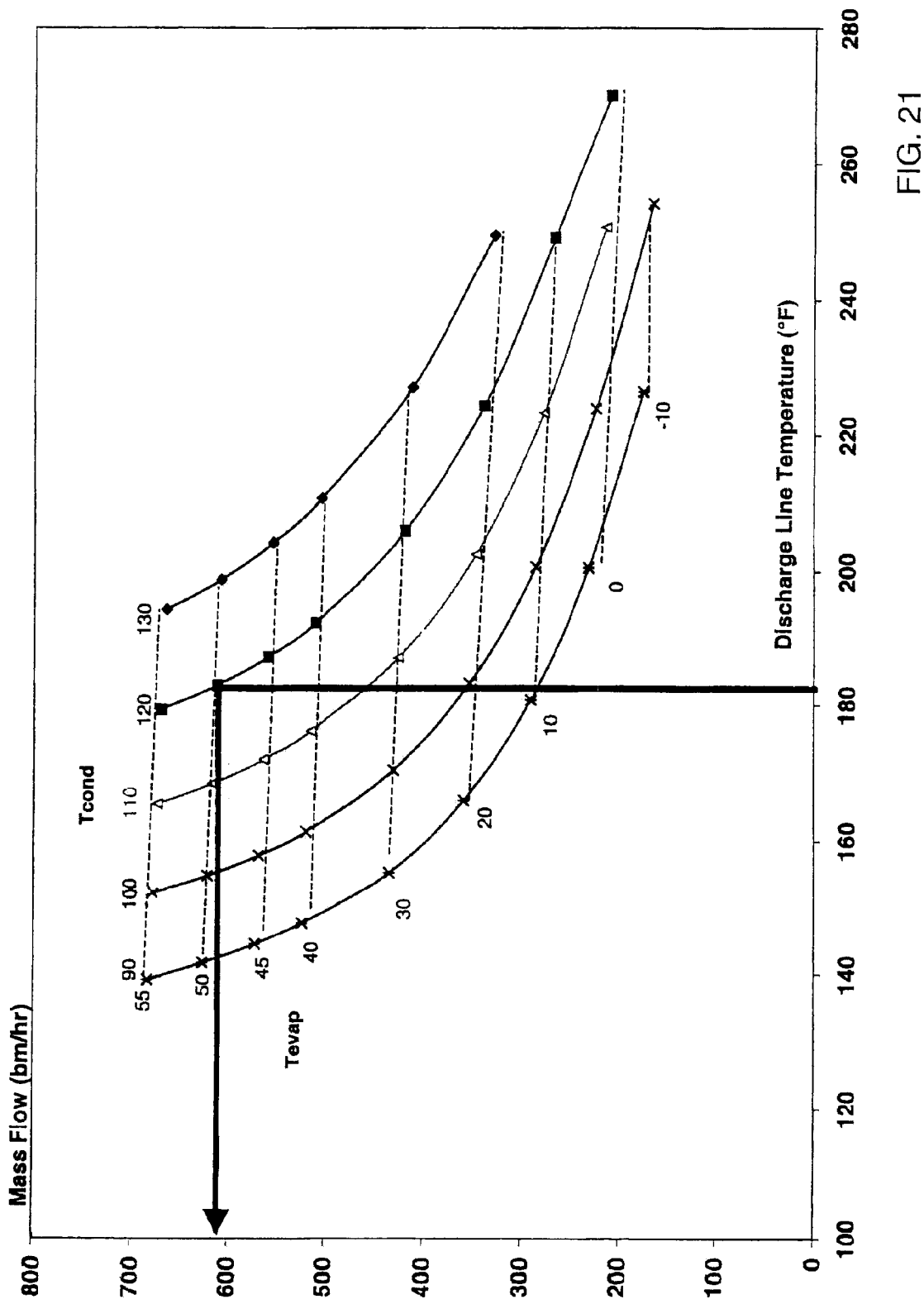
FIG. 21 is a graphical representation of compressor mass flow versus discharge line temperature.

Once the condenser and evaporator temperatures are known, the compressor mass flow, compressor capacity, and compressor efficiency can all be determined. Compressor mass flow is determined by plotting condenser temperature and evaporator temperature as a function of mass flow (bm/hr) and discharge line temperature. The mass flow is determined by referencing the intersection of evaporator temperature and condenser temperature at a sensed discharge line temperature. For example, FIG. 21 shows that for a 180 degrees F. discharge line temperature, a 120 degrees F. evaporator temperature, and a 49 degrees F. evaporator temperature, the mass flow of the compressor is roughly 600 bm/hr.

Figure 22:
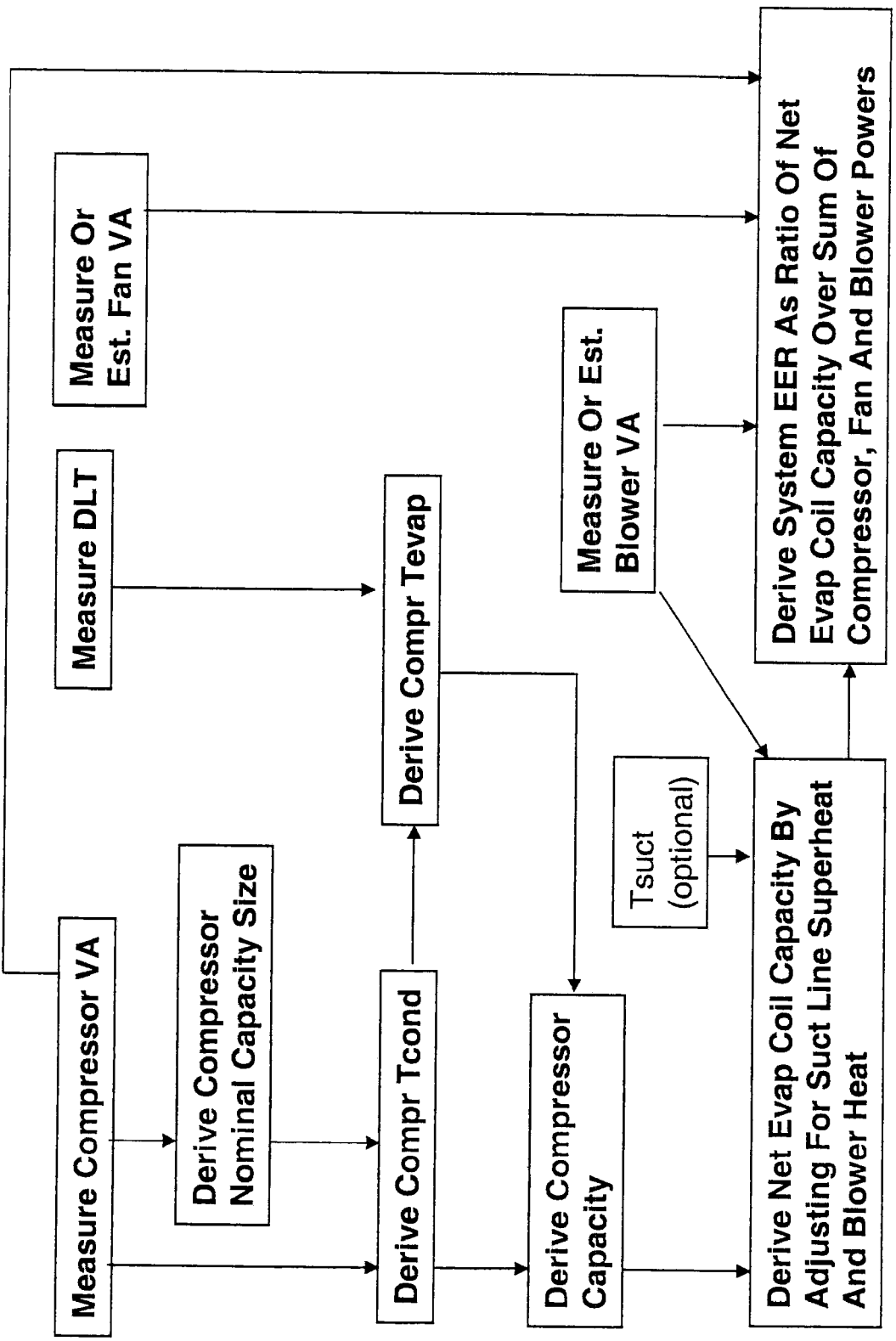
FIG. 22 is a flowchart detailing a compressor capacity and efficiency algorithm.

FIG. 22 is a flowchart that demonstrates both a compressor capacity algorithm and a compressor efficiency algorithm.

Both algorithms use discharge line temperature and current in making the capacity and efficiency calculations.

Compressor capacity is determined by first obtaining discharge line temperature and current data from respective sensors 66, 68. Once the data is collected, the compressor nominal capacity size is referenced by the processing circuitry 70 to establish constants C0-C9. The above data allows the processing circuitry 70 to calculate condenser temperature and evaporator temperature, as previously discussed. Such information further allows the processing circuitry 70 to determine compressor capacity information through application of the following equation, where X is compressor capacity, Y0-Y9 are compressor-specific constants, $T_{cond}$ is condenser temperature, and $T_{evap}$ is evaporator temperature:

$$X=Y0+(Y1*T_{cond})+(Y2*T_{evap})+(Y3*T_{cond}{}^\wedge 2)+\\(Y4*T_{cond}*T_{evap})+(Y5*T_{evap}{}^\wedge 2)+(Y6*T_{cond}{}^\wedge 3)+\\(Y7*T_{evap}*T_{cond}{}^\wedge 2)+(Y8*T_{cond}*T_{evap}{}^\wedge 2)+\\(Y9*T_{evap}{}^\wedge 3)$$

The above equation is applicable to all compressors, with constants Y0-Y-9 being compressor model and size specific, as published by compressor manufacturers. The equations and constants can be loaded into the processing circuitry 70 by the manufacturer or in the field during installation using a hand-held service tool. The equations and constants can be loaded into the processing circuitry 70 by the manufacturer, in the field during installation using a hand-held service tool, or downloaded directly to the processing circuitry 70 from the internet.

Figure 23:
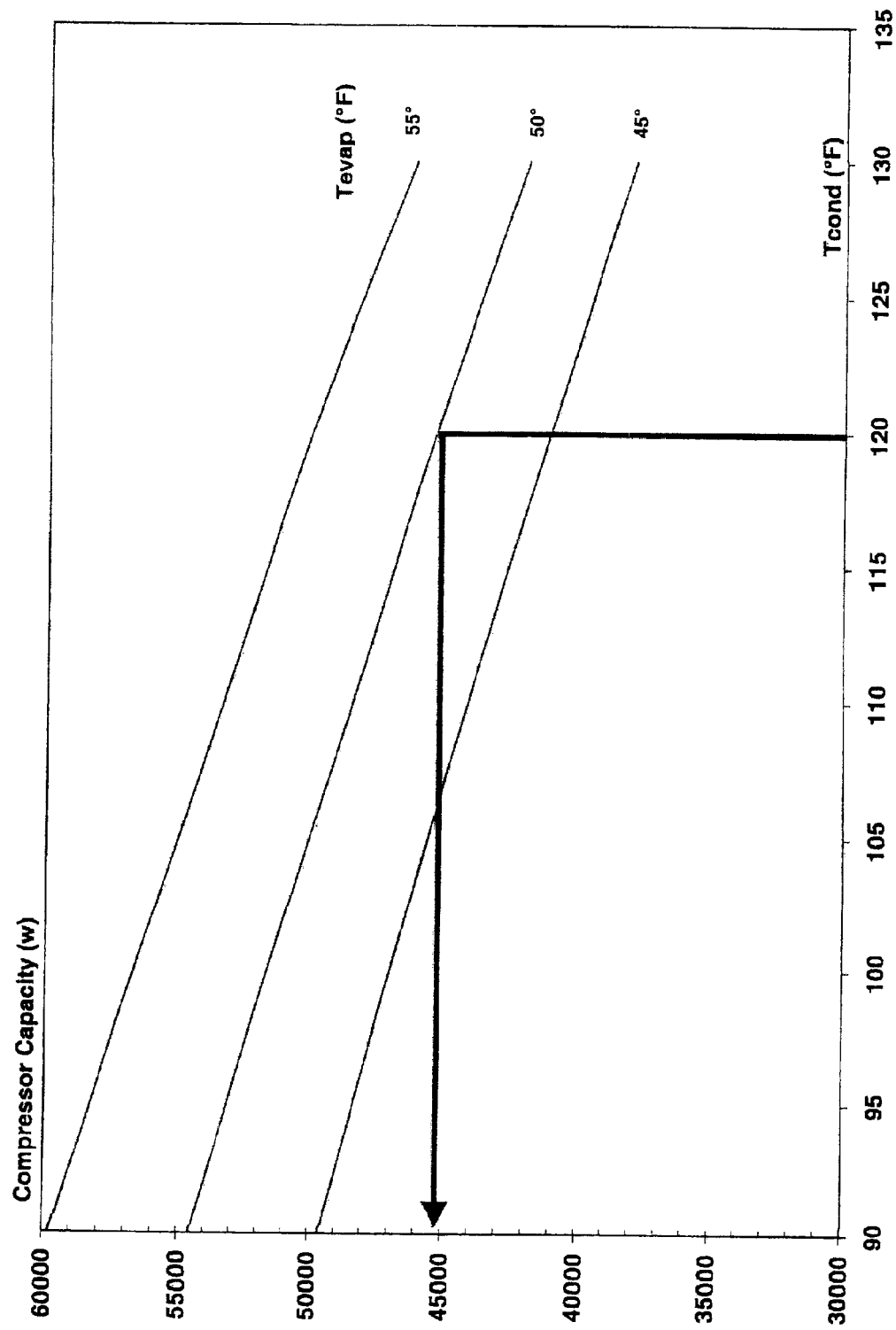
FIG. 23 is a graphical representation of compressor capacity versus condenser temperature.
Figure 24:
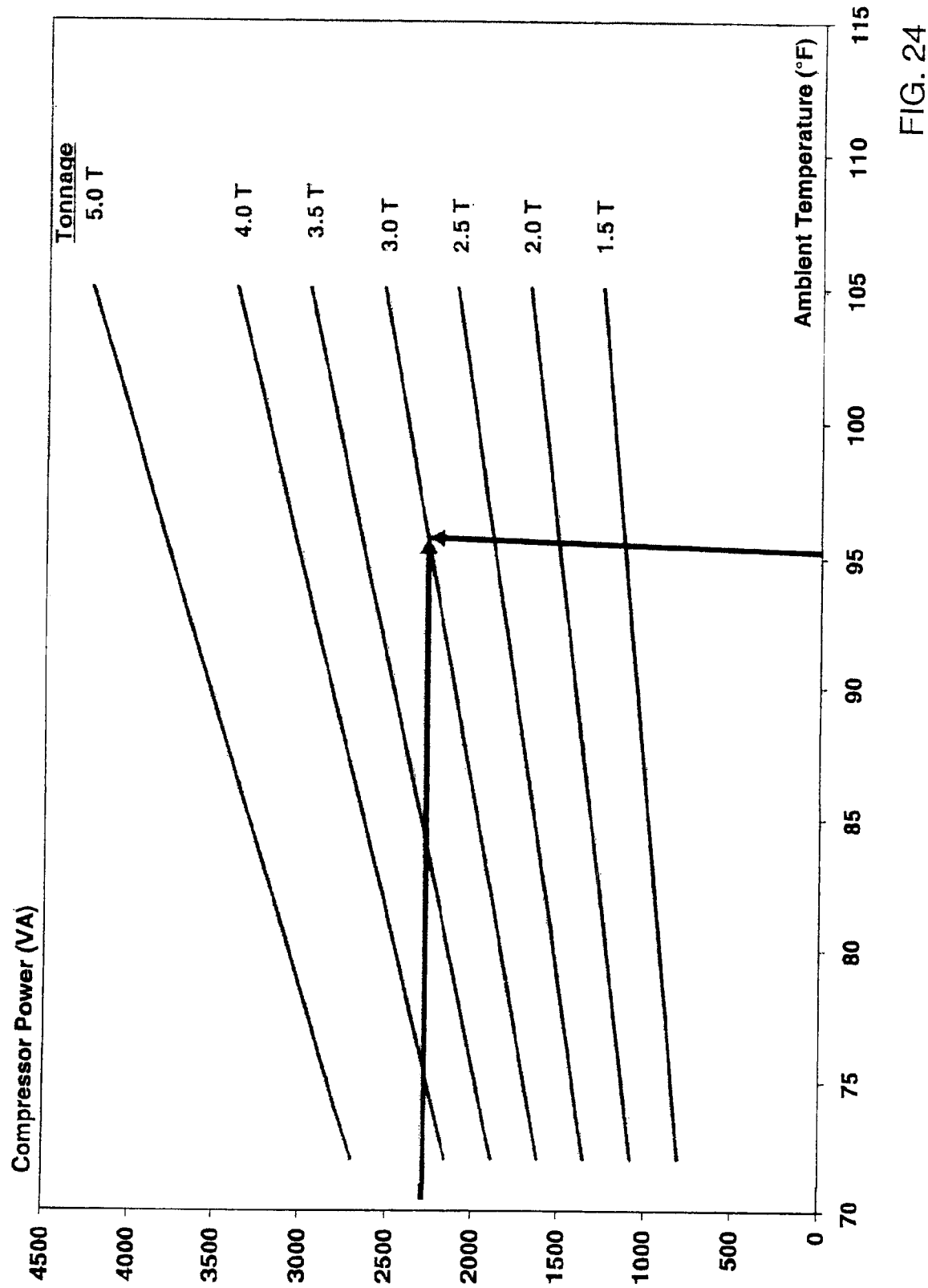
FIG. 24 is a graphical representation of compressor power versus ambient temperature.

With reference to FIG. 23, compressor capacity can be determined for different evaporator temperatures by plotting compressor capacity versus condenser temperature. Compressor nominal tonnage size can be determined by plotting compressor power versus ambient temperature, as shown in FIG. 24. In this manner, for a given compressor with predefined constants (i.e., Y0-Y9), the processing circuitry simply references the calculated condenser temperature against the calculated evaporator temperature or compressor tonnage to determine the compressor capacity.

Figure 25:
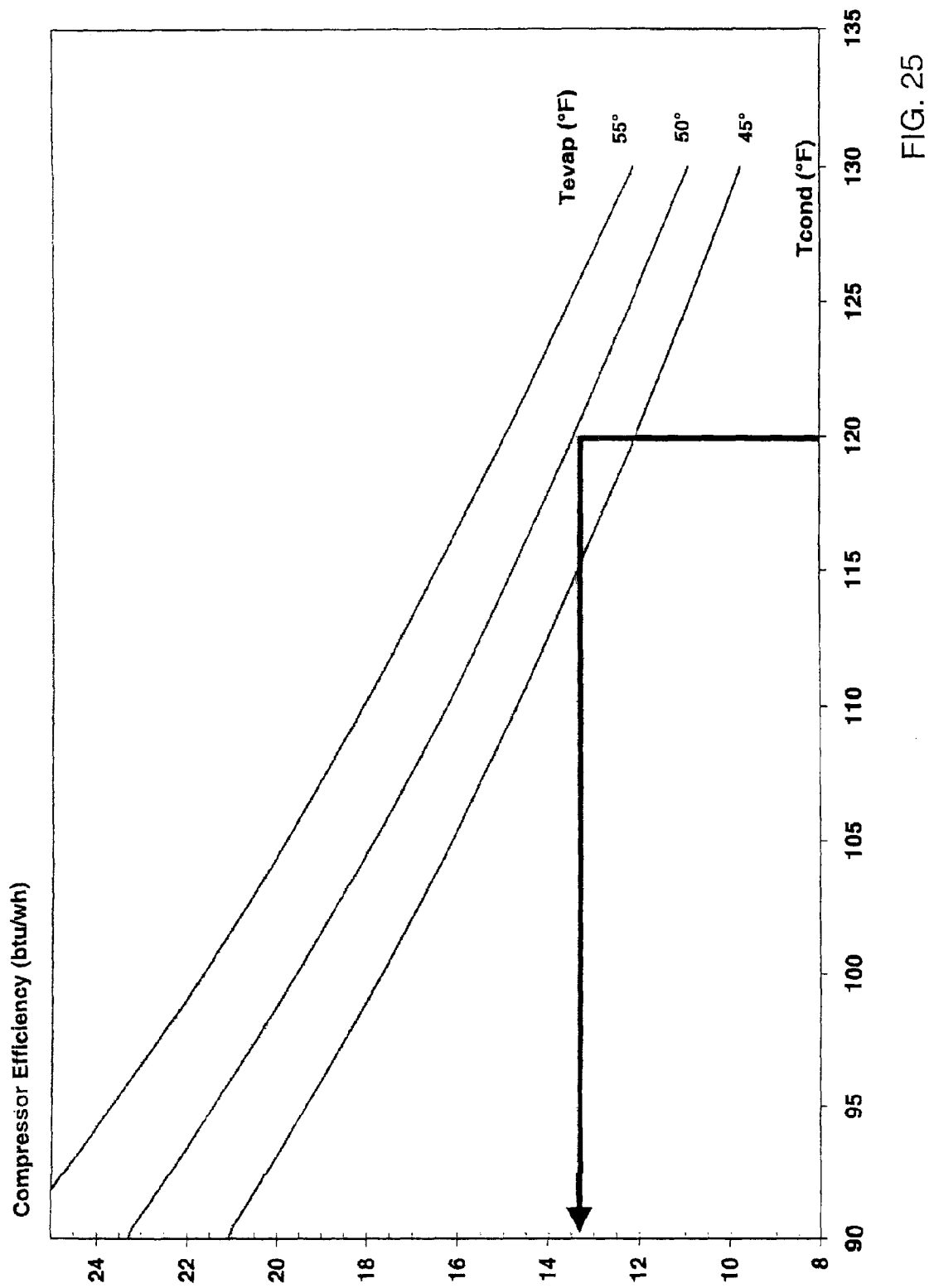
FIG. 25 is a graphical representation of compressor efficiency versus condenser temperature.

Compressor efficiency is determined by plotting the evaporator temperature as a function of compressor efficiency and condenser temperature. Condenser and evaporator temperatures are determined by measuring discharge line temperature and current at sensors 66, 68. Once the processing circuitry 70 determines the evaporator temperature and condenser temperature, the compressor efficiency can be determined, as shown in FIG. 25.

System efficiency is determined by first determining the net evaporator coil capacity by adjusting for suction line superheat and blower heat, as shown in FIG. 22. The suction line superheat is determined by first determining discharge superheat using the following equation:

$$SH_d = \text{Discharge Line Temperature} - T_{cond}$$

Once the discharge superheat is determined, the suction superheat can be determined using the following equation, graphically represented in FIG. 5:

$$SH_d = (1.3*SH_s + 30°) + (0.5*(T_{Amb} - 95°))$$

The system efficiency is derived as a ratio of the net evaporator coil capacity over the sum of compressor, fan, and blower power once the system is at steady-state. Determining system efficacy at either start-up or quasi-steady state does not provide a reliable indication of system efficiency. Therefore, system efficiency must be determined once the system 11 is at steady state (i.e., compressor 10 has run for roughly 10 minutes). The compressor power is determined by measuring the current at 68. The blower and fan power can be measured by similar current sensors and relayed to the processing circuitry 70 and/or the system controller.

Figure 26:
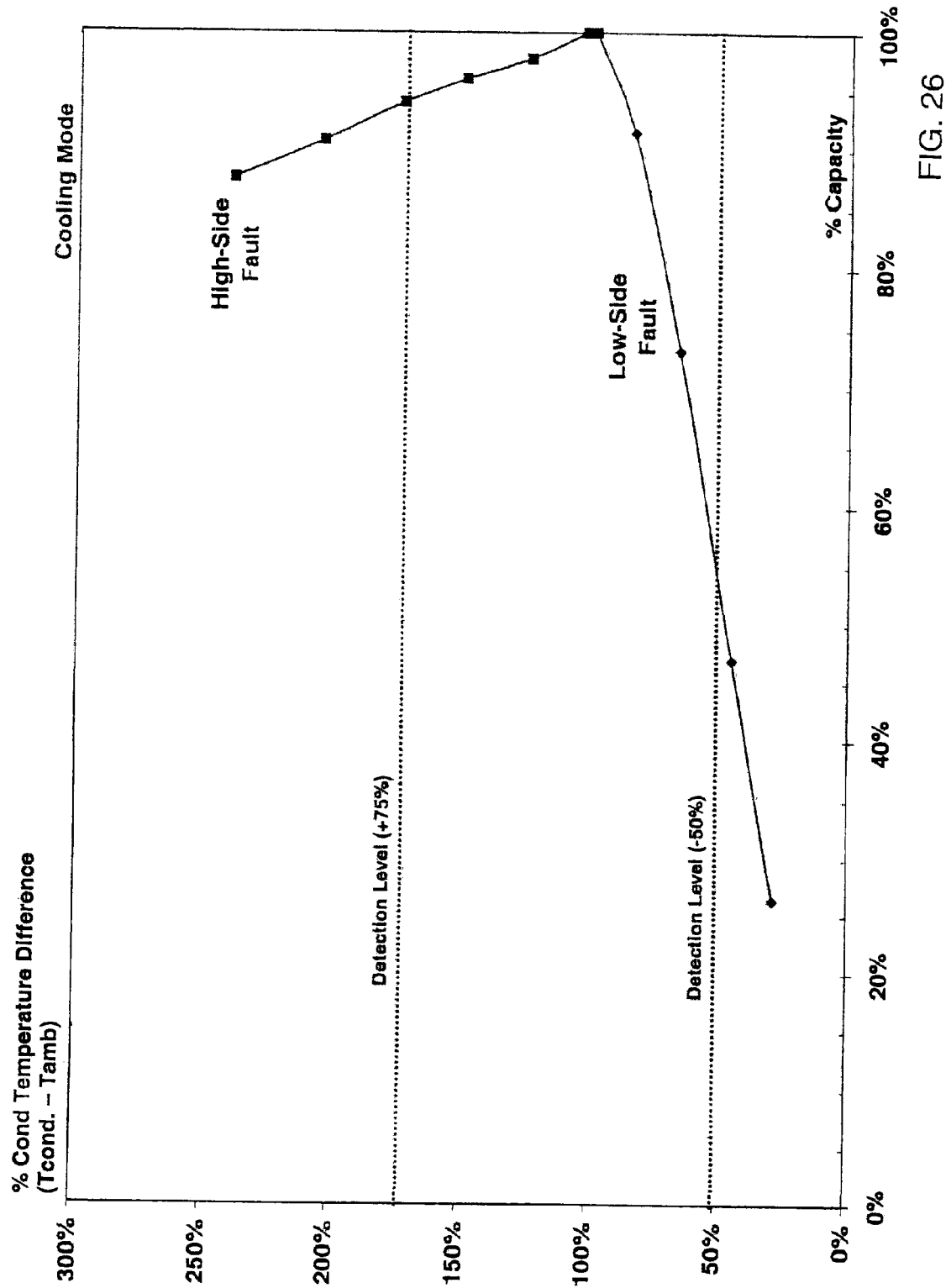
FIG. 26 is a graphical representation of percentage condenser temperature difference versus percent capacity.

Once compressor capacity is determined, condensing temperature and ambient temperature can used to confirm a high-side or a low-side fault. FIG. 26 shows a graph of condenser temperature difference (TD) versus capacity. Generally speaking, a fault yielding about 50 percent of normal condenser TD is deemed a severe low-side fault, while a fault yielding greater than about 150 percent of normal condenser TD is deemed as sever high-side fault. Such calculations allow the processing circuitry to further categorize faults and confirm fault determinations.

Figure 27:
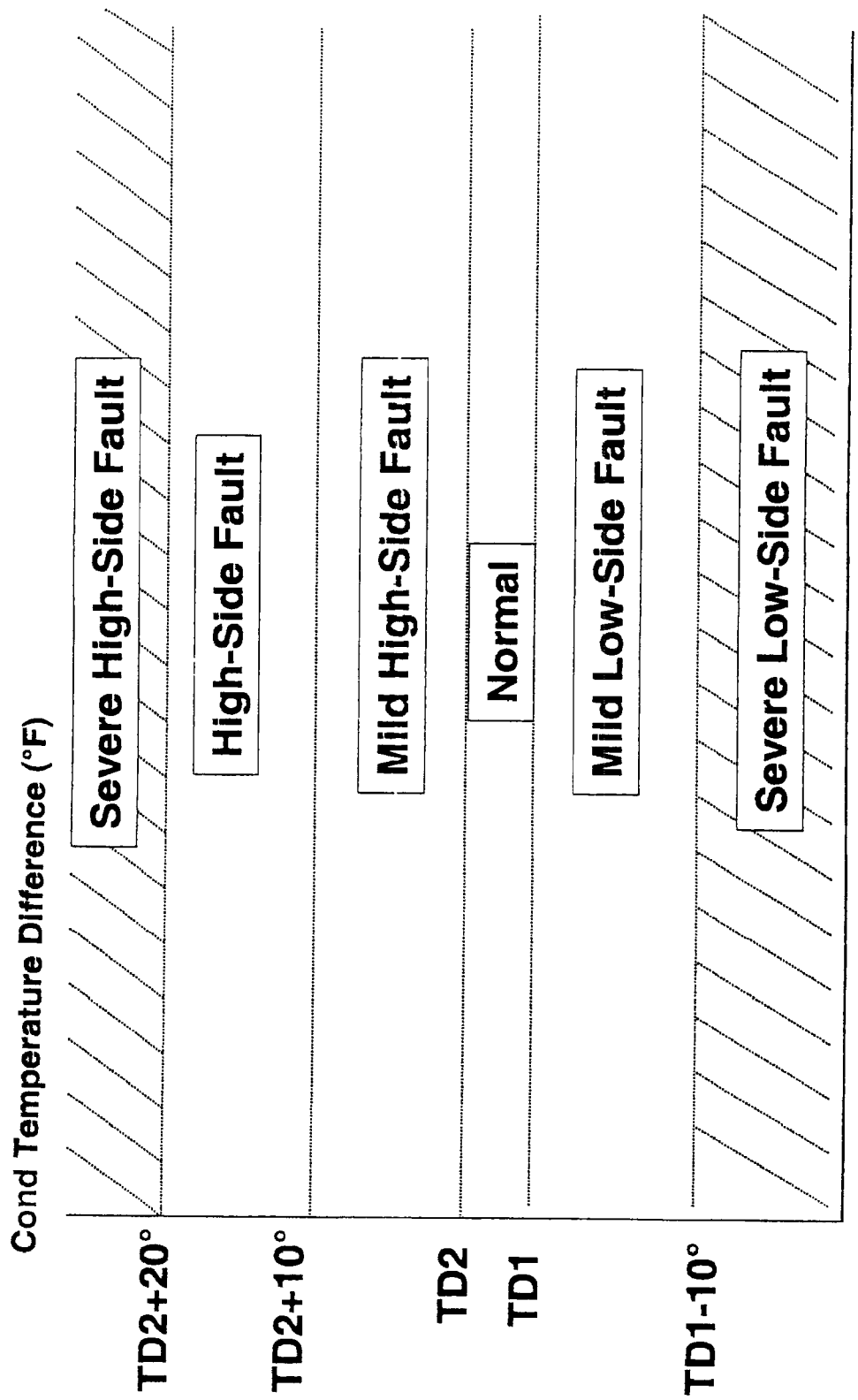
FIG. 27 is a schematic representation of a high-side diagnostic based on condenser temperature difference.

FIG. 27 provides an additional approach to categorizing a fault as either a low-side fault or a high-side fault and even allows the processing circuitry 70 to declare varying degrees of high-side and low-side faults. A normal temperature difference (TD) defined generally between a TD1 and a TD 2, may have varying degrees of high-side and low-side faults such as mild high-side faults, severe high-side faults, mild low-side faults, and severe low-side faults. Such categorization provides the control system 12 with the ability to allow the compressor 10 to operate under certain fault conditions either at full capacity or at a reduced capacity or cease operation all together.

For example, under a mild high-side or low-side fault, the processing circuitry 70 may allow the compressor 10 to operate in a "limp-along" mode to provide operation of the compressor at a reduced output, while some faults, such as a severe high-side or low-side fault require the processing circuitry 70 to immediately shut down the compressor 10. Such operation adequately protects the compressor 10 while allowing some use of the compressor 10 under less-severe fault conditions.

Figure 28:
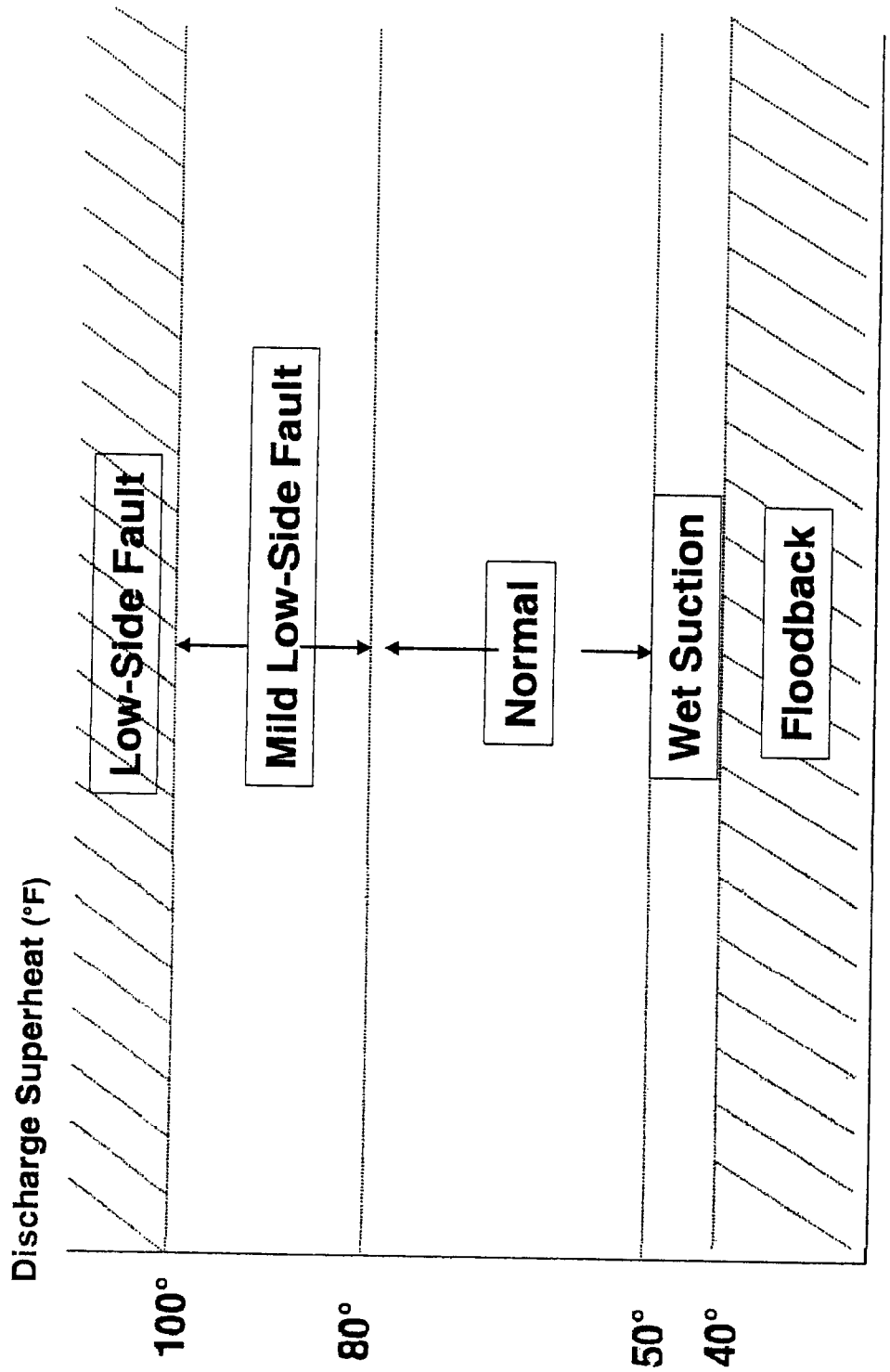
FIG. 28 is a schematic representation of a low-side diagnostic based on discharge superheat.

In addition to stratifying faults based on temperature difference, the control system 12 can also categorize faults (i.e., severe, mild, etc.) based on discharge superheat, as shown in FIG. 28. Discharge superheat is generally referred to as the difference between discharge line temperature and condenser temperature, as previously discussed. Such categorization allows the processing circuitry 70 to similarly allow the compressor 10 to operate, even at a reduced capacity, when certain fault conditions are present. Such operation adequately protects the compressor 10 by ceasing operation of the compressor 10 under severe conditions such as floodback and wet suction conditions while currently optimizing output of the compressor 10 by allowing some use of the compressor 10 under less-severe fault conditions.

Figure 29:
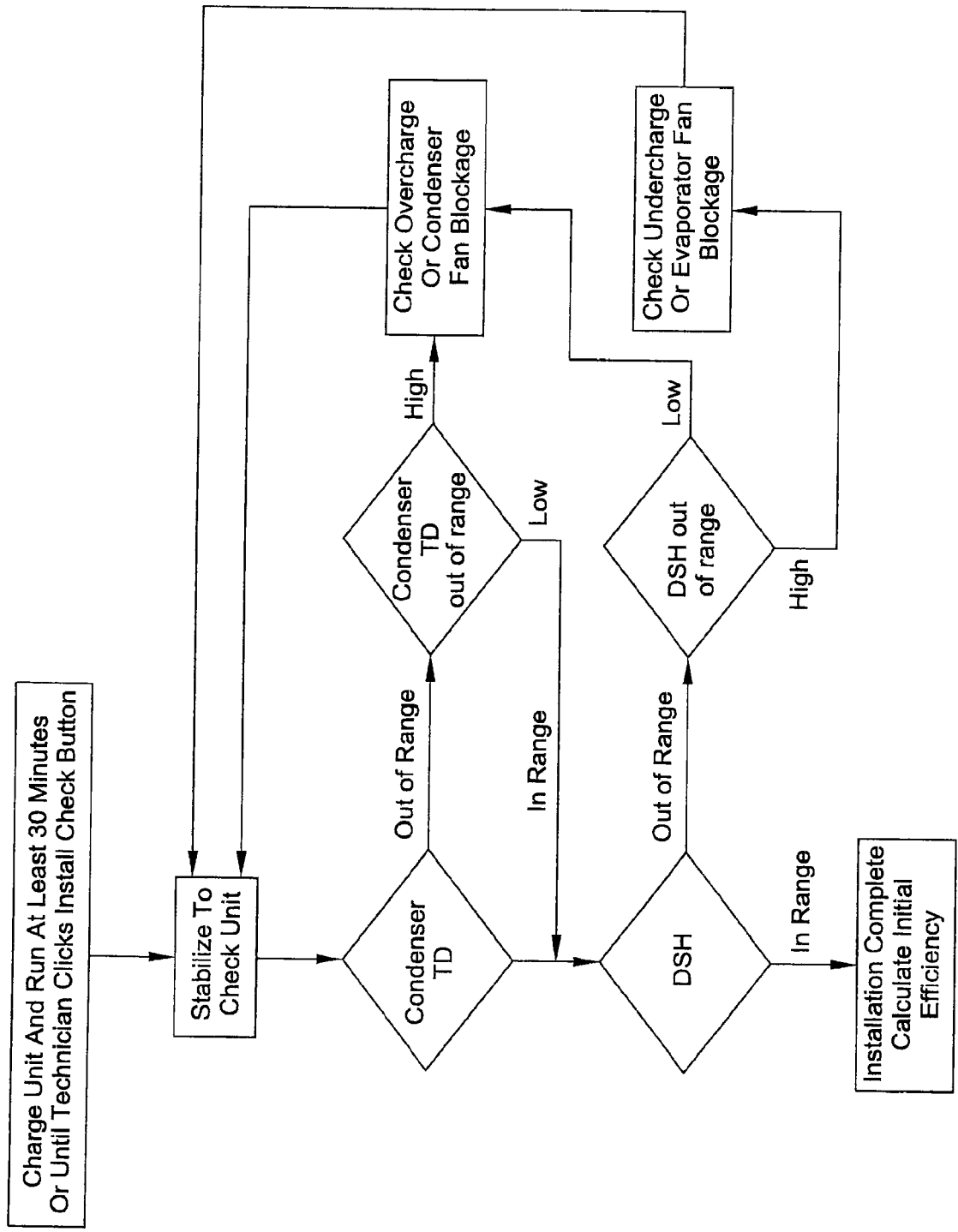
FIG. 29 is a flowchart for a compressor installation.
Figure 30:
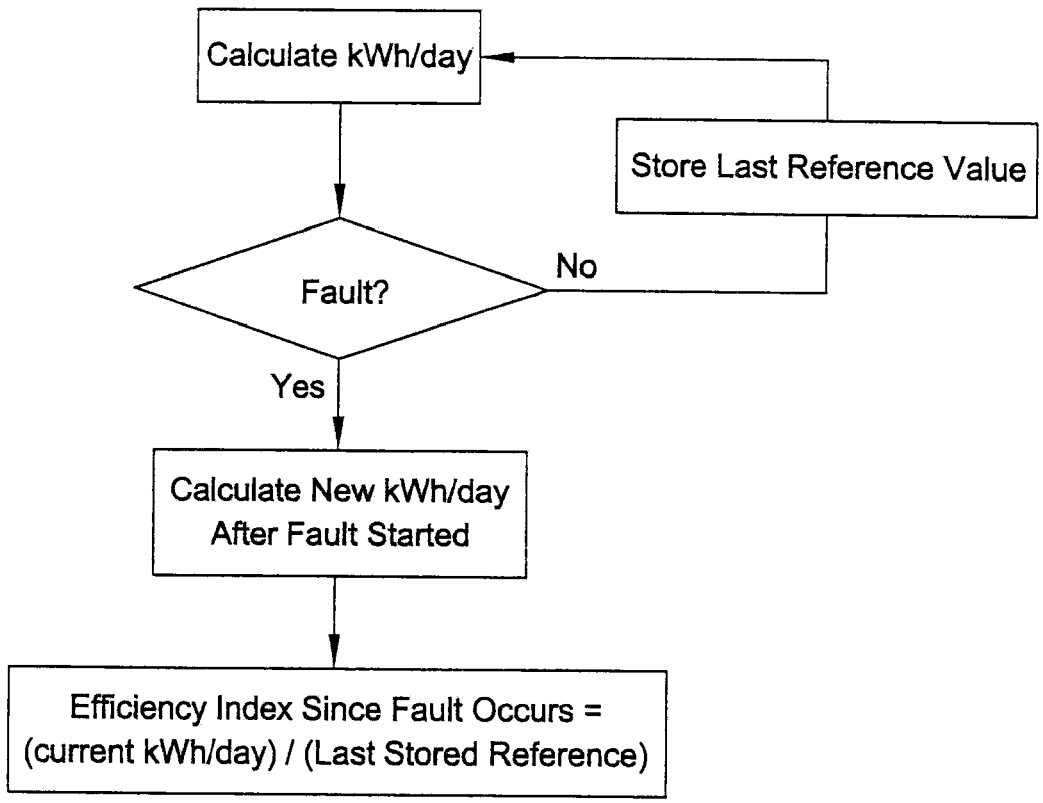
FIG. 30 is a flow-chart of an efficiency-monitoring system in accordance with the principles of the present teachings.

In addition to providing information regarding compressor and system fault information, sensors 66, 68 can also be used during installation. FIG. 29 represents a flowchart detailing an exemplary installation check of the compressor 10 based on condenser TD and discharge superheat. After installation is complete, the initial efficiency of the compressor 10 is determined, as shown in FIG. 22.

At installation, the compressor 10 is charged with refrigerant and is run for thirty minutes. The processing circuitry 70 is able to determine condenser temperature, evaporator temperature, discharge superheat, and suction superheat by monitoring sensor 66, 68, as previously discussed. Such information allows the installer to determine an exact cause of a fault at installation such as a fan blockage or an over or under charge, as shown in FIG. 29. For example. If the condenser temperature is above a predetermined level, an installer would look to see if either the system 11 is overcharged or if the condenser fan is blocked. Conversely, if the condenser temperature is below a predetermined level, the installer would check the discharge superheat to differentiate between an over/under charge and between a blocked evaporator/condenser fan. Therefore, sensors 66, 68 allow the installer to diagnose the compressor 10 and system 11 without requiring external gauges and equipment.

Figure 31:
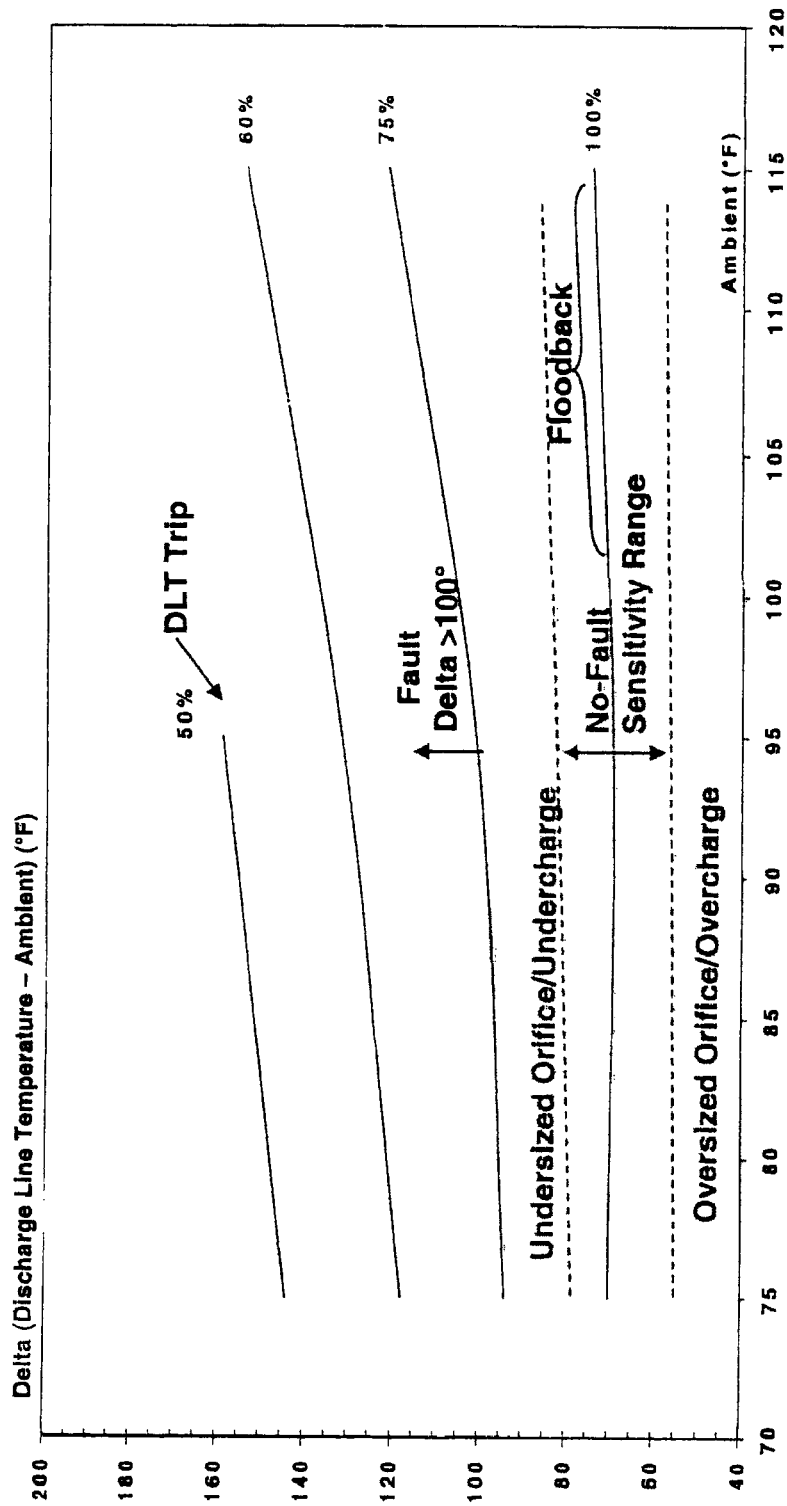
FIG. 31 is a graphical representation of discharge line temperature minus ambient temperature versus ambient temperature for use with the compressor installation procedure of FIG. 29.

FIG. 31 shows that the discharge line temperature can be used in conjunction with the ambient temperature sensor to provide an installer with an additional diagnostic tool. Specifically, particular temperature differences (i.e., discharge line temperature–ambient temperature) relate to specific fault conditions. Therefore, this temperature difference is useful to the installer in properly diagnosing the compressor 10 and system 11.

Figure 32:
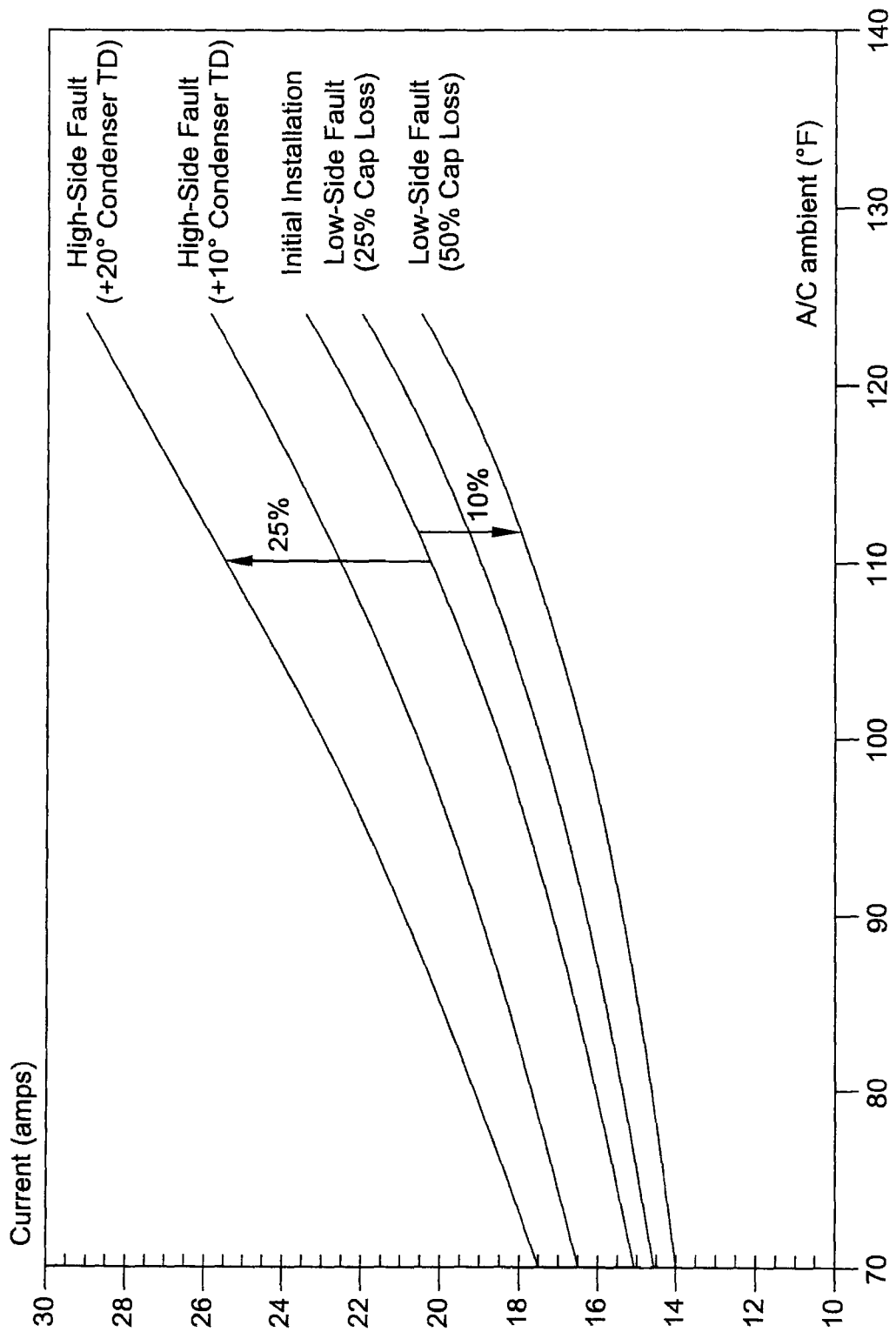
FIG. 32 is a graphical representation of current versus ambient temperature for use with the compressor installation procedure of FIG. 29.

FIG. 32 further demonstrates that after the discharge line temperature is checked at installation, that current measurements can be used to further diagnose the compressor 10 and system 11. Specifically, once the discharge line temperature is known to be satisfactory, the current readings taken by sensor 66 can narrow-down additional areas of concern.

As described, the protection and control system 12 uses a single set of dependent variables (i.e., discharge line temperature and current) to derive a multitude of independent variables (i.e., evaporator temperature, condenser temperature, and suction superheat). Such independent variables are then used by the system 12, in conjunction with the dependent variables, to diagnose the compressor 10 and system 11 to thereby optimize compressor and system performance.

The description of the present teachings is merely exemplary in nature and, thus, variations that do not depart from the gist of the teachings are intended to be within the scope of the present teachings. Such variations are not to be regarded as a departure from the spirit and scope of the present teachings.

What is claimed is:

1. A method comprising:
generating a high-side signal indicative of an operating condition of a high-pressure side of a refrigeration circuit;
generating a low-side signal indicative of an operating condition of a low-pressure side of said refrigeration circuit;
processing by a processor said high-side signal and said low-side signal to determine a non-measured system condition; and
determining by said processor an efficiency of said refrigeration circuit based on said non-measured system condition.

2. The method of claim 1, wherein said generating a high-side signal includes detecting current.

3. The method of claim 1, wherein said generating a low-side signal includes detecting a discharge line temperature.

4. The method of claim 1, wherein said determining said non-measured system condition includes determining at least one of condenser temperature, an evaporator temperature, a suction superheat, and a discharge superheat.

5. The method of claim 4, further comprising determining said condenser temperature as a function of said high-side signal and a first compressor map.

6. The method of claim 5, wherein said first compressor map includes compressor-specific parameters.

7. The method of claim 4, further comprising determining said evaporator temperature as a function of said low-side signal, said condenser temperature, and a second compressor map.

8. The method of claim 7, further comprising using an iterative process to derive said evaporator temperature.

9. The method of claim 4, further comprising determining a compressor capacity as a function of said condenser temperature, said evaporator temperature, and a third compressor map.

10. The method of claim 9, further comprising determining a capacity of an evaporator coil as a function of said compressor capacity and a measured blower current.

11. The method of claim 10, wherein said determining said capacity of said evaporator coil includes adjusting for at least one of blower heat and said suction superheat.

12. The method of claim 10, wherein determining said efficiency includes determining said efficiency as a function of said evaporator coil capacity, said high-side signal, and said measured blower current.

13. The method of claim 10, further comprising determining a compressor power, a blower power, and a fan power.

14. The method of claim 13, wherein determining said efficiency includes dividing said evaporator coil capacity by the sum of said compressor power, said blower power, and said fan power.

15. The method of claim 1, further comprising communicating said non-measured system condition to a system controller.

16. The method of claim 1, further comprising verifying by said system controller said non-measured system condition.

17. The method of claim 16, further comprising reporting said high-side signal and said low-side signal to said system controller and verifying by said system controller said non-measured system condition based on said reported high-side signal and said reported low-side signal.

18. The method of claim 16, further comprising detecting by said system controller said high-side operating condition and said low-side operating condition and verifying by said system controller said non-measured system condition based on said detected high-side operating condition and said detected low-side operating condition.

19. A method comprising:
generating a high-side signal indicative of an operating condition of a high-pressure side of a refrigeration circuit;
generating a low-side signal indicative of an operating condition of a low-pressure side of said refrigeration circuit;
processing by a processor said high-side signal and said low-side signal to determine a non-measured system condition; and
determining by said processor an efficiency of a compressor within said refrigeration circuit based on said non-measured system condition.

20. The method of claim 19, wherein said generating a high-side signal includes detecting current.

21. The method of claim 20, wherein said detecting current includes detecting current drawn by a motor of said compressor.

22. The method of claim 19, wherein said generating a low-side signal includes detecting a discharge line temperature of said compressor.

23. The method of claim 19, wherein said determining said non-measured system condition includes determining at least one of a condenser temperature, an evaporator temperature, a suction superheat, and a discharge superheat.

24. The method of claim 23, further comprising determining said condenser temperature as a function of said high-side signal and a first compressor map.

25. The method of claim 24, wherein said first compressor map includes compressor-specific parameters.

26. The method of claim 23, further comprising determining said evaporator temperature as a function of said low-side signal, said condenser temperature, and a second compressor map.

27. The method of claim 26, further comprising using an iterative process to derive said evaporator temperature.

28. The method of claim 23, further comprising determining a compressor capacity as a function of said condenser temperature, said evaporator temperature, and a third compressor map.

29. The method of claim 28, wherein said determining said compressor efficiency includes determining said compressor efficiency as a function of said compressor capacity and a power drawn by said compressor.

30. The method of claim 29, further comprising receiving information regarding current drawn by a motor of said compressor and voltage drawn by said motor of said compressor, said compressor power determined based on a product of said compressor current and said compressor voltage.

31. The method of claim 29, wherein determining said compressor efficiency includes dividing said compressor capacity by said compressor power.

* * * * *

UNITED STATES PATENT AND TRADEMARK OFFICE
CERTIFICATE OF CORRECTION

PATENT NO. : 8,474,278 B2  
APPLICATION NO. : 13/030549  
DATED : July 2, 2013  
INVENTOR(S) : Hung M. Pham Page 1 of 2

It is certified that error appears in the above-identified patent and that said Letters Patent is hereby corrected as shown below:

On the Title Page

Page 5, Column 2,  
Other Publications, Line 2 — Delete "2007292917" and insert --2007292917,--.

Page 5, Column 2,  
Other Publications, Line 14 — Delete "Applicaiton" and insert --Application--.

Page 6, Column 1,  
Other Publications, Line 1 — Delete "Examiantion" and insert --Examination--.

Page 6, Column 1,  
Other Publications, Line 4 — Delete "2005100059078" and insert --200510005907.8,--.

Page 6, Column 1,  
Other Publications, Line 10 — Delete "Repulic" and insert --Republic--.

Page 6, Column 1,  
Other Publications, Line 58 — Delete "ofYork" and insert --of York--.

Page 6, Column 2,  
Other Publications, Line 7 — After "200780030810.X", insert --,--.

Page 6, Column 2,  
Other Publications, Line 17 — After "US2007/016135", insert --,--.

Page 6, Column 2,  
Other Publications, Line 21 — After "US2008/012364", insert --,--.

Page 6, Column 2,  
Other Publications, Line 29 — Delete "200780030810X" and insert --200780030810.X--.

In the Drawings

Sheet 1 of 32, FIG. 1,  
Reference Numeral 12b — Delete "12b" and insert --12--.

Sheet 1 of 32, FIG. 1,  
Reference Numeral 28b — Delete "28b" and insert --28--.

Signed and Sealed this  
Seventeenth Day of September, 2013

Teresa Stanek Rea  
*Deputy Director of the United States Patent and Trademark Office*

CERTIFICATE OF CORRECTION (continued)
U.S. Pat. No. 8,474,278 B2

In the Specification

| | |
|---|---|
| Column 1, Line 8 | After "11/098,575", insert --,--. |
| Column 1, Line 9 | After "11/059,646", insert --,--. |
| Column 5, Line 13 | Delete "mattingly" and insert --matingly--. |
| Column 16, Line 8 | Delete "C0-C-9" and insert --C0-C9--. |
| Column 17, Line 20 | Delete "Y0-Y-9" and insert --Y0-Y9--. |
| Column 17, Line 62 | Delete "efficacy" and insert --efficiency--. |
| Column 18, Line 59 | Delete "sensor" and insert --sensors--. |